(12) United States Patent
Olden et al.

(10) Patent No.: US 11,362,900 B2
(45) Date of Patent: Jun. 14, 2022

(54) SYSTEMS, METHODS, AND STORAGE MEDIA FOR CONTROLLING IDENTITY INFORMATION ACROSS MULTIPLE IDENTITY DOMAINS IN A DISTRIBUTED IDENTITY INFRASTRUCTURE

(71) Applicant: Strata Identity, Inc., Niwot, CO (US)

(72) Inventors: Eric Olden, Niwot, CO (US); Christopher Marie, San Juan, PR (US); Carl Eric Leach, Piedmont, CA (US)

(73) Assignee: Strata Identity, Inc., Niwot, CO (US)

( * ) Notice: Subject to any disclaimer, the term of this patent is extended or adjusted under 35 U.S.C. 154(b) by 0 days.

(21) Appl. No.: 17/345,470

(22) Filed: Jun. 11, 2021

(65) Prior Publication Data

US 2021/0392048 A1    Dec. 16, 2021

Related U.S. Application Data

(60) Provisional application No. 63/038,688, filed on Jun. 12, 2020.

(51) Int. Cl.
*G06F 15/173* (2006.01)
*H04L 41/0893* (2022.01)
*G06F 9/54* (2006.01)
*H04L 67/56* (2022.01)

(52) U.S. Cl.
CPC .......... *H04L 41/0893* (2013.01); *G06F 9/541* (2013.01); *H04L 67/28* (2013.01)

(58) Field of Classification Search
CPC ...... H04L 41/0893; H04L 67/28; G06F 9/541
See application file for complete search history.

(56) References Cited

U.S. PATENT DOCUMENTS

2014/0181003 A1\*  6/2014  Kling .................... G06F 16/254
707/600

\* cited by examiner

*Primary Examiner* — Wing F Chan
*Assistant Examiner* — Joseph R Maniwang
(74) *Attorney, Agent, or Firm* — Neugeboren O'Dowd PC

(57) ABSTRACT

Systems, methods, and storage media for controlling identity information across multiple identity domains in a distributed identity infrastructure are disclosed. Exemplary implementations may: transmit first identity information from a first identity domain to an identity information control system; use the identity information control system to translate the first identity information from the first format to a second format and from the second format to a third format; send the first identity information in the third format from the identity information control system to a second identity domain; and replace second identity information in the second identity domain with the first identity information.

20 Claims, 10 Drawing Sheets

SYSTEMS, METHODS, AND STORAGE MEDIA FOR CONTROLLING IDENTITY INFORMATION ACROSS MULTIPLE IDENTITY DOMAINS IN A DISTRIBUTED IDENTITY INFRASTRUCTURE

CLAIM OF PRIORITY UNDER 35 U.S.C. § 119 AND CROSS-REFERENCE TO RELATED APPLICATIONS

The present Application for Patent claims priority to U.S. Provisional Application No. 63/038,688 filed Jun. 12, 2020, and assigned to the assignee hereof, which is hereby expressly incorporated by reference herein. The present Application is related to U.S. Provisional Application Ser. Nos. 63/002,921, 63/023,657, and 63/036,497 the contents of which are incorporated herein by reference in their entirety and for all proper purposes.

FIELD OF THE DISCLOSURE

The present disclosure relates to systems, methods, and storage media for controlling identity information across multiple identity domains in a distributed identity infrastructure. Specifically, but not intended to limit the invention, the present disclosure relates to one or more systems, methods, and/or devices that enable unified management of identity information in disparate identity management systems.

BACKGROUND

An identity management system refers to one or more computing platforms implementing a set of technologies used for controlling individual identities, their authentication, authorization, roles and privileges within or across the system and any boundaries associated with the system. Identity management systems are utilized to increase security within the one or more platforms and enterprise boundaries, thereby increasing productivity while decreasing cost, downtime, and repetitive tasks.

Types of functions provided by an identity management system include digital file access control, password management, provisioning of services within the network, enabling single sign-on (SSO), managing security tokens, and mitigating risk, among others. To provide these functions, identity management systems frequently use data (i.e., "identifiers") to identify a subject, credentials comprising evidence to support claims about identities or parts thereof, and attributes comprising characteristics of a subject.

Since many entities utilize multiple third-party providers of cloud services, there is increased fragmentation, layering, and dispersion of identity management within a single organization. This fragmentation, layering, and dispersion of identity management can create a cumbersome system to effectively administer. For instance, interested parties often find themselves simultaneously engaged in multiple identity management systems within their identity infrastructure. Different applications and resources are configured to these disparate and incompatible identity management systems. In some cases, this leads to conflicting behavior, security gaps and issues, additional labor and configuration, and extra costs associated with hardware and licensing of multiple domains simultaneously.

Additionally, these applications and resources are often configured and written at a code level to communicate with exactly one identity management system. When business or technology needs necessitate migration to a new system, the application and resource may need to be rewritten. In addition to the substantial costs involved with rewriting the code, it is often not practical since the systems and knowledge utilized to create the original application/resource may be unavailable due to the significant time passage since the application/resource was originally created. This often leads to a brittle setup in which nobody knows the structure and dependencies for the identity infrastructure, and in which any changes or additions introduce significant risk to the organization's security and access rights. Besides the brittle setup of identity infrastructures, current techniques for migrating identity information across multiple identity domains face significant challenges.

SUMMARY

The following presents a summary relating to one or more aspects and/or embodiments disclosed herein. The following summary should not be considered an extensive overview relating to all contemplated aspects and/or embodiments, nor should the following summary be regarded to identify key or critical elements relating to all contemplated aspects and/or embodiments or to delineate the scope associated with any particular aspect and/or embodiment. Accordingly, the following summary has the sole purpose to present certain concepts relating to one or more aspects and/or embodiments relating to the mechanisms disclosed herein in a simplified form to precede the detailed description presented below. For the purposes of this disclosure, the term "authentication" may refer to the process of verifying who a user is (i.e., to confirm that users are who they say they are), while the term "authorization" may refer to the process of verifying what a user has access to (e.g., access to a resource, such as an app, a document, a database, etc.).

One aspect of the present disclosure relates to a system configured for controlling identity information across multiple identity domains in a distributed identity infrastructure. The system may include one or more hardware processors configured by machine-readable instructions. The processor(s) may be configured to transmit first identity information from a first identity domain to an identity information control system. The first identity information may include a first format. The processor(s) may be configured to use the identity information control system to translate (i) the first identity information from the first format to a second format and (ii) the second format to a third format. The processor(s) may be configured to send the first identity information in the third format from the identity information control system to a second identity domain. The processor(s) may be configured to replace second identity information in the second identity domain with the first identity information.

Another aspect of the present disclosure relates to a method for controlling identity information across multiple identity domains in a distributed identity infrastructure. The method may include transmitting first identity information from a first identity domain to an identity information control system. The first identity information may include a first format. The method may include using the identity information control system to translate the first identity information from (i) the first format to a second format and (ii) the second format to a third format. The method may include sending the first identity information in the third format from the identity information control system to a second identity domain. The method may include replacing second identity information in the second identity domain with the first identity information.

Yet another aspect of the present disclosure relates to a non-transient computer-readable storage medium having instructions embodied thereon, the instructions being executable by one or more processors to perform a method for controlling identity information across multiple identity domains in a distributed identity infrastructure. The method may include transmitting first identity information from a first identity domain to an identity information control system. The first identity information may include a first format. The method may include using the identity information control system to translate the first identity information from (i) the first format to a second format and (ii) the second format to a third format. The method may include sending the first identity information in the third format from the identity information control system to a second identity domain. The method may include replacing second identity information in the second identity domain with the first identity information.

These and other features, and characteristics of the present technology, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the disclosure. As used in the specification and in the claims, the singular form of 'a', 'an', and 'the' include plural referents unless the context clearly dictates otherwise.

DETAILED DESCRIPTION

Figure 1:
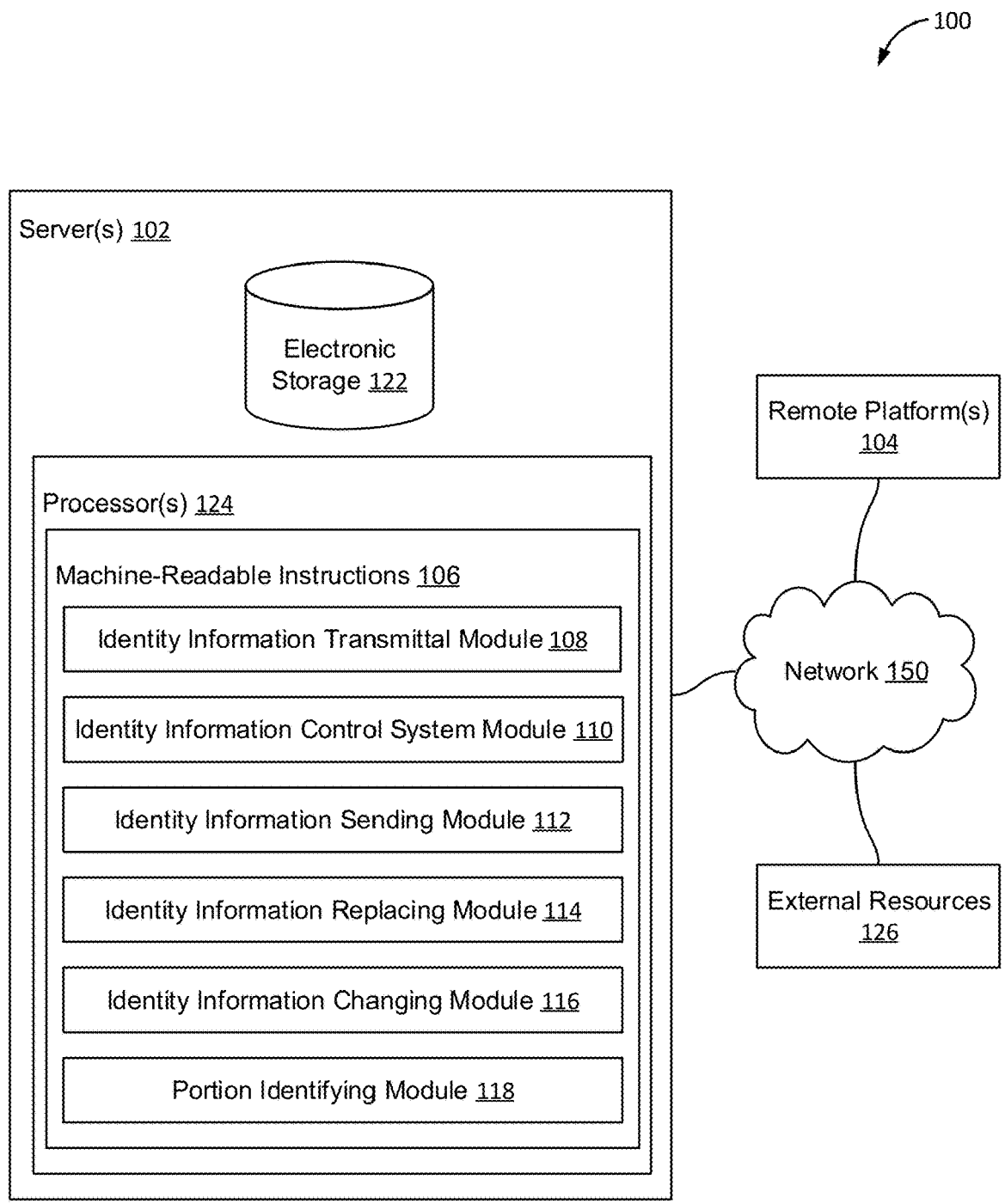
FIG. 1 illustrates a system configured for controlling identity information across multiple identity domains in a distributed identity infrastructure, in accordance with one or more implementations.

The words "for example" is used herein to mean "serving as an example, instance, or illustration." Any embodiment described herein as "for example" is not necessarily to be construed as preferred or advantageous over other embodiments.

The flowcharts and block diagrams in the following figures illustrate the architecture, functionality, and operation of possible implementations of devices, systems, methods, and computer program products according to various embodiments of the present invention. In this regard, some blocks in these flowcharts or block diagrams may represent a module, segment, or portion of code, which comprises one or more executable instructions for implementing a specified logical function(s) associated with the module/segment/code. It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts, or combinations of special purpose hardware and computer instructions.

For the purposes of this disclosure, identity data may refer to individual users' data, including their credentials and attributes. For instance, identity data may include one or more of a user identity (e.g., first and/or last name of a user), a user credential (e.g., username, password, password authentication token, etc., that are bound to the user), and a user attribute (e.g., email address, phone number, residential address, job title, department, employee ID, etc.) for each of one or more individual users of one or more identity domains.

An identity session (also referred to herein as a "session") may refer to an established set of identity data (e.g., identity data accepted by the identity infrastructure to access a resource, such as an app) that represents a user interacting with the identity infrastructure. In some cases, a session may be established by authenticating a user (e.g., by a user proving their identity through a mechanism such as username and password and/or biometrics, such as fingerprint, iris scan, voice recognition, etc.) and maintaining this session state (e.g., authenticated state) for some established period of time or until the user logs out or their access rights are otherwise suspended. A session may refer to a logical construct (e.g., identity data and/or metadata used for authentication and/or authorization), based on a user's identity, that establishes persistence across resource (e.g., file) access and/or page views (e.g., Hyper Text Transfer Protocol (HTTP) pages, such as web pages). It is contemplated that a "resource" may also refer to "page views". For example, HTTP is a stateless protocol, which means that when a user requests a particular webpage or resource from a server, and subsequently requests another webpage or resource from the same server, the server treats the user as a new "requestor" each time. In some examples, a session state refers to a feature (e.g., cache memory, text files in a temporary directory or folder on the client and/or server, a database, a cookie, etc.) that allows the system (e.g., shown as system 100 in FIG. 1, system 300-a in FIG. 3A) to remember the user by keeping a temporary record of identity data associated with the user. In some cases, each session may be assigned a unique identifier (or session ID) and this session ID may be used to store and retrieve a session state (or an application's working set of data) before and after each page view (e.g., HTTP page view). The application's working set of data may refer to information associated with one or more page views (e.g., items in a shopping cart for an online shopping or e-commerce website). In some cases, the information associated with the session, such as the session ID, may be stored on the server from which the user is requesting the webpage or resource. Additionally, or alternatively, the session ID may be stored on a different computing device such as a user device (e.g., laptop, smartphone, etc.) from which the user is accessing the resource. In some cases, a session may be established by authenticating a user and maintaining a session state for at least a threshold or an established period of time (e.g., 1 minute, 30 seconds, 5 minutes, etc.). In some cases, an identity session may also constitute a set of permissions granted to the user (e.g., for accessing resources, such as protected resources, in the identity infrastructure) and/or role information associated with the user. As used herein, the term protected resource may refer to a resource that is identified as only being accessible to certain users, such as authorized users. In some embodiments, the role information may be different from the user attribute. For instance, multiple users may be associated with the same or similar role information but may have different user attributes. In one example, users having similar designations or seniority levels in an organization (e.g., managers, managing directors, staff engineers, etc.) may be associated with the same or similar role information.

Identity metadata may be used herein to refer to information pertaining to how identity is managed and coordinated. Identity metadata may include password rules, such as, but not limited to password length or a requirement that the password must contain one capital, one number, one symbol and/or cannot be the same as a previous password. Identity metadata may also include authorization policies, such as, but not limited to a policy which states that user must be in the administrator group to access a resource, a user must be logged in from a US-based IP address, and/or a user may only access resources during business hours (e.g., 9 AM to 5 PM). Additionally, or alternatively, identity metadata may also include a trust policy and network locations (e.g., HTTP address, Uniform Resource Locator (URL), File Transfer Protocol (FTP) address, network address, such as an Internet Protocol (IP) address, a Media Access Control (MAC) address, to name a few non-limiting examples) for identity domain elements of one or more identity domains. The identity metadata may further include one or more of: the enumeration of identity infrastructure elements and their network location and configuration, identity policies such as authorization or authentication rules and mechanisms, and identity session structure and content.

Identity sessions may comprise, for example, timestamps for when a session was initiated, the maximum lifetime of a session, how long a session should last for an idle user, an opaque user identifier (e.g., a type of user identifier that does not reveal the user's identity, maybe a random string or number), a reference to a session identifier (optional, and may be maintained centrally), a reference to a requested resource, one or more claims about the user (sometimes identity attributes), one or more "scopes", and/or an enumeration of privileges the user has for the requested resource. In some examples, sessions may be maintained in browser cookies, Json Objects that are passed between different endpoints, server caches, or databases. In some cases, scopes may be used to define the specific actions that are permitted to be performed on behalf of a user, an application, etc. For instance, when a user agent (e.g., shown by user 402 and user device 450 in FIG. 4) requests permission to access a resource, such as an application, through an authorization server, it may use a scope parameter (e.g., READ, WRITE, DELETE, etc.) to specify what access it needs, and the authorization server (e.g., shown as access system 423) uses the scope parameter to respond with the access that was actually granted (e.g., if the granted access is different from what was requested). In some embodiments, the access system 423 may generate an access token comprising one or more scopes based on the user authentication data and/or scope parameters evaluated by the authenticate system 421. In some embodiments, the access token may be sent to the protected resource within a dataflow (e.g., shown as dataflow 415 in FIG. 4), along with the scopes that limit the actions the user 402 is permitted to perform against and/or with the protected resource. In some cases, the application 425 may also store one or more of the access token and scopes. In some examples, the access token may comprise a string of random characters that enable the application 425 to verify incoming requests to access the protected resource. For instance, the access token may be based in part on the username/password credentials received from the user 402 during login 401. In some cases, the access token may also serve as a key that comprises a collection of metadata (e.g., information pertaining to an authorization policy for the user 402).

Figure 4:
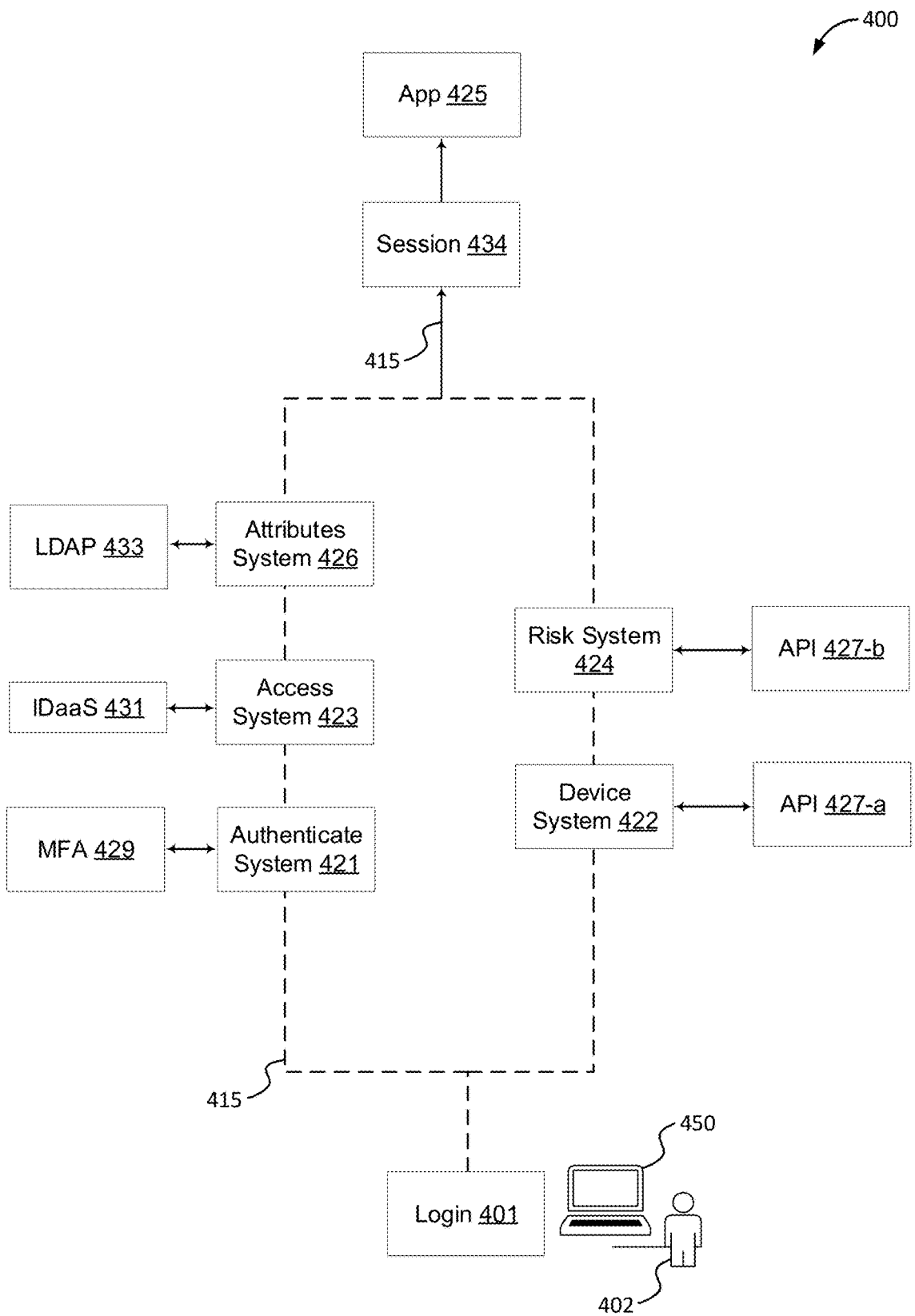
FIG. 4 illustrates a process flow for discovery and assessment of identity infrastructure, according to an embodiment of the disclosure.

In some aspects, the access token may be similar to identity session information that may be contained with a cookie, header, and/or authentication token. However, the access token may be more specific to the process of authorization, and may be used to communicate, to the protected resource, the permissions a user may have to perform actions after a successful authentication. In some examples, the authorization server or access system 423, as seen in FIG. 4 may request a connecting agent (or another module/agent of system 100) to verify or process the identity session based at least in part on one or more of the access token, scopes, user authentication data, and Multi Factor Authentication (MFA). MFA may comprise a system which uses multiple forms of identity data to help verify or process the identity session or other aspects of user authentication and/or authorization. For instance, MFA 429, as seen in FIG. 4, may refer to a feature where a user may submit multiple factors to be authenticated or gain entry to a network, which may enhance security over single-factor authentication. In some embodiments, a user may be transmitted a 4 or 6 digit code over text, through an app installed on their device, email, voice call, etc. Further, the user may enter the 4 or 6 digit code in addition to their password to get authenticated. In some examples, MFA 429 may be implemented using a mobile authenticator app installed on a user device (e.g., smartphone) that generates a numeric or alphanumeric pin (e.g., 4 digits long, 6 characters long, etc.), a physical device (e.g., a USB token that requires biometric interaction, such as touch, a fingerprint, etc., as proof of possession), and a push notification sent to a registered mobile device to name a few non-limiting examples. Other techniques for implementing MFA 429 known in the art, such as a code or pin sent over SMS or email, are also contemplated in different embodiments. In some cases, if there is no user authentication data, the user may be redirected to an identity domain to authenticate prior to verifying/processing the identity session.

An identity domain refers to a computing system for managing one or more of users and roles, integration standards or identity standards, external identities (i.e., identities with no relation or presence in the identity domain, such as identities associated with another identity domain), and secure application integration using, for instance, an authentication scheme (e.g., Single Sign-On (SSO)) and/or an authorization protocol (e.g., a set of rules that allows a third-party website or application to access a user's data without the user needing to share login credentials). Application integration, as used herein, refers to a mechanism for supporting interactions between an application or protected resource associated with a first identity domain and users associated with a second identity domain different from the first identity domain. As an example, an enterprise may have developed an app for its customer or enterprise partner, where the app may be secured by a first identity domain. Further, the enterprise partner may already manage one or more identities on other identity domains, such as a second identity domain. In such cases, the enterprise may integrate their app with the second identity domain, which may allow users associated with the second identity domain to seamlessly interact with their app without creating another identity (e.g., in the first identity domain) to access the app. In some cases, integration of identities and applications may be performed using one of numerous methods, such as manual identity administration (e.g., manually adding users from the second identity domain into the first identity domain), bring your identity solutions (e.g., allowing users to sign in using their Google or Microsoft credentials, provided by Alphabet, Inc., of Mountain View, Calif., and Microsoft Corp., of Redmond, Wash., respectively), and federation (e.g., enterprise and customer/enterprise partner mutually agree to allow the enterprise partner users to use their own identities to access the app provided by the enterprise). In some cases, identity federation may comprise enforcing common identity standards and protocols to coordinate and manage user identities between different identity providers or identity domains, applications, etc., across an identity infrastructure (e.g., shown as identity infrastructure 301-*a* in FIG. 3A).

There exist numerous identity and access management (IAM) standards (also referred to as integration standards) for managing access. In some cases, these IAM standards are "open" standards, that is, they are publicly available and associated with one or more rights to use. In some cases, these IAM standards are integrated (e.g., unified) and used across a plurality of applications, devices, and/or users. Some non-limiting examples of IAM standards include Security Assertion Markup Language (SAML) used to send authorization messages between trusted partners or entities, OpenID, Web Services Trust (WS-Trust), WS-Federation, and OAuth. SAML defines an Extensible Markup Language (XML) framework for exchanging security assertions among security authorities and may facilitate interoperability across different vendor platforms that provide authentication and/or authorization services. In some circumstances, OAuth may enable a user's account information to be used by third-party services, such as Facebook provided by Facebook, Inc., of Menlo Park, Calif. without exposing the user's password. In some examples, an identity domain controls the authentication and authorization of the users who can sign into a service (e.g., a cloud service), and what features they can access in relation to the service. For example, a cloud service (e.g., Database Cloud Service and Infrastructure as a Service (IaaS)) may be associated with an identity domain. Multiple services may be associated with a single identity domain to share user definitions and authentication rules, for instance. In some cases, users associated with an identity domain may be granted different levels of access (or authorization) to each service (e.g., cloud service) associated with the identity domain. For instance, a first user (e.g., a system administrator) may be provided both read and write access, while another user (e.g., accountant) may only be provided read access. Thus, in some aspects, an identity domain is a self-contained realm with consistent identity data and identity metadata throughout. Some non-limiting examples of an identity domain include an Active Directory (AD) domain or an Okta account for a single company. It should be noted that other identity domains known in the art may be contemplated in different embodiments.

In some cases, a protected resource may refer to an element or application of the identity infrastructure that is configured to assess or evaluate the identity data (e.g., information provided by a user to access the protected resource such as, but not limited to, a username, password, user attribute, unique identifier, unique pin, and biometric information such as, but not limited to a fingerprint, iris scan, and voice input, and other information known in the art) in order to make access and control decisions about its resources and/or data. In other words, a protected resource may be aware about the identity data needed to access it. In some circumstances, the protected resource may use the identity session and/or the identity data in deciding to allow access to its resources. In some embodiments, the protected resource may only allow restricted or partial access based on evaluating the identity data. As an example, a protected resource may expect a header (e.g., an authorization header, such as HTTP authorization header) or a cookie for access to the protected resource, while another protected resource may merely grant access upon a user arriving at that protected resource. In the case of a protected resource that grants access upon a user arriving at the resource, the protected resource may assume that the user has passed some check, such as authentication and/or authorization, prior to arriving at the protected resource. In such cases, the protected resource may not explicitly check for a header, cookie, certificate, token, etc., and may instead take the fact that the user reached the protected resource in the first place as evidence of protection. Thus, each protected resource may be aware of the mechanism by which it may be provided an identity session by its associated identity domain. In some aspects, the protected resources are coupled to the identity domain based on their reliance on identity session(s) and their particular formats and security constraints (i.e., identity data and/or identity metadata formats and constraints).

In some cases, the header/cookie may be passed in a token, such as an authentication token or an access token. In some cases, the authentication token may be generated and assigned to a user once the user is authenticated. Further, a certificate (e.g., a Public Key Infrastructure (PKI) certificate, such as a Secure Socket Layer (SSL) certificate) linked to the authentication token and representing a valid identity session may be issued to the user. In some cases, the certificate may be issued by a third party, such as a Certification Authority (CA) and may include the user's public key, a name, and any other applicable information. The certificate may serve as an attestation by the CA that the user is who they claim to be. For instance, the CA may sign a data structure that contains the user's public key and name, thus binding the user's public key to their name. Further, the certificate may be encrypted by the CA. The CA may also be linked to a private key and a public key, and may encrypt the certificate with a combination of the public and private keys associated with the CA. Any entity (e.g., protected resource, another user, another identity domain, etc.) with access to the CA's public key may verify the certificate (i.e., that the certificate is issued by a trusted CA) and/or the claim made in the certificate (i.e., the user is associated with the user's public key). The user may utilize this certificate for interactions with the protected resource, for instance. In some cases, authorization may comprise using attribute information associated with the token issued to the user during authentication and comparing said information to access control rules for the protected resource. If the rule permits the user to access the protected resource, the authorization is successful, and the user is granted access to the protected resource. In some other cases, access tokens may be utilized, for instance, if an identity domain or protected resource does not support the use of certificates and authentication tokens. In such cases, an access token may be issued by a server, such as an authorization server once the user identity data, access control rules, etc., is verified. In other words, the access token may serve as a proof that the user is authorized for access. This access token may be sent in an authorization header, such as an HTTP authorization header, and may be used to establish user identity and authorization. In some cases, the protected resource or identity domain may validate the token, for instance, via a call to one or more of the authentication and authorization server, or using a public key corresponding to a private key with which the authentication and/or authorization server signed the access token. Alternatively, in some circumstances, anyone (e.g., authorized user, rogue user) holding the access token may gain access to the protected resource. To alleviate such issues, communication of the access token may be secured via Transport Layer Security (TLS). Centralized validation of access tokens may also mitigate the chances of a rogue user gaining access to a protected resource (i.e., man in the middle attack). Some non-limiting examples of tokens (e.g., access tokens, authentication tokens) may comprise bearer tokens, hash-based authentication code (HMAC) tokens, and RSA-SHA1 tokens using RSA private/public keypairs. In some cases, a token may comprise one or more of unique string values, hashed values, a cryptographic hash function and a secret cryptographic key, attributes information, etc., issued by a server, such as an authentication server.

The identity infrastructure may include one or more identity domains and one or more identity infrastructure elements. The one or more identity domains may further comprise one or more identity domain elements, where the one or more identity domain elements may comprise hardware (e.g., servers, computing devices or platforms, etc.), software (e.g., a cloud service), or a combination thereof. By way of non-limiting example, the one or more infrastructure elements installed in the identity infrastructure may include one or more of servers, routers, identity stores comprising one or more databases of authentication information, policy enforcement points (PEPs) for enforcing authorization rules (e.g., shown as access system 423 in FIG. 4), authentication points for determining user identity (e.g., shown as authenticate system 421 in FIG. 4), proxy devices, policy decision points (PDPs) for evaluating authorization rules based at least in part on identity session attributes, and protected resources (e.g., applications or apps).

Figure 5:
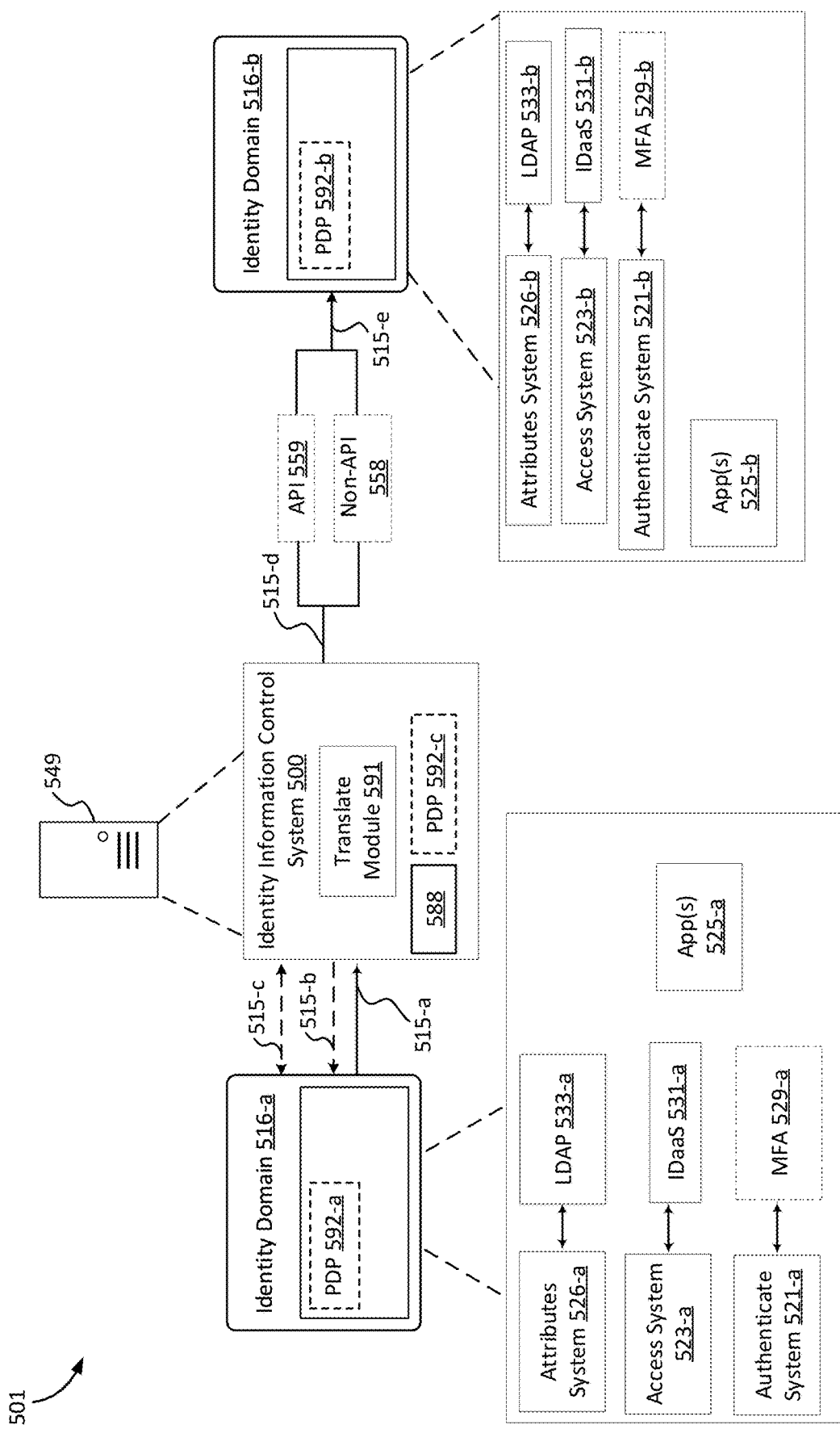
FIG. 5 illustrates a process flow for controlling identity information across multiple identity domains in a distributed identity infrastructure, according to an embodiment of the disclosure.

An identity infrastructure may comprise at least one PDP (e.g., PDP 592-a, PDP 592-b, PDP 592-c) and one or more PEPs (e.g., access systems 523-a and 523-b in FIG. 5). In some examples, each PEP may be co-located with an app or protected resource, while the PDP may be centralized and may communicate with a plurality of PEPs. For instance, access systems 523-a and 523-b in FIG. 5 are co-located with apps 525-a and 525-b, respectively. Although not necessary, in some examples, the PDP (e.g., PDP 592-c) may be centralized and may communicate with a plurality of PEPs. It should be noted that, one or more of the PDPs 592 in FIG. 5 are optional (shown as optional by the dashed lines). According to aspects of this disclosure, a connecting agent, such as connecting agent 388 in FIG. 3B, may assume the responsibilities of either or both of the PDPs and PEPs. In some cases, the identity information control system 500 in FIG. 5 may also comprise a connecting agent 588, where the connecting agent 588 may be similar or substantially similar to the one described in relation to FIG. 3B. As used herein, a PDP may refer to a system entity or component of a policy-based access control system within an identity domain configured to make authorization decisions for itself or alternatively, for other system entities that request such decisions. For instance, a PDP may determine whether or not to authorize a user's request based on available information (e.g., attributes, such as identity session attributes) and/or applicable security policies. In some cases, a PDP (e.g., PDP 592-a) may examine a request to access a resource (e.g., app 525-a) and compare said request to the policy that applies to requests for accessing that resource (i.e., to determine whether the requestor, such as a user, should be granted access). In some cases, the connecting agent 588 may communicate with one or more identity domain elements. For example, the connecting agent 588 may communicate with a PDP, such as PDP 592-a, in an identity domain 516-a, where the communication may comprise a request for a policy decision. The PDP 592-a may return a response to the connecting agent 588, where the response may comprise a Boolean value (e.g., yes/no, allow/deny, etc.). The connecting agent 588 may grant or deny user access to the protected resource (e.g., app 525-a) based on the response from the PDP (e.g., PDP 592-a). In another example, the connecting agent may request policy related information from the PDP. Upon receipt of the policy related information, the connecting agent may utilize the information and decide whether or not to allow user access to the protected resource. In this way, the connecting agent may act as, or on behalf of, the PDP.

Additionally, or alternatively, the connecting agent may abstract one or more implementation details of an identity domain away from the protected resource or app. For instance, the connecting agent may enable an app (e.g., app 525-a) associated with a first identity domain (e.g., identity domain 516-a) to work with (e.g., be accessed from) a second identity domain (e.g., identity domain 516-b) with no or minimal changes to the app. For example, the connecting agent, such as connecting agent 588, may allow for identity session abstraction. This abstraction may enable different identity domains, such as identity domains 516-a and 516-b, to provide, passively and without pre-configuration or internal knowledge, identity session information to different applications and resources (e.g., apps 525-a, 525-b). Some non-limiting examples of identity session information comprises information about the user, such as a user identifier or an opaque identifier, information about when and how the session was established (e.g., as the result of an authentication event), an indication of how long the identity session should last, and/or information pertaining to which protected resources the identity session is valid. An opaque identifier (or opaque user identifier) may refer to a type of identifier that does not reveal the user's identity and may comprise a random string or number, for instance.

In some embodiments, the identity infrastructure may also comprise at least one authorizing agent, also referred to as an enforcing agent, for interpreting identity session information and evaluating access rules. For example, a portion of the access system 523-a may comprise at least one authorizing agent. The authorizing or enforcing agent may enforce access control for protected resources in the identity infrastructure. For example, an authorizing/enforcing agent may act as a PEP and enforce an access decision received (potentially, via a connecting agent) from a PDP. The request for the access decision may also be provided to the PDP from the PEP (potentially, via a connecting agent). Alternatively, and as further described herein, the connecting agent may act as more than a proxy and may perform the functions of the PDP by receiving the policy from the PDP and making the determination of how to handle the access request; and/or the connecting agent may act as the PEP and enforce the policy. By communicating with various PEPs and PDPs in various identity domains, in such a manner, the connecting agent (and potentially authorizing/enforcing agent) may comprise an orchestrating agent to control the access to protected resources in various identity domains.

Authorizing or enforcing agents (e.g., shown as access systems 523-a and 523-b) may be realized using hardware, firmware, software or a combination thereof. Additionally, with respect to protected resources (e.g., apps 525-a and 525-b), a protected resource may comprise an application/app (e.g., mobile app, web-based app, etc.). Also, and as described above, identity sessions comprise identity information about the user (e.g., a user identifier, an opaque identifier, etc.) and/or information pertaining to one or more of: when and/or how the identity session was established (e.g., as the result of an authentication event), how long the identity session should last, for which protected resource(s) the identity session is valid, etc. Other types of information described herein may also be included in the identity session. For example, the identity session may be customized, wherein the identity session format may comprise a custom format for a particular identity domain, e.g., identity domain 516-a and/or 516-b. In such a case the identity session may be encoded, or encrypted in a manner specific to a particular identity domain and may include a cookie or an API specific to that domain. Connecting agents may transform the cookie or access the API associated with the identity session to enable identity data and metadata transmission between identity domains. It should be noted that identity session information may be customized and/or the use of connecting agents may be implemented to decrease the likelihood of an application or protected resource in one identity domain from consuming (e.g., processing) an identity session received from another, different identity domain.

In some embodiments, connecting agents may also manage trust relationships of multiple identity domains and their associated protected resources. A trust relationship refers to a logical link (e.g., information associating/identifying) between two or more entities (e.g., a user and an identity domain, two identity domains, etc.), where one of the entities may be referred to as a trusting domain (e.g., a first identity domain) while the other may be referred to as a trusted domain (e.g., a second identity domain). When a trust relationship is in place, the trusting domain may honor, for instance, a login authentication associated with the trusted domain. In some circumstances, trust relationships may be necessary for identity sessions from a first domain to be accepted by the protected resource in a second domain, where the second domain is different from the first domain.

Trust relationships may be a way to establish the validity of identity sessions and prevent spoofing of a session. In some cases, trust relationships may be established via a signature generated from a private key and validated using an associated public key. Public key cryptography (also known as asymmetric cryptography) refers to an encryption technique where two or more parties (e.g., a user and an identity domain, a user and a protected resource) may each be assigned two keys—a public key and a private key. Numerous cryptographic tools and modules exist for generating public/private key pairs. One non-limiting example of such a tool is OpenSSL provided by TheOpenSSL Project. OpenSSL is an open-source command line tool that is used for TLS and Secure Socket Layer (SSL) protocols and may be used to generate public/private keys, install SSL/TLS certificates, and identify certificate information. Other types of commercial and/or open-source tools for generating public and private keys are contemplated in different embodiments. In some cases, the two keys for a respective party may be connected and may comprise two large prime numbers (e.g., 100 digits long, 150 digits long, etc.) with certain mathematical properties. For instance, two random n-bit (e.g., 512 bit, 1024 bit, etc.) prime numbers may be generated and multiplied together to create a modulus (N), where the value N is part of the public and private key. The public key may be shareable and may allow a receiving entity to receive messages from other entities. Further, the receiving entity may decrypt the message or dataflow using their private key. In such cases, a receiving entity may decode a message or dataflow encoded by a transmitting entity (i.e., using the receiving entity's public key) by using their private key (i.e., the receiving entity's private key). In some cases, a user may be authenticated using their login credentials and a trusted third party (e.g., a Certification Authority (CA)) may provide a link between the public key of the user and the user's identity. For instance, the CA may be associated with a public key and a private key and may sign a certificate using their private key. The identity domain or protected resource may use the public key associated with the CA to determine the user's public key (e.g., embedded within the certificate) and verify the user (i.e., confirm the user's identity by verifying who they say they are). In some cases, any entity (e.g., protected resource, another user, etc.) with the public key associated with the CA may decrypt the certificate to identify the user's public key.

In some cases, public/private key pairs may also be used to decrypt and verify assertions between different identity domain and/or identity infrastructure elements. Each receiving entity possessing a public key associated with a transmitting entity may be able to read (e.g., decrypt) a message that has been signed using a corresponding private key of the transmitting entity and may confirm that the original contents of the message have not been altered. Or, in one non-limiting example, an identity domain element may use its private key to sign a cookie associated with an identity session. In such cases, one or more protected resources or applications that trust and rely on the cookie to grant user access to the protected resource may utilize the public key in the identity session to decrypt and verify the signature, thereby enabling access to the protected resource.

In other cases, trust relationships may involve Transport Layer Security (TLS) combined with a Domain Name System (DNS) to confirm that traffic is routed to the expected element and not subject to interception by a rogue party (e.g., Man-in-the-middle attack). As an example, two servers may connect together over a network and communicate with each other, where their communications may be secured using TLS. In some cases, TLS may involve the use of a specific protocol to enable the servers to establish their identity with each other. Similarly, communication(s) between one or more identity domains and an identity information control system (e.g., shown as identity information control system 300-a in FIG. 3A) may also be secured using TLS.

Figure 3A:
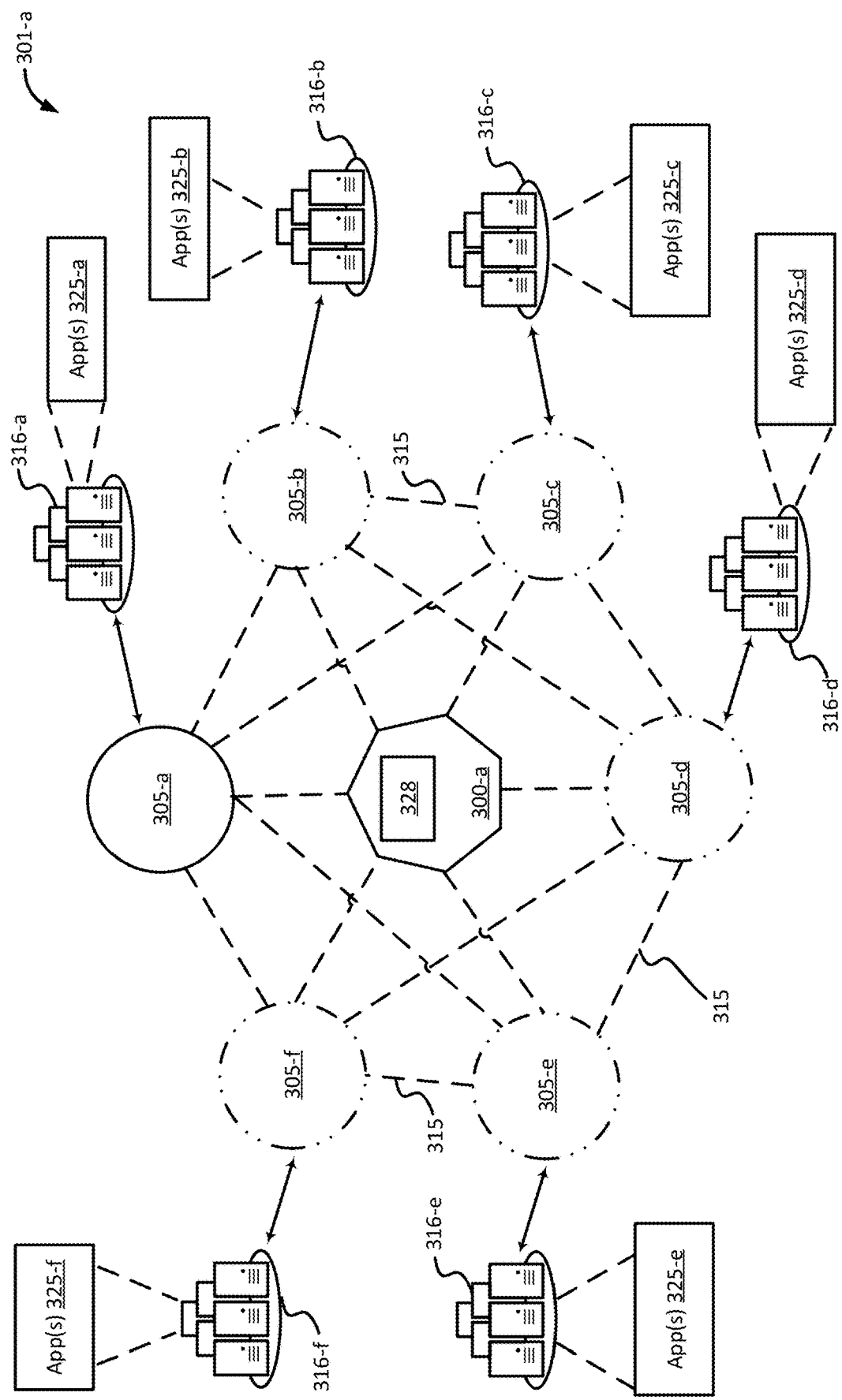
FIG. 3A illustrates a distributed identity management environment comprising the system of FIG. 1, according to an embodiment of the disclosure.

In some embodiments, an identity infrastructure may comprise multiple identity domains (e.g., identity systems 316 seen in FIG. 3A). Further, a control system, such as an identity information control system (e.g., shown as identity information control system 300-a in FIG. 3A), may be deployed in the identity infrastructure to control identity information for the multiple identity domains. In some examples, the identity information control system 300-a may also support cross-cloud control of multiple identity domains. For instance, the identity information control system may be configured to control identity domains residing in multiple-clouds simultaneously and/or control multiple on-premises identity domains in different networks (e.g., public networks, private networks, etc.). It should be noted that the control system 300-a may be an example of a centralized control system (i.e., deployed at a single geographic location) or a decentralized control system (i.e., deployed at multiple geographic locations, but working in a synchronized manner).

In some cases, an identity domain (e.g., identity systems 316 seen in FIG. 3A) may comprise a construct (data referring to identity data, identity metadata, authentication data and/or authorization data, among other data described herein or otherwise known in the art) for managing one or more of users and roles, integration standards, external identities, and secure application integration through single sign-on configuration. In some aspects, an identity domain may control the authentication and authorization of users who can sign into a service (e.g., App(s) 325), and the features they can access in relation to the service. In some examples, the service may be a cloud service. In other cases, the service may be an on-premises service. In some circumstances, the identity infrastructure 301 for an enterprise may comprise multiple identity domains (e.g., identity systems 316 seen in FIG. 3A), and each identity domain may comprise multiple services (e.g., App(s) 325). In other words, users of different identity domains may be granted access to different services, applications, resources, etc., based on the services associated with each identity domain. Furthermore, users in an identity domain may also be granted different levels of access to each service associated with the identity domain.

In some cases, a user from a first identity domain (e.g., identity domain 316-a) may be migrated into another identity domain, such as a second identity domain (e.g., identity domain 316-b). As an example, a business acquisition may bring in new identity domains, systems, user identity stores, etc., which may need to be connected to corporate resources. In this case, the user from the first identity domain may be referred to as an unmigrated user in the second identity domain since there is no user profile for that user in the second identity domain. In order to provide the user access to resources or services associated with the second identity domain, the user may need to be migrated into the second identity domain.

System 100 in FIG. 1 and system 300-a in FIG. 3A may support migration of both live and non-live credentials. Migration of live credentials (i.e., "live migration") may refer to migration occurring during an active session. An active session may comprise (or refer to) a period of time after identity data and/or metadata in a first identity domain has been verified for a user. Such identity data or metadata may comprise one or more of a user identifier and user credentials information. Verification of identity data and/or metadata may occur in response to receiving a login request (e.g., within a dataflow 315 in FIG. 3A; also shown as logins 401 and 801 in FIGS. 4 and 8, respectively) in a first identity domain (e.g., identity domain 316-a) from the user, along with the user identifier and user credentials information associated with that user. In some cases, the user identifier and/or user credentials information associated with the user may be included in the request. In some cases, live migration may allow for the user credentials to be inserted into other identity domains (e.g., identity domains 316-b, 316-c, etc.) in the identity infrastructure 301-a. In such cases, credentials may not be encrypted, and may comprise readable credentials. In some cases, credentials may include a combination of a user identifier and a password. The password may comprise a one-way hashed password. Using a one-way hashed password may increase the complexity of migrating credentials in the live migration and also in a non-live migration (i.e., migration of non-live credentials) across different identity systems/domains 316. In some cases, non-live credentials may also be referred to as encrypted, hashed, or non-reversible credentials. A one-way hash function comprises a unique binary sequence (or hash), generated from input to a mathematical function. If the input is the same, then the hash is the same. Further, if the input changes (e.g., even by one character) the output hash may be completely different. To authenticate the user, the hashed credentials may be compared to a hashed copy stored, for instance, in an attributes system (e.g., shown as attributes system 426 in FIG. 4), authenticate system (e.g., shown as authenticate system 421 in FIG. 4), etc., which may reside within the identity domain 316. As the unique binary sequence or hash is computationally difficult to invert (i.e., to generate the original input from the hash), after user credentials have been one-way hashed, it may be difficult to invert or "unhash" them so they can be inserted into another identity domain.

In some cases, live migration may also allow for credentials upgrade. In one non-limiting example, updating the credentials may comprise prompting for additional factors during the authentication process. One such prompt may comprise a request for multi-factor authentication. Some non-limiting examples of additional factors include physical tokens (e.g., a key or dongle that connects to a user's mobile device using USB, Bluetooth, Near Field Communication (NFC), etc.), PIN generator devices displaying rotating codes that a user enters to complete authentication (e.g., RSA SecurID), a mobile device with cryptographic keys or certificates installed on the device, a mobile device with a mobile authenticator application that uses a Time-based One-time Password (TOTP) algorithm that generates codes (e.g., a 4 digit code, 6 digit code, etc.) entered by the user to complete authentication, a mobile device that receives push notifications for verifying authentication events, and/or smart cards with embedded certificates.

In some cases, live migration may also allow for credentials modification, for instance, to suit requirements in another identity domain (e.g., a second identity domain). In some embodiments, different identity domains may have different password composition and complexity rules. As an example, a first identity domain or source identity system may require passwords to be a minimum of 8 characters in length, have at least one lowercase letter, and a number. Further, a second identity domain or destination identity system may require passwords to be at least 12 characters in length, and include at least: one uppercase letter, and one special character (e.g., $, @, &, %, etc.). In such cases, an unmigrated user (i.e., unmigrated, having no entry or presence, and no user profile in the second identity domain) may be prompted to select a password that complies with credentials rules in both the first and the second identity domain. In this example, the unmigrated user may select a password (e.g., BestPassword007$) that is at least 12 characters in length and comprises one lowercase letter, one uppercase letter, a number, and a special character to comply with the password rules of both the first and the second identity domain. After migration of credentials between domains, a user may be authenticated in a first identity domain using the modified credentials information entered into the second identity domain, while attempting to access services, applications, resources, etc., associated with the first identity domain. Alternatively, the user may be authenticated using the modified credentials information while attempting to access protected resources or apps associated with the second identity domain. As used herein, source identity system may refer to an identity system 316 or identity domain e.g., 316 for which a user's credentials have been migrated from and into another identity domain (referred to as the destination identity system or domain).

In some embodiments, live migration may enable the system (e.g., system 100 in FIG. 1, systems 300-a and 300-b in FIGS. 3A/3B, and/or identity information control system 500 in FIG. 5) to interact with a user for additional information. For instance, a user may be prompted to input additional identifying information, such as their current address, address history for the last 5 years, etc. Furthermore, the system 100, 300-a may also require user consent to perform follow-up actions such as, but not limited to, prompting the user to accept terms and conditions before proceeding with the migration.

In some embodiments, users and/or their credentials may be validated or checked for compromise prior to live migration. Compromised credentials may be maintained and stored in a database (e.g., compromised accounts database 890 in FIG. 8) and may be updated after a data breach. By checking if a user's credentials have been compromised in a source identity domain (e.g., identity domain 316-a) before migration, the system (e.g., system 100 in FIG. 1, system 300-a in FIG. 3A, identity information control systems 500, 600 in FIGS. 5 and 6) may also thwart the compromised user's credentials from affecting other identity domains. After determining that an unmigrated user's credentials have been compromised in the source identity domain, the system may force the user to update or change their credentials in order to proceed with migration to another identity domain. Regardless of migration, a user may be notified or prompted to update their credentials once a data breach and credentials compromise has been established. In some circumstances, user data/credentials may be validated for compromise by external third parties. For instance, an external third party may maintain a database of credentials, such as compromised accounts database 890 in FIG. 8, known to have been compromised in previous data breaches. In some cases, an external third party may also maintain or support an API, which may allow the system (e.g., system 300-b comprising migrating agent 378 in FIG. 3B, where migrating agent 378 is similar or substantially similar to the migrating agent 878 in FIG. 8) to send identifying information about users to the API in order to validate or check if the identifying information matches with compromised credentials stored in the database. If the external third party (or the API maintained by the third party) returns a match, the system may prompt the user to modify their credentials.

In some cases, one or more migration agents (e.g., shown as migrating agent 878 in FIG. 8) may be inserted or installed in an identity infrastructure (e.g., shown as identity infrastructure 301-a in FIG. 3A). Migration agents may be realized using hardware, firmware, software or a combination thereof. In some cases, a migration agent may be inserted into the dataflow between the user 850 and an identity domain 816. For instance, a migrating or migration agent 878 may be installed in a web application or a web browser, where the migration agent may intercept the web traffic, identify an attempt to change identity data, and respond with one or more prompts (optional) to the user. For example, the migration agent may prompt (e.g., within dataflow 815-d) the user if a password received from the user does not comply with credentials rules in the second identity domain, as further discussed below in relation to FIGS. 8 and 9. In other cases, the migration agent may proxy login traffic, detect a login for a user in a first domain (or a source identity system), determine whether the user is an unmigrated user in a second identity domain (or destination identity system), and provide the necessary prompts to migrate the user to the second domain. In some embodiments, the migration agent may utilize the user id and additional credentials received during the login request to query the source identity system for the user's profile data to, for example, move user identities from the source identity system (e.g., an on-premises identity system or domain) to the destination identity system (e.g., a cloud-based identity domain)

The migration agent 878 (also referred to as migrating agent 878) may also query the destination identity system to check whether a matching user already exists. In some cases, the migration agent 878 may query the destination identity system if the user is attempting to login using the first identity domain. Further, once the migration agent 878 has the credentials for that user (i.e., from the login attempt), it may use the user id/credentials to lookup if a matching user exists in the second or destination identity domain. If not, the migration agent 878 may tag the user as an unmigrated user in the second identity domain. Upon determining that the user is unmigrated in the second identity domain, the migration agent or another agent in the system may check the user credentials for compromise and prompt the user to modify their credentials to comply with credentials rules or policies associated with the second identity domain, if needed. In some embodiments, the system may also prompt the user to set up multi-factor authentication (i.e., additional credentials) for the second identity domain. In some examples, the system may use the updated credentials to create a new user profile for the user in the second identity domain, which may allow the user to access services and resources associated with the second identity domain. In some cases, the migration agent may also query the source identity system (i.e., first identity domain) for the user profile data stored for each user to, for instance, move user identities from the source identity system (e.g., an on-premises identity system or domain) to the destination identity system (e.g., a cloud-based identity domain). In some cases, the user identities or profile data associated with the on-premises identity system may be replicated and used to create user profiles in the destination identity system. Profile data may include one or more of a first name, a last name, email address, alternate email address, phone number, alternate phone number, address, zip code, last 4 digits of Social Security Number (SSN), etc. In some circumstances, profile data may be stored as attributes in a user's record or entry in an identity domain 316.

Additionally, or alternatively, the migration agent 878 may also evaluate compatibility of user data in the first identity domain 816-*a* with a schema used to store user data in the second identity domain 816-*b*. The schema used to store data may be defined by a data store being used for the second identity domain, where the data store may comprise a Lightweight Directory Access Protocol (LDAP) directory (e.g., shown as LDAP 833-*b* in FIG. 8), a relational database, or any other data store known in the art. The schema may define user data attributes required for each user entry, value formats for the attributes, mandatory attribute values, and other rules related to the structure and types of data allowed by the data store. Thus, in some aspects, the system of the present disclosure may accommodate the rules that govern how user data is defined and stored for different identity domains.

In some embodiments, migration agents 878 may also evaluate the suitability of changes or updates in the first identity domain 816-*a* with respect to data sovereignty and regulations (e.g., General Data Protection Regulation (GDPR) in European Union (EU) law) applicable in the second identity domain 816-*b*. It should be noted that, while the present disclosure generally describes one source identity system and one destination identity system, the number of destination identity systems is not intended to be limiting. In other words, different number of destination identity domains (e.g., 2, 3, 6 etc.) may be contemplated in different embodiments, as further described in relation to FIG. 6.

In some cases, identity domains e.g., 816 (i.e., both original and subsequent identity domains) may have divergent abilities to interpret and enforce identity metadata. For example, an original identity domain may support the expression of an authorization rule that is inexpressible in subsequent identity domains. In such cases, the identity infrastructure or the system (e.g., system 100 in FIG. 1, system 300-*a* in FIG. 3A) may comprise orchestrating agents that allow for the interpretation and enforcement of said authorization rules. In one example, administrators of an Active Directory Identity Domain may be able to generate policy rules stating nobody may log in after 9 PM. However, an OKTA Identity Domain may not support expressing or enforcing time-based rules. In this case, the orchestrating agent may interpret and enforce the time-based rules in the OKTA Identity Domain.

In some cases, control of an identity domain (e.g., identity systems 316 seen in FIG. 3A) may refer to the management of identity and meta-identity actions for that identity domain. Specifically, control of an identity domain may involve managing how applications, services, resources, software processes, etc., connect to and integrate with the identity domain. Some non-limiting examples of identity and meta-identity actions may include actions pertaining to the user identities (e.g., performing create-read-update-delete (CRUD) operations on users, user groups, attributes, etc.) and/or actions pertaining to the metadata (e.g., managing policies relating to user administration, i.e., which administrators can perform certain actions; managing authentication and/or authorization policies; managing the deployment and/or configuration of the identity domain/system into the distributed identity management environment or identity infrastructure). In some cases, managing identity actions may comprise managing configurations, policies, etc., within the identity infrastructure, where the identity infrastructure may comprise one or more identity domains (or identity systems). Further, managing identity actions may also comprise controlling the identity system's end points and components with which users interact, such as, but not limited to, an authenticate system (e.g., authenticate system 421 seen in FIG. 4) or authentication server, an access system or authorization server (e.g., access system 423 seen in FIG. 4), a third party Multi Factor Authentication (MFA) system (e.g., MFA 429 seen in FIG. 4), and/or a protected resource (e.g., app 425 seen in FIG. 4), among other system components described herein. In some examples, control of an identity domain may comprise one or more of directly capturing identity data and identity metadata actions, and/or direct control of identity metadata actions via the use of an Application Programming Interface (API), Graphical User Interface (GUI), Graphical Programming Interface, etc., further described in relation to the figures below. In some cases, identity systems/domains 316 may provide one or more APIs to perform CRUD operations on users, groups, and/or attributes, as well as to create and manage policies and configurations in the identity domain. In this way, the behavior of the identity systems may be controlled directly via their APIs. In some other cases, directly controlling identity data and metadata actions may comprise intercepting requests for applications (e.g., protected resources) and services (e.g., cloud service) and directing the user to one of the identity domains for authentication and/or authorization. In some cases, direct control may also entail ensuring that one or more policies (e.g., access policies) are enforced in accordance with the configurations, policy rules, etc., in one or more of the identity domains. In some instances, direct control may involve enforcing configurations and/or policies from multiple identity domains simultaneously.

In some cases, control actions may refer to the actions executed by the identity information control system, such as identity information control system 500 in FIG. 5. An identity information control system may apply actions between identity domains. Additionally, or alternatively, an identity information control system may apply an action to all identity domains, which may facilitate unified identity management in the identity infrastructure. Examples of such actions may include, configuring and managing multiple identity domains and their interactions via a single unifying identity API or GUI; translating identity data and metadata from a first format (e.g., a format used by an originating identity domain) to a second format (e.g., a format used by the identity information control system), and further translating the identity data and metadata from the second format (i.e., the format used by the control system) to a third format (e.g., a format used/readable by a destination identity domain) prior to writing to the destination identity domain; or a combination thereof. Other examples of control actions may also include identifying, notifying, or resolving differences or gaps in identity data and metadata during the translation from the originating to destination identity domain; interacting with an identity domain's public (or published) identity API in order to control the contents and actions of the identity domain; or interacting with an identity domain's non-API interface (e.g., shown as non-API 558 in FIG. 5), where the interacting may comprise sending Hyper Text Transfer Protocol (HTTP) messages to a user interface utilized by administrators and/or users, directly interacting with an identity domain's data stores by inserting, updating, and/or deleting contents of a configuration file, a database or Lightweight Directory Access Protocol (LDAP) directory, or a combination thereof. In some cases, HTTP messages may be sent even if there is an API for the identity domain, which may allow added functionality not possible through the API, for instance. In other words, interacting with the public API and sending HTTP messages are not mutually exclusive, and a combination of the two may be employed in some embodiments. For example, differences in identity data between identity domains may arise due the use of the different formats/syntax (e.g., a first identity domain may store a user id for a user as "uid=jdoe", while a second identity domain may store a user id for the same user as "user_identifier=jdoe@acme.com"). In such cases, the differences between the user id formats in the first and second identity domain may be resolved, for instance, by appending the enterprise email address/domain (@acme.com) to the user id (jdoe) before migrating to the destination identity domain. In other cases, there may be gaps between different identity domains, for instance, when a first identity domain/system comprises a policy "admin users may only access the HR app during normal business hours", while the second identity domain does not have the ability to enforce such a policy. In such cases, the identity information control system 500 may resolve the policy differences and enforce the first policy on behalf of the second identity domain.

In some embodiments, configuration changes may be centrally managed and propagated to each identity domain in an identity infrastructure via a unifying API and/or GUI (e.g., shown as API 559 in FIG. 5). Further, changes in one identity domain may be detected, and equivalent changes made in peer identity domains (e.g., additional destination identity domains/systems in the identity infrastructure, such as third and fourth identity domains 316-c and 316-d in FIG. 3A). In some cases, making equivalent changes in peer identity domains may involve translating concepts between said identity domains. As an example, translating concepts between identity domains may involve translating identity information (e.g., "uid=jdoe") from one identity domain, that would otherwise be incompatible in a second identity domain (e.g., which only accepts user id's in the format, "user_identifier=jdoe@acme.com"), such that it can be used in the second identity domain. Additionally, or alternatively, configuration changes made in one identity domain may be communicated and translated for use in another relevant identity domain. In some cases, the configuration changes may relate to one or more of identity data, identity metadata, access policies, and data rules. In some cases, each identity system/domain may store its configurations in a database or server (e.g., LDAP, identity SQL database), in identity domain-specific configuration files, or any other applicable identity domain element. In some cases, the identity infrastructure control system (e.g., system 300-a in FIG. 3, identity infrastructure control system 500 in FIG. 5) may or may not itself store the configurations for the different identity domains. In either case, the identity infrastructure control system may maintain knowledge, for instance, through its own configurations, of where and how to modify the configurations for the different identity domains (e.g., first identity domain 516-a, second identity domain 516-b in FIG. 5). Thus, one or more of identity data, identity metadata, access policies, and data rules for multiple identity domains may be controlled via a single identity infrastructure control system, further described in relation to the figures below.

FIG. 1 illustrates a system 100 configured for controlling identity information across multiple identity domains in a distributed identity infrastructure (e.g., shown as identity infrastructure 301-a in FIG. 3A), in accordance with one or more implementations. In some implementations, system 100 may include one or more servers 102. Server(s) 102 may be configured to communicate with one or more client computing platforms 104 according to a client/server architecture and/or other architectures. Client computing platform(s) 104 may be configured to communicate with other client computing platforms via server(s) 102 and/or according to a peer-to-peer architecture and/or other architectures. Users may access system 100 via client computing platform(s) 104. In some cases, the system 100 may implement one or more aspects of any of systems 300-a, 300-b, 500, and 600 described in relation to FIGS. 3A, 3B, 5, and 6, respectively.

Server(s) 102 may be configured by machine-readable instructions 106. Machine-readable instructions 106 may include one or more instruction modules. The instruction modules may include computer program modules. The instruction modules may include one or more of identity information transmittal module 108, identity information control system module 110, identity information sending module 112, identity information replacing module 114, identity information changing module 116, portion identifying module 118, and/or other instruction modules.

In some implementations, server(s) 102, client computing platform(s) 104, and/or external resources 126 may be operatively linked via one or more electronic communication links. For example, such electronic communication links may be established, at least in part, via a network 150 such as the Internet and/or other networks. It will be appreciated that this is not intended to be limiting, and that the scope of this disclosure includes implementations in which server(s) 102, client computing platform(s) 104, and/or external resources 126 may be operatively linked via some other communication media.

A given client computing platform 104 may include one or more processors configured to execute computer program modules. The computer program modules may be configured to enable a user associated with the given client computing platform 104 to interface with system 100 and/or external resources 126, and/or provide other functionality attributed herein to client computing platform(s) 104. By way of non-limiting example, the given client computing platform 104 may include one or more of a desktop computer, a laptop computer, a handheld computer, a tablet computing platform, a NetBook, a Smartphone, a gaming console, and/or other computing platforms.

External resources 126 may include sources of information outside of system 100, external entities participating with system 100, and/or other resources. In some implementations, some or all of the functionality attributed herein to external resources 126 may be provided by resources included in system 100.

Identity information transmittal module 108 may be configured to transmit first identity information from a first identity domain (e.g., shown as identity domain or identity system 316-a in FIG. 3A) to an identity information control system (e.g., shown as identity information control system 300-a). In some cases, one or more changes may be made to at least a portion of the first identity information in the first identity domain, for instance, by a system administrator. In one non-limiting example, changing at least a portion of the first identity information in the first identity domain may include changing a configuration of the first identity domain, for instance, changing how identity information in the first identity domain may be changed/updated. For example, changing a configuration of the first identity domain may comprise creating a new rule (i.e., identity metadata) that automatically moves a user from one group membership (e.g., marketing group) to another (e.g., sales group). In such cases, the identity data/information associated with the user may also be modified. In some examples, the first identity information may include a first format and may include at least one of identity data and identity metadata. By way of non-limiting example, the identity data may include data related to at least one of authentication or authorization requests, adding users, setting and reading user attributes, a user identity, a user credential, and a user attribute for one or more individual users of one or more identity domains, including at least the first identity domain. By way of non-limiting example, the identity metadata may include data related to at least one of setting and reading access policies, password rules, data locations (e.g., a location where identity data and/or identity metadata is stored, could be a geographic region, such as the United States; a particular data center; on-premises or in the cloud, to name a few non-limiting examples), an authorization policy, an authentication policy, a trust policy, data rules (e.g., rule indicating which administrators can create or modify certain identity data or identity metadata; rule indicating in which identity repository certain identity data or metadata must be stored; rule indicating in which geographic region/data center certain identity data or metadata must be stored; how identity data or metadata may be classified, for instance, public or private, etc.), user schema groups (e.g., structure, form, and/or syntax of identity data), group types and composition (description of group, membership of group), and network locations (e.g., HTTP address, URL, FTP address, network address, such as an IP address, a MAC address, to name a few non-limiting examples) for elements of the one or more identity domains.

Identity information control system module 110 may be configured to use the identity information control system to translate the first identity information from the first format to a second format and from the second format to a third format. Using the identity information control system (e.g., shown as identity information control system 300-a) to translate the first identity information from the first format to the second format, and from the second format to the third format may include interacting with a non-API based interface (e.g., shown as non-API 558 in FIG. 5) at one or more identity domains. In some cases, the identity information control system may comprise a non-API module (e.g., shown as non-API module 376 in FIG. 3B) to enable such interactions. One example of a non-API interface may include the use of HTTP messages in conjunction with a user interface utilized by administrators or users. In some other cases, using the identity information control system to translate the first identity information from the first format to the second format, and from the second format to the third format may include using at least one of an Application Programming Interface (API), a Graphical User Interface (GUI), and/or a Graphical Programming Interface to translate the first identity information between formats. The first format may include a format used by the first identity domain. In yet other cases, using the identity information control system to translate the first identity information from the first format to the second format, and from the second format to the third format may include interacting with one or more data stores (e.g., LDAP data store) at the first identity domain and/or second identity domain. By way of non-limiting example, interacting with one or more data stores at the first identity domain and second identity domain may include one or more of inserting, updating, and deleting contents of at least one of a configuration file, a database, and a LDAP directory server.

Identity information control system module 110 may be configured to identify one or more missing portions in at least one of the first identity information and second identity information prior to translating the first identity information from the first format to a second format and from the second format to a third format. As described above in paragraph, different identity systems/domains may be associated with different configurations or policy structures. Further, some identity information (e.g., first identity information) may have extra elements, datafields, etc., which may not be supported by the configurations/policy structure of the second identity domain. This extra information associated with the first identity information may be referred to as a "missing portion" in the second identity information. Additionally, or alternatively, identity information control system module 110 may be configured to issue a notification (e.g., to one or more administrators in one or more of the first and second identity domains) related to the one or more missing portions in at least one of the first identity information and second identity information prior to translating the first identity information from the first format to a second format and from the second format to a third format. In some cases, these differences (i.e., missing portions) may be remediated or resolved autonomously by the identity information control system module 110 (or any other of the other modules described herein). In other cases, administrator intervention may be relied upon to resolve the differences. In some cases, the notification issued to the administrator(s) of one or both of the identity domains may include an indication of whether the differences may be resolved automatically or not. In some examples, the identity information control system module 110 may utilize configuration information that it maintains for the different identity domains, for example, through its own configurations to resolve said differences. In some cases, the identity information control system module 110 may maintain information related to the differences between the two identity domains, for example, between the authentication policies supported by each identity domain. In one limiting example, the second identity domain may only support a less robust authentication policy (e.g., username and password), while the first identity domain may support a stronger authentication policy (e.g., multi-factor authentication, in addition to username/pas sword). In such cases, the identity information control system module 110 may be configured to enforce the stronger authentication policy on behalf of the second identity domain. Thus, the identity information control system module 110 may be configured to resolve the missing portions in at least one of the first identity information and second identity information prior to (or during) using the identity information control system to translate the first identity information from the first format to the second and third formats. In some embodiments, the first identity information and the second identity information may include at least one of identity data and identity metadata. Furthermore, the second format may include a format used by the identity information control system. In some cases, the third format may include a format used by the second identity domain. In some cases, the at least one of the API and Graphical Programming Interface may include one or more public APIs linked to the destination identity domain (e.g., second identity domain).

The identity data and identity metadata may include at least one of data related to third-party software application(s) (e.g., a third-party MFA system) that interact with the multiple identity domains, including at least the second identity domain. Additionally, or alternatively, the identity data and/or identity metadata may include data related to identity infrastructure end points, as well as components which interact with users of the multiple identity domains. In some embodiments, such components may be realized using hardware, software, firmware, or a combination thereof. Some non-limiting examples of identity infrastructure end points and/or components which interact with users of the multiple identity domains may include identity data stores, third party MFA (e.g., MFA 429 in FIG. 4), threat intelligence (e.g., risk system 424 in FIG. 4, compromised accounts database 890 in FIG. 8 that receives information from a third party intelligence service, such as haveibeenpwned), and risk providers (e.g., shown as risk system 424 and API 427-*b* in FIG. 4).

In some cases, identity data and identity metadata group types may include one or more of static and dynamic groups. Further, the group composition for the static and/or dynamic groups may include one or more of membership rules and assignment policy. In some cases, such as in LDAP systems (e.g., an Azure Active Directory (AD) server supporting LDAP), groups are generally one of two types—static or dynamic. A static group configuration may contain a list of users. In LDAP, a static group (e.g., a marketing group comprising a list of employees in the marketing division of a company) may be implemented with an Object class 'groupOfUniqueNames', where the Object class contains one or more 'uniqueMember' attributes, such as a group name attribute (e.g., marketing). Generally, in static groups, members do not share a common attribute except for the group name attribute. Further, static groups may enumerate their members (also referred to as member objects) explicitly. In some cases, members or users may need to be manually added or removed from static groups. Contrastingly, in a dynamic group configuration, a user entry for a user may contain a list of groups the user belongs to. Further, each user entry in a dynamic group configuration (e.g., for a marketing group) may contain an attribute which lists group membership (e.g., user A is in marketing group and sales group, user B is in marketing group). In such cases, the dynamic group may automatically update when a group membership attribute is updated for a user. For instance, if the group membership attribute for user A is updated to remove 'marketing', a search query for employees in the marketing division may not comprise an entry for user A. Further, if a new user C is added with a marketing group membership attribute, a search query for employees in the marketing division may comprise an entry for users B and C.

Identity information sending module 112 may be configured to send the first identity information in the third format from the identity information control system to a second identity domain. The second identity domain may include a plurality of second identity domains. Said another way, the number of identity domains is not intended to be limiting. For example, more than two identity domains (i.e., one or more originating identity domains and one or more destination identity domains) are contemplated in different embodiments, further described in relation to the figures below, including at least FIG. 6. Although not necessary, in some examples, the plurality of first and/or second identity domains may reside in two or more network clouds, with at least one of the two or more network clouds including a private cloud and at least one of the two or more network clouds including a public cloud.

Identity information replacing module 114 may be configured to replace second identity information in the second identity domain with the first identity information. In other cases, the identity information replacing module 114 may be configured to synchronize the second identity information in the second identity domain with the first identity information from the first identity domain.

Identity information changing module 116 may be configured to change or update at least a portion of the first identity information in the first identity domain from first data (i.e., an old or previous version of first identity information data) to second data (i.e., new or updated version of first identity information data). In some cases, the identity information changing module 116 may be configured to detect the change in the at least a portion of the first identity information prior to transmitting the first identity information from the first identity domain to the identity information control system. In some cases, the identity information changing module 116 may work in conjunction with the identity information replacing module 114, or any of the other modules described herein. In some examples, replacing second identity information in the second identity domain with the first identity information may include changing the second identity information to data comprising third data. In some examples, the third data may include data equivalent to the second data. As an example, a user may update their residential address (e.g., first identity information) in the first identity domain from first data (e.g., 3673 Iris Avenue, Boulder, Colo.) to second data (e.g., 554 Harvard Ln, Apt 8, Denver Colo.). In some cases, the residential address for the user in the second identity domain may also need to be updated or synchronized to correspond to the second data. In one non-limiting example, the residential address for the user in the second identity domain may need to be stored in a different format, for instance, Apt 8, 555 Harvard Lane, Denver, Denver County, Colo., 80201. As seen, the residential address requirements (i.e., user attributes requirements) in the second identity domain may not only require that the apartment number (if any) be indicated before the street address, but also require an indication of the county (e.g., Denver County). In this example, replacing second identity information in the second identity domain may include changing the second identity information to data comprising third data, where the third data may be equivalent to the second data but may additionally include County data. Further, the third data may be in a different format from the second data.

In some examples, the first identity information (e.g., original first identity information) may be equivalent or similar to the second identity information. As an example, in the first identity domain may comprise a user attribute and value, "department=finance", while the second identity domain may comprise a user attribute and value, "cost-center=Chief Financial Officer (CFO)", and the user attribute/values in the first and second identity domains may be different, yet similar (e.g., their connection with finance). In such cases, a high-level (or broad) user access policy may be created that states that "only users in a finance job function can access the financials app". Further, for the two different identity domains, a narrower access policy expression may be defined where "department=finance" or "cost-center=CFO". In some embodiments, the identity information control system (e.g., shown as identity information control system 500 in FIG. 5) may be used to express a configuration that translates the two narrower access policy expressions, for example, or disambiguates when each different user attribute/value combination (i.e., department=finance, cost center=CFO) may be used to determine access to the financials app.

Portion identifying module 118 may be configured to identify one or more missing portions in at least one of the first identity information and second identity information. In some cases, the portion identifying module 118 (or another module) may be configured to issue a notification to one or more of the first and second identity domains based on identifying the one or more missing portions. For instance, the portion identifying module 118 may issue a notification (e.g., using an API or non-API) to an administrator or user associated with the respective identity domain based on the identifying.

In some implementations, communication using the non-API based interface may include sending HTTP messages to a user interface for at least one of an administrator and a user. In some cases, the identity infrastructure control system, such as system 300-*a* in FIG. 3A, may communicate with one or more identity domains, such as the second identity domain, using the non-API based interface. The non-API based interface may be associated with the first or second identity domain.

In some implementations, server(s) 102, client computing platform(s) 104, and/or external resources 120 may be operatively linked via one or more electronic communication links. For example, such electronic communication links may be established, at least in part, via a network 150 such as the Internet and/or other networks. It will be appreciated that this is not intended to be limiting, and that the scope of this disclosure includes implementations in which server(s) 102, client computing platform(s) 104, and/or external resources 120 may be operatively linked via some other communication media.

External resources 120 may include sources of information outside of system 100, external entities participating with system 100, and/or other resources. In some implementations, some or all of the functionality attributed herein to external resources 120 may be provided by resources included in system 100.

Server(s) 102 may include electronic storage 122, one or more processors 124, and/or other components. Server(s) 102 may include communication lines, or ports to enable the exchange of information with a network and/or other computing platforms. Illustration of server(s) 102 in FIG. 1 is not intended to be limiting. Server(s) 102 may include a plurality of hardware, software, and/or firmware components operating together to provide the functionality attributed herein to server(s) 102. For example, server(s) 102 may be implemented by a cloud of computing platforms operating together as server(s) 102.

Electronic storage 122 may comprise non-transitory storage media that electronically stores information. The electronic storage media of electronic storage 122 may include one or both of system storage that is provided integrally (i.e., substantially non-removable) with server(s) 102 and/or removable storage that is removably connectable to server(s) 102 via, for example, a port (e.g., a USB port, a firewire port, etc.) or a drive (e.g., a disk drive, etc.). Electronic storage 122 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. Electronic storage 122 may include one or more virtual storage resources (e.g., cloud storage, a virtual private network, and/or other virtual storage resources). Electronic storage 122 may store software algorithms, information determined by processor(s) 124, information received from server(s) 102, information received from client computing platform(s) 104, and/or other information that enables server(s) 102 to function as described herein.

Processor(s) 124 may be configured to provide information processing capabilities in server(s) 102. As such, processor(s) 124 may include one or more of a digital processor, an analog processor, a digital circuit designed to process information, an analog circuit designed to process information, a state machine, and/or other mechanisms for electronically processing information. Although processor(s) 124 is shown in FIG. 1 as a single entity, this is for illustrative purposes only. In some implementations, processor(s) 124 may include a plurality of processing units. These processing units may be physically located within the same device, or processor(s) 124 may represent processing functionality of a plurality of devices operating in coordination. Processor(s) 124 may be configured to execute modules 108, 110, 112, 114, 116, and/or 118, and/or other modules. Processor(s) 124 may be configured to execute modules 108, 110, 112, 114, 116, and/or 118, and/or other modules by software; hardware; firmware; some combination of software, hardware, and/or firmware; and/or other mechanisms for configuring processing capabilities on processor(s) 124. As used herein, the term "module" may refer to any component or set of components that perform the functionality attributed to the module. This may include one or more physical processors during execution of processor readable instructions, the processor readable instructions, circuitry, hardware, storage media, or any other components.

It should be appreciated that although modules 108, 110, 112, 114, 116, and/or 118 are illustrated in FIG. 1 as being implemented within a single processing unit, in implementations in which processor(s) 124 includes multiple processing units, one or more of modules 108, 110, 112, 114, 116, and/or 118 may be implemented remotely from the other modules. The description of the functionality provided by the different modules 108, 110, 112, 114, 116, and/or 118 described below is for illustrative purposes, and is not intended to be limiting, as any of modules 108, 110, 112, 114, 116, and/or 118 may provide more or less functionality than is described. For example, one or more of modules 108, 110, 112, 114, 116, and/or 118 may be eliminated, and some or all of its functionality may be provided by other ones of modules 108, 110, 112, 114, 116, and/or 118. As another example, processor(s) 124 may be configured to execute one or more additional modules that may perform some or all of the functionality attributed below to one of modules 108, 110, 112, 114, 116, and/or 118.

Figure 2:
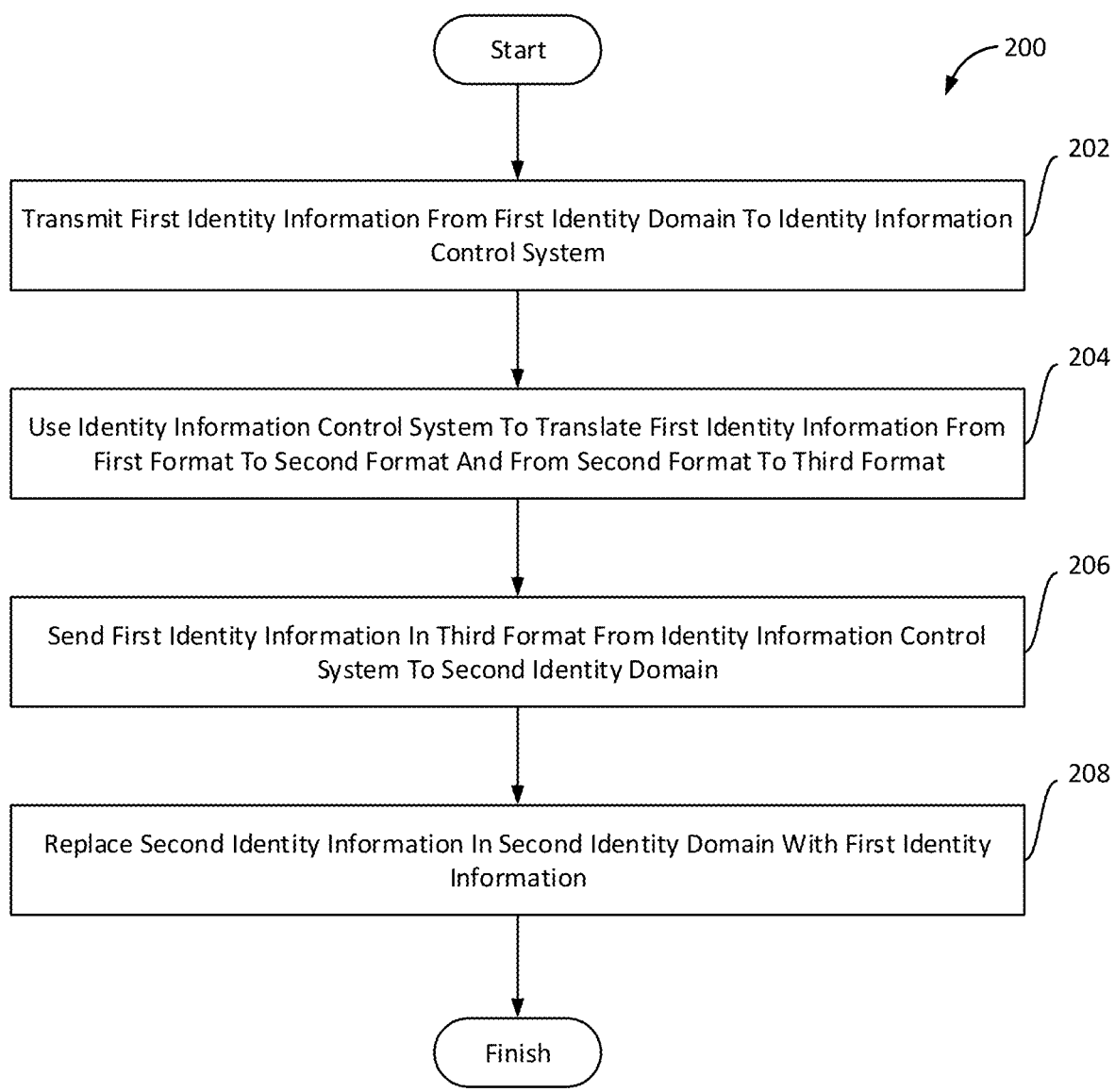
FIG. 2 illustrates a method for controlling identity information across multiple identity domains in a distributed identity infrastructure, in accordance with one or more implementations.

FIG. 2 illustrates a method 200 for controlling identity information across multiple identity domains in a distributed identity infrastructure, in accordance with one or more implementations. The operations of method 200 presented below are intended to be illustrative. In some implementations, method 200 may be accomplished with one or more additional operations not described, and/or without one or more of the operations discussed. Additionally, the order in which the operations of method 200 are illustrated in FIG. 2 and described below is not intended to be limiting.

In some implementations, method 200 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 200 in response to instructions stored electronically on an electronic storage medium. The one or more processing devices may include one or more devices configured through hardware, firmware, and/or software to be specifically designed for execution of one or more of the operations of method 200.

A first operation 202 may include transmitting first identity information from a first identity domain to an identity information control system. The first identity information may include a first format. First operation 202 may be performed by one or more hardware processors configured by machine-readable instructions including a module that is the same as or similar to identity information transmittal module 108, in accordance with one or more implementations.

A second operation 204 may include using the identity information control system to translate the first identity information from the first format to a second format, and from the second format to a third format. Second operation 204 may be performed by one or more hardware processors configured by machine-readable instructions including a module that is the same as or similar to identity information control system using module 110, in accordance with one or more implementations.

A third operation 206 may include sending the first identity information in the third format from the identity information control system to a second identity domain. Third operation 206 may be performed by one or more hardware processors configured by machine-readable instructions including a module that is the same as or similar to identity information sending module 112, in accordance with one or more implementations.

A fourth operation 208 may include replacing second identity information in the second identity domain with the first identity information. Fourth operation 208 may be performed by one or more hardware processors configured by machine-readable instructions including a module that is the same as or similar to identity information replacing module 114, in accordance with one or more implementations.

FIG. 3A illustrates identity infrastructure 301-a within a distributed identity management environment, according to an embodiment of the disclosure. In some cases, the identity infrastructure 301-a may comprise one or more identity infrastructure elements 316 which may comprise or otherwise be associated with one or more identity domains, also referred to as identity management systems. For example, each of the one or more identity infrastructure elements 316, also referred to herein as identity systems 316 or identity domains 316, may be associated with one identity domain of the one or more identity domains. Alternatively, multiple identity infrastructure elements 316 may be associated with a single identity domain.

In some examples, the identity infrastructure 301-a may be deployed by a single client organization or enterprise. In some cases, at least a portion of the identity infrastructure elements 316 may be associated with one or more cloud computing platforms. For instance, a client organization may utilize the cloud computing platforms for running applications ("apps") used by the client organization's workforce (e.g., a Customer Relationship Management (CRM) app, such as SALESFORCE provided by Salesforce.com, Inc., of San Francisco, Calif., an accounting app, project management app, an app or software used by their HR department, to name a few non-limiting examples) and/or the client organization's customers (e.g., a customer self-service portal used by customers of a wireless provider or internet-cable company). The identity infrastructure 301-a may include one or more identity domains and the one or more identity infrastructure elements 316. The one or more identity domains may further comprise one or more identity domain elements. The one or more identity domain elements may comprise hardware (e.g., servers, computing devices or platforms, etc.), software (e.g., a cloud service), or a combination thereof. It is contemplated that the identity infrastructure may comprise more than one identity domain. However, it is further contemplated that an identity domain may not be subordinate to an identity infrastructure. Each identity domain may comprise domain elements which include the components that make up the identity domain. The components of the identity domain may include the identity data or metadata that may be discovered, further described herein.

In some cases, the distributed identity management environment may comprise a system 300-a configured for controlling identity information across identity domains in the distributed identity infrastructure 301-a. System 300-a may be similar or substantially similar to the system 100 described in relation to FIG. 1 and elsewhere herein. In some embodiments, the system 300-a may comprise a centralized server, or may be implemented using a server (e.g., the system 300-a may be hosted on a server), where the server may be utilized for unified management of identity information in the identity infrastructure. In some other cases, the server or system 300-a may manage multiple distributed identity management environments, each distributed identity management environment associated with at least one enterprise or organization and comprising one or more identity infrastructure elements. For instance, the server (or system 300-a) may be located in the cloud (i.e., not exclusive to a single client) and may simultaneously discover, assess, and manage identity infrastructure elements across multiple distributed identity management environments via the cloud. Alternatively, the identity infrastructure and/or disparate identity domains (e.g., cloud-based, on-premises, etc.) for each client organization or enterprise may be assessed via an existing identity infrastructure element (e.g., identity infrastructure element 316-a, which may be an example of an on-premises Apache or Nginx server).

In some embodiments, protected resources (e.g., applications or apps) may be distributed across multiple on premises and/or cloud platforms. For instance, a company or organization may comprise first apps 325-a deployed on a first on-premises platform (e.g., identity system 316-a), second apps 325-b deployed on a first cloud platform (e.g., identity system 316-b), third apps 325-c deployed on a second cloud platform (e.g., identity system 316-c), fourth apps 325-d deployed on a third cloud platform (e.g., identity system 316-d), fifth apps 325-e deployed on a fourth cloud platform (e.g., identity system 316-e), and sixth apps 325-f deployed on a fifth cloud platform (e.g., identity system 316-f). In some cases, each platform (e.g., on-premises, cloud platform) may be associated with a unique identity infrastructure and management system (e.g., unique identity domain). For instance, each platform may be associated with a unique set of identity infrastructure elements 316. In some circumstances, each of the one or more identity infrastructure elements 316 may comprise varying configurations and/or behaviors. Some non-limiting examples of identity infrastructure elements 316 installed in the identity infrastructure include servers, routers, identity stores, policy enforcement points (PEPs), authentication points, proxies or proxy devices, policy decision points (PDPs), etc., further described below. In some examples, the identity policies comprise at least one of authorization rules and mechanisms and authentication rules and mechanisms. Further, the identity data may be utilized to access and control the one or more protected resources.

In some cases, assessment of identity resources or identity infrastructure elements in an identity infrastructure may begin by the introduction of workers and/or proxies into the identity infrastructure. These workers and/or proxies may comprise discovery agents, e.g., discovery agent 305-*a* installed on or adjacent to identity infrastructure element 316-*a* in FIG. 3A, to assist in the detection and assessment of the identity information, such as identity data and identity metadata, stored within the identity infrastructure elements. A discovery agent may refer to an entity (e.g., autonomous or semi-autonomous software entity) that is capable of assessing identity information within an identity infrastructure. Non-limiting examples of identity information comprises identity data, identity metadata, contents of identity sessions, protected resources (e.g., applications or apps), and the configuration and deployment of software and hardware entities (e.g., identity domain elements) that make up an identity domain. A protected resource comprises an element or application of the identity infrastructure to which access and control is allowed or restricted based at least in part on identity data and/or metadata. An autonomous or semi-autonomous discovery agent comprises a discovery agent that may undertake different actions, depending on the component within the identity domain the discovery agent is interacting with. For example, a discovery agent interacting with a web server may undertake different actions to understand the identity data associated with the web server as compared to the actions undertaken by a discovery agent deployed to interact with an identity data store, also referred to herein as a data store or simply a "store". Together, one or more autonomous or semi-autonomous discovery agent may need to understand the collection of unique identity data or metadata utilized by each autonomously operating components (web server, data store) in the identity infrastructure 301-*a* to build a complete picture of the distributed components and data of an identity domain and the identity infrastructure.

It is contemplated that at least one discovery agent may be deployed at the beginning of a discovery process, which may be a precursor to the migration process. In such a scenario, the discovery agent may be installed on a computing devices (e.g., a server) adjacent to or part of the identity domain elements (e.g., discovery agent 305-*a* installed on or adjacent to identity infrastructure element 316-*a* in FIG. 3A). As different elements of the identity domain are discovered, additional discovery agents may be installed on different servers adjacent to the different elements.

In some cases, one or more discovery agents 305 may be installed within the identity infrastructure 301-*a*. In some examples, the discovery agents 305 may report information about the identity infrastructure to another agent or module, for instance, the identity information control system module 110 previously described in relation to FIG. 1. Such information may comprise a list of identity infrastructure elements which includes network location (e.g., IP address), configuration information (e.g., information about the server hosts where web agents are installed and how they are configured to protect one or more application resources, how a LDAP identity store is configured to authenticate LDAP clients) for the various identity infrastructure elements 316, information pertaining to how the infrastructure elements communicate with each other and/or other devices in the architecture, information pertaining to the types of authentication and authorization mechanisms supported (or required) by the infrastructure elements 316, and/or what metadata the infrastructure elements 316 use, such as authentication or authorization policies, password policies, etc. Additionally, or alternatively, discovery agents may also collect identity data and metadata from the elements in an identity infrastructure. Such identity data and metadata includes identity system configuration data (e.g., policies within the identity system; an inventory of web agents or proxies along with where they are deployed and/or how to securely communicate with them; information related to various identity stores, attributes stores, and other directories and databases that are deployed, such as those described in relation to FIGS. 4 and 5, and how to securely communicate with them, perform CRUD operations against those identity data stores, etc.) and user identity attributes (both of which may be located in some predefined store), generated data such as log files (which is created as activity happens in the identity system), and real-time data such as a user making a request through his/her browser to an application (this real-time data travels over the network, changes frequently, and may be stored in ephemeral, in-memory data storage). In some examples, the discovery agents may access this ephemeral, in-memory data storage. Some non-limiting examples of user identity attributes include names, emails, phone numbers, addresses, job titles, job functions, departments, etc. By way of a non-limiting example, the identity data may include one or more of a user identity, a user credential, and a user identity attribute (also referred to as user attribute) for one or more individual users of the one or more identity domains. Such attributes may comprise name, address, and group associations. By way of non-limiting example, the identity metadata may include one or more of a password rule, an authorization policy, an authentication policy, a trust policy, and network locations (e.g., HTTP address, URL, FTP address, network address, such as an IP address, a MAC address, to name a few non-limiting examples) for identity domain elements (e.g., software and/or hardware entities that make up an identity domain, may include one or more of servers, computing devices or platforms, software, such as cloud service software, etc.) of the one or more identity domains. By way of non-limiting example, the one or more configurations may include at least one of the identity data and metadata that may be stored within the identity infrastructure elements, information related to a flow of data associated with the one or more infrastructure elements, and behavior of the one or more identity infrastructure elements. As an example, if a user is attempting to access a protected resource, a request may be sent to a corresponding identity infrastructure element. If the request arrives without an identity session, the user may be redirected to a login page for a corresponding identity domain, where the user is prompted for login credentials (e.g., a user identity, a user credential, a user attribute, etc.). The login credentials may be received within a dataflow 315, where the dataflow 315 may be linked to an identity session. After the identity session is established, the user may be redirected to the protected resource.

As shown, a first discovery agent element 305-*a* may be installed on or near an identify infrastructure element 316-*a* (e.g., an Apache or NGINX server). In some examples, the system 300-*a* may comprise at least one module 328, which may be an example of a connecting agent, a migrating agent, a synchronizing agent, an identity information transmittal module, an identity information control system module, an identity information sending module, an identity information replacing module, an identity information changing module, a portion identifying module, etc., described in relation to FIG. 1 and elsewhere in the disclosure. The system 300-a and the at least one module 328 may control identity information across the multiple identity domains in the distributed identity infrastructure 301-a. Additionally or alternatively, the system 300-a and the at least one module 328 may manage at least a portion of the one or more identity domains, migrate identity information across identity domains, replicate user profiles and/or identity information and create user profiles in different identity domains based on the replicating, manage a plurality of identity session formats and identity data, process identity sessions and/or identity data, and provide access to protected resources based at least in part on the processing, to name a few non-limiting examples. In some cases, the system 300-a and the at least one module 328 may also assess the identity infrastructure 301-a by the at least one discovery agent element 305-a. In some cases, additional discovery agent elements 305 (e.g., discovery agent element 305-b, 305-c, etc.) may be spawned. It should be noted that the dash-dot lines for the discovery agent elements 305-b, 305-c, 305-d, 305-e, and 305-f indicate that they are optional.

In some cases, assessing the identity infrastructure 301-a may comprise one or more of identifying the one or more infrastructure elements 316 within the identity infrastructure, intercepting network traffic in the identity infrastructure, assessing a status and structure of the identity infrastructure, detecting and assessing one or more configurations of the one or more infrastructure elements installed in the identity infrastructure, and/or detecting and assessing protected resources, such as apps 325, within the identity infrastructure. For example, after collecting data from the one or more discovery agents, the module 328 may determine which types of access had been granted on a resource, for which users, as the result of the evaluation of certain policies, and in conjunction with authentication by a particular identity domain. This evaluation may represent the "status" of the identity infrastructure. In some cases, the system 300-a may comprise a configuration detection module (e.g., shown as configuration detection module 372 in FIG. 3B), where the configuration detection module may detect and assess one or more configurations of the one or more infrastructure elements installed in the identity infrastructure based at least in part on the identifying the one or more infrastructure elements. By way of non-limiting example, the one or more configurations may include at least one of the identity data and metadata that may be stored within the identity infrastructure elements, information related to a flow of data associated with the one or more infrastructure elements, and behavior of the one or more identity infrastructure elements. As an example, if a user is attempting to access a protected resource, a request may be sent to a corresponding identity infrastructure element. If the request arrives without an identity session, the user may be redirected to a login page for a corresponding identity domain, where the user is prompted for login credentials (e.g., a user identity, a user credential, a user attribute, etc.). The login credentials may be received as a dataflow 315, where the dataflow 315 may be linked to an identity session. After the identity session is established, the user may be redirected to the protected resource. In some cases, establishing the identity session may comprise accepting the identity session by the protected resource, where the accepting comprises evaluating the identity session and/or identity data (e.g., login credentials). In this example, the discovery agent element 305-a may detect and assess the network and/or identity traffic as it is routed to the protected resource (e.g., resource or app 325-a), for instance, to identify the type of information a successful request contains, to identify how and where unsuccessful requests are routed, etc. A successful request may refer to a request where a user gains access to the protected resource. Contrastingly, an unsuccessful request may refer to a request where the user is denied access to the protected resource.

As noted above, the one or more infrastructure elements 316 installed in the identity infrastructure may include one or more of servers, routers, identity stores comprising one or more databases of authentication information, policy enforcement points for enforcing authorization rules, authentication points for determining user identity, proxy devices or proxies, policy decision points for evaluating authorization rules, and/or protected resources, to name a few non-limiting examples. In some cases, the discovery agent element 305-a may identify at least a portion of these identity infrastructure elements. For instance, in one non-limiting example, the discovery agent may identify that the infrastructure element 316-a comprises a server and an identity store, the infrastructure element 316-b comprises a policy enforcement point and a policy decision point, and the infrastructure element 316-c comprises an authentication point. In another example, the discovery agent may identify that the infrastructure element 316-a is associated with an on-premises identity domain, such as Symantec SiteMinder provided by Broadcom, Inc., of San Jose, Calif., and may comprise one or more of Lightweight Directory Access Protocol (LDAP), Active Directory, SQL databases, APIs, and apps-based data. Further, the discovery agent may identify that the infrastructure element 316-b is associated with a cloud-based identity system, such as Azure AD provided by Microsoft Corporation of Redmond, Wash., Okta provided by Okta, Inc., of San Francisco, Calif., etc. In some embodiments, the discovery agent element 305 may report this information to the system 300-a or any of the other modules described in relation to FIG. 1.

In some cases, each of the dashed lines represents a dataflow 315 (e.g., flow of network traffic). As used herein, the terms "dataflow" or "data flow" may refer to a path for data to move from different parts of the distributed identity management environment. For instance, dataflow may refer to a path for data to move between different identity infrastructure elements 316, between different discovery agent elements 305, and/or between a discovery agent element 305 and the system 300-a, to name a few non-limiting examples. In some examples, a dataflow may represent a single data element (e.g., username, password, date of birth, Social Security Number (SSN), etc.). Alternatively, a dataflow may represent a set of data elements (e.g., a data structure comprising a username and password, where the password may or may not be hashed). In some aspects, dataflows may help reusability of the underlying data elements, for instance, between different identity infrastructure elements within the identity infrastructure.

In some cases, the one or more dataflows 315 may pertain to identity data or identity metadata requests from the one or more infrastructure elements 316 and/or the system 300-a within the identity infrastructure 301-a. In some cases, the at least one discovery agent element 305 (e.g., discovery agent element 305-a) or another module (e.g., module 328) may intercept first network traffic (e.g., a dataflow 315) in the identity infrastructure, where the first network traffic may include one or more of requests for identity data and identity metadata from the one or more infrastructure elements 316.

In some cases, the identity data and/or identity metadata may be stored within the one or more identity infrastructure elements. Returning to the example above, the discovery agent element 305-a may intercept network traffic, such as a request for identity data or identity metadata, between the infrastructure element 316-c (i.e., comprising an authentication point) and the infrastructure element 316-a (i.e., comprising a server and an identity store), for instance, for determining user identity. In some other cases, the one or more dataflows 315 may pertain to user credentials information (e.g., within a login request), verification information (e.g., for user credentials, user identifier, etc.), user profile data for one or more users, modified user data (e.g., if user data is compromised), etc.

In some cases, one or more connecting agents (e.g., module 328 in FIG. 3A) or other proxy agents or elements may communicate identity data and/or identity metadata across identity domain boundaries (i.e., between disparate identity domains). Communication across identity domain boundaries may be facilitated by the transformation of the data between different formats (e.g., Kerberos, OAuth/OpenID Connect, Username/Password, Header-based, HTTP Basic Authentication, HTTP Digest Authentication, and Cookie-based, to name a few non-limiting examples). Additionally or alternatively, communication across identity domain boundaries may involve mapping of data elements for each domain (e.g., Domain 1 includes the elements street number, city, zip code; and Domain 2 includes street name, city, state, country, zone), communication of implicit/explicit policy information (e.g., Security Assertion Markup Language (SAML) communicating group membership, which may then be used to evaluate associated policies or geographic information about the originating request), and establishing and acting upon the trust mechanisms required for said communication. Trust between two or more entities may be established using a mechanism, such as Public Key Infrastructure (PKI). In other cases, trust may be established by implementing one or more standard specific configurations and/or by using authentication security and access controls mandated by an identity domain (e.g., a shared secret, API key, etc.). Some non-limiting examples of standards include OAuth, OpenID Connect, and SAML.

In some examples, the module 328 may be an example of an orchestrating agent. An orchestrating agent may direct flow of identity data through the proposed system. In some cases, an orchestrating agent may work in conjunction with a connecting agent or may act as a connecting agent itself and may perform the said transformations and other connecting behaviors. In some embodiments, orchestrating agents may be installed and placed as proxies and orchestrators within the flow of identity data (e.g., authentication and authorization requests, managing users, setting and reading user attributes) and identity metadata (e.g., setting, editing, and reading access policies, password rules, data locations, rules controlling user administration tasks and the hierarchy delegation of those tasks, rules for assigning user memberships in groups, roles, etc., and rules or policies to determine the assignment of accounts to users) of the existing system or identity infrastructure.

In some cases, at least one of the dataflow 315 may comprise first identity information in a first format. For instance, a configuration change in a first identity domain (e.g., identity domain associated with identity infrastructure element 316-a) may trigger the first identity domain to transmit the first identity information to the system 300-a. In some cases, equivalent configuration changes may be applied to one or more of the other identity domains for consistency. In some cases, the system 300-a may translate the first identity information from the first format (i.e., a format used by the first identity domain) to a second format (i.e., a format used by the identity information control system 300-a), as described above in paragraph. For example, translating may include translating a rule (e.g., that defines how to automatically move a user from one group membership to another) specific to the first identity domain into a format and/or syntax required in order to express the same or similar rule in the second identity domain. The first identity information may be further translated from the second format to one or more other formats (e.g., a third format used by a second identity domain, a fourth format used by a third identity domain, etc.) and transmitted within one or more other dataflows 315 to the one or more other identity domains. In some cases, at least a portion of the identity information in the other identity domains may be replaced by the first identity information.

Figure 3B:
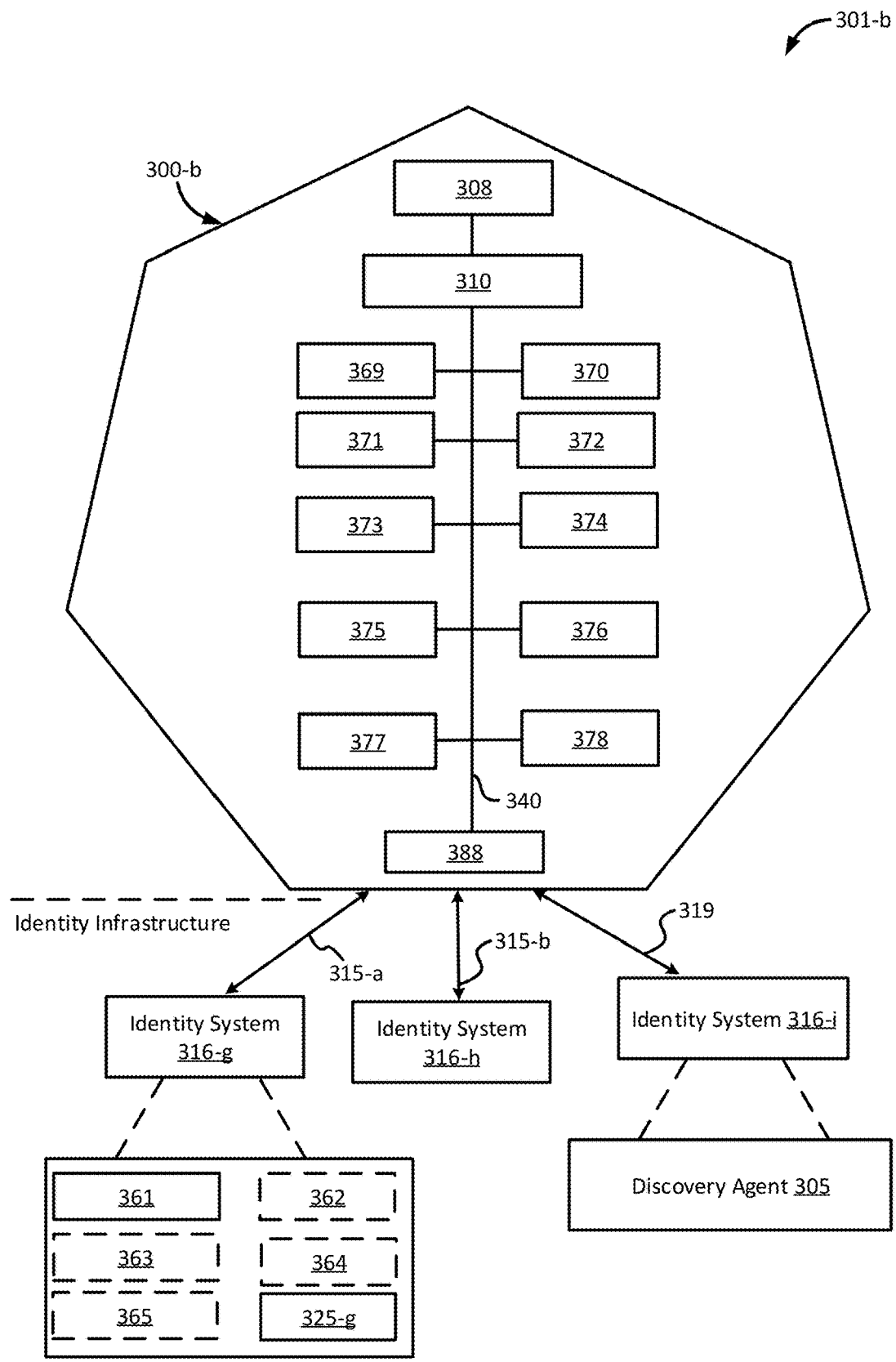
FIG. 3B illustrates an additional view of the system in FIG. 3A, according to an embodiment of the disclosure.

FIG. 3B illustrates a detailed view of a system 300-b for controlling identity information across multiple identity domains in distributed identity infrastructure 301-b, according to an embodiment of the disclosure. In some cases, the system 300-b may be similar or substantially similar to the system 100 and/or 300-a in FIGS. 1 and/or 3A, respectively. Further, the identity infrastructure 301-b may be similar or substantially similar to the identity infrastructure 301-a described in relation to FIG. 3A. In some cases, the system 300-b may comprise one or more of: an identity information transmittal module 308, an identity information control system module 310, an identity information sending module 369, an identity information replacing module 370, an identity infrastructure identifying module 371, a configuration detection module 372, an identity information changing module 373, and a portion identifying module 374, which may be similar or substantially similar to the respective modules previously described in relation to FIG. 1 and elsewhere. The system 300-b may also comprise one or more of an API module 375, a non-API module 376, a translate module 377 (also shown as translate module 591 in FIG. 5), a migrating agent 378, and a connecting agent 388. In some cases, the various elements, agents, and/or modules of the system 300-b may be embodied in hardware, software, or a combination thereof. Further, the one or more modules (also referred to as agents or elements) may be in communication via a bus 340. One or more of the modules in system 300-b may be optional. Alternatively, the system 300-b may comprise one or more additional modules not shown herein.

In some cases, detection and assessment of identity infrastructure elements (e.g., identity infrastructure elements 316-g, 316-h, etc.) may begin by the introduction of workers and/or proxies into the identity infrastructure. It should be noted that the identity infrastructure elements 316 may also be referred to as identity systems 316, and the two terms may be used interchangeably. In some cases, each of the one or more identity infrastructure elements 316 in FIG. 3B may be associated with a unique identity domain of one or more identity domains. In some examples, at least one of the identity domains may be a cloud-based identity domain (e.g., Azure AD provided by Microsoft, Corp., of Redmond, Wash.).

In some cases, one or more discovery agents 305 may be installed within the identity infrastructure. For instance, the system 300-b may disperse one or more discovery agents 305 for installing in the identity infrastructure. The discovery agents may gather information about the architecture of the identity infrastructure and communications (e.g., dataflows 315) between various users of the identity infrastructure and different apps or subsystems being accessed by said users, to name a few non-limiting examples. The discovery agent 305 may report information about the identity infrastructure to any of the modules of the system 300-b, for instance, the identity infrastructure identifying module 371. Such information may comprise where the various identity infrastructure elements 316 are located in the network (e.g., IP addresses, etc.), how the identity infrastructure elements 316 communicate with each other and/or other devices in the architecture, what types of authentication and authorization the identity infrastructure elements 316 require, and what metadata the systems use, such as authentication or authorization policies, password policy, etc.

In some examples, the identity infrastructure identifying module 371 may also detect one or more formats used by the different identity domains (e.g., identity infrastructure elements 316) by accessing user entries associated with the domains. In some cases, each identity domain may store identity information in a format specific to the identity domain. Alternatively, one or more identity domains may utilize a common format for storing identity information. For instance, the identity infrastructure identifying module 371 may determine one or more of an acceptable format for user passwords in the different identity domains when a user creates a new password in the first identity domain (e.g., identity system 316-g) and that password matches the password complexity requirements (e.g., password length, required types of characters, non-acceptable characters (if any), etc.) of the second identity domain (e.g., identity system 316-h). Additional format information, such as, but not limited to, mandatory profile attributes required to create a new user in the different identity domains and how a user profile may be activated in the different identity domains may be obtained in a similar manner. In some cases, an identity domain (e.g., identity domain 316-g) may be associated with an API, where the API may specify the structure, format, and/or syntax of the payload (i.e., data payload received within a dataflow 315) that must be included in a request to create or update user records or attributes. For example, the API may specify the manner in which the request to the API must be structured, the names of the attributes that must be included, the values and value types (e.g., string, boolean, etc.), as well as the various responses that may be returned by the API. In some cases, the identity infrastructure identifying module 371 may work in conjunction with the API module 375 to communicate with the API of the identity domain and detect said information.

In some cases, a change in identity information in a first identity domain (e.g., identity system 316-g) may be translated from a first format specific to the first identity domain to a different format used by another identity domain (e.g., identity system 316-h) before changes are implemented in another identity domain, further described in relation to FIGS. 5 and 6 below. In some circumstances, the identity information may be translated into one or more intermediary formats (e.g., a second format) used by the system 300-b, before being translated into the format (e.g., a third format) used by the other identity domain (i.e., identity system 316-h). The translation between formats may be performed by one or more modules or agents of the system 300-b, such as the translate module 377, API module 375, and/or non-API module 376, to name a few non-limiting examples. In some cases, one or more of the translate module 377 and the API module 375 may communicate with an API associated with an identity domain (e.g., identity system 316-h) to translate identity information from a format used by the system 300-b to a format used by the identity domain. The API may be a public API associated with the identity domain. In other cases, an identity domain may not utilize an API for communications with external systems, such as servers, computing platforms, user devices, etc., not associated with the identity domain. In such cases, interactions with the identity domain may comprise interfacing with a non-API, such as a user interface, associated with the identity domain. For instance, non-API module 376 may facilitate interactions between the system 300-b and an identity domain (e.g., identity system 316-i) not utilizing an API. In some examples, the non-API module 376 may transmit HTTP messages to the non-API (e.g., user interface) utilized by administrators or users associated with the second identity domain. Other types of non-API based communications besides HTTP are contemplated and described throughout this disclosure.

In some examples, each identity infrastructure element may be associated with or store information pertaining to one or more configurations 361. Optionally (shown by the dashed lines), at least a portion of the identity infrastructure elements 316 may store information pertaining to one or more groups 362 (e.g., static groups, dynamic groups), roles 363, features 364, and/or identities 365 related to the policies of the corresponding identity infrastructure element. Further, the one or more identity infrastructure elements (or alternatively, the connecting agent 388) may enforce one or more policies before users are allowed to gain access to applications (e.g., protected resources 325-g) through the corresponding identity domain, or alternatively, another identity domain. In some aspects, the identity infrastructure element or the connecting agent 388 may also serve as a gateway to the applications or protected resources.

In some cases, the system 300-b may install 319 at least one discovery agent element (e.g., discovery agent 305) in the identity infrastructure. The identity infrastructure may include the one or more identity domains and identity infrastructure elements, and the at least one discovery agent 305 may be installed on or adjacent to an identity infrastructure element 316-i in the identity infrastructure. In some examples, the identity infrastructure element 316-i may be an Apache Server, an IIS Server, or any other piece of identity infrastructure e.g., on an Apache or Nginx server, or on the control elements of an established identity domain, such as an Oracle Access Manager (OAM) Server. Alternatively, the identity infrastructure element 316-i may be located in the cloud and adapted to communicate and otherwise exchange data with other devices in the identity infrastructure 301-b via any identity protocol, for example OpenID Connect (OIDC), Security Assertion Markup Language (SAML), New Technology LAN Manager (NTLM); or via any other software communication protocol such as Hypertext Transfer Protocol (HTTP), Transmission Control Protocol (TCP), etc. In some embodiments, the discovery agent 305 and/or a module (e.g., migrating agent 378, identity information control system module 310, etc.) of the system 300-b may detect and monitor at least one event associated with the one or more dataflows 315, for instance, a login request, a request to access a protected resource (e.g., protected resource 325-g), a configuration change request, an identity data and/or identity metadata change request, etc. In some cases, the discovery agent may monitor network or identity traffic (e.g., as described above in relation to FIGS. 1 and 3A), identify the information used to establish an identity session (i.e., based on which access to the protected resource is granted), and convey the same to the system 300-b.

For example, the identity infrastructure identifying module 371 may assess, by the at least one discovery agent 305, the identity infrastructure. In some cases, the assessing may comprise identifying one or more identity domains (e.g., identity domain associated with identity infrastructure element 316-g) in the identity infrastructure. The assessing may further include one or more of detecting and reporting, to the system 300-b, identity data and identity metadata from the identity infrastructure. For instance, the assessing may include detecting and reporting identity data (e.g., identities 365, roles 363, groups 362 related information) and identity metadata (e.g., information pertaining to configurations 361, features 364, policies, such as an authorization policy, network locations, etc.) from identity infrastructure elements 316-g and/or 316-h in the identity infrastructure. By way of a non-limiting example, the identity data may include one or more of a user identity, a user credential, and a user attribute for one or more individual users of the one or more identity domains. Such attributes may comprise name, address, and group associations. By way of non-limiting example, the identity metadata may include one or more of a password rule, an authorization policy, an authentication policy, a trust policy, and network locations for identity domain elements of the one or more identity domains.

In some cases, the system 300-b may facilitate unified identity management across multiple identity systems and/or cloud platforms, which may not only allow consistent identities across clouds, but also policies, fundamentals of access control, and/or authentication. For instance, the system 300-b may enable an administrator for an organization to create unified policies, as well as consolidate rules (e.g., authentication rules, password rules, etc.), roles, groups, configurations, features, etc., across disparate identity systems. In this way, the system 300-b may allow the administrator to manage and control identity information across the different identity systems in a unified manner, which may ease cross-platform compliance, auditing, and/or migration from on-premises systems to the cloud. By way of non-limiting example, managing the one or more dataflows through the identity infrastructure 301-b may include managing the one or more dataflows pertaining to identity data, where the identity data includes one or more of an authentication request, an authorization request, and an update of user attributes or credentials. In some cases, the discovery and assessment of the identity infrastructure as described herein, may be a precursor to such unified identity management.

In some cases, the system 300-b may identity one or more protected resources, such as protected resource 325-g, for one or more identity domains of the identity infrastructure, where each of the one or more protected resources may be at least one electronically, logistically, and communicatively coupled to at least one identity domain (e.g., identity domain associated with identity infrastructure element 316-g) of the one or more identity domains. In some cases, a dataflow 315-a pertaining to first identity data for a first identity domain (e.g., identity infrastructure element 316-g) may be received at the identity infrastructure. The dataflow 315-a may be associated with a login request from a first user in the first identity domain. For instance, the first identity data may correspond to the first user and may comprise user authentication data (e.g., user identity, user credential, user attribute, etc., for the first user). Further, the dataflow 315-a may be linked to a first identity session. In this example, the protected resource 325-g may be secured by the identity system 316-g (e.g., an on-premises identity system, such as Symantec SiteMinder), and the first user may be attempting to access the protected resource 325-g. Although not necessary, in some cases, a request to access the protected resource 325-g may be received at the resource. The connecting agent 388 may receive, from the protected resource 325-g or the identity infrastructure element 316-g, a request for session information. In some cases, the connecting agent 388 or another module of the system 300-b may process one or more of the information associated with the first identity session and the first identity data and provide access to the protected resource 325-g based in part on the processing. In some examples, the first identity session and the first identity data may be associated with the session information, and the first user may be associated with the first identity domain.

In some cases, an enterprise or organization may also wish to secure the protected resource 325-g using a cloud-based identity system, such as identity system 316-h. For instance, the enterprise or organization may wish to migrate to the cloud-based identity system 316-h or extend authentication and/or access control capabilities provided by the identity system 316-h to the protected resource 325-g, which was originally secured by the identity system 316-g. In some cases, after migration, the enterprise or organization may decommission (e.g., take offline) the identity system 316-g, while still supporting access to the on-premises protected resource. Alternatively, the enterprise or organization may also migrate the protected resource 325-g to the cloud.

The migrating agent 378 and/or any of the other modules of the system 300-b may assist in one or more of migrating users and credentials (e.g., identity information associated with the users), synchronizing policies and configurations, and abstracting authentication and session management across a plurality of identity domains. In some examples, no or minimal changes may be made to the protected resource 325-g (e.g., an app). In this example, after receiving the dataflow 315-a associated with the login request, the system 300-b may extract from the login request at least one of a user identifier and user credentials information associated with the first user. In some cases, the system 300-b may identify one or more credential verification resources associated with or in the first identity domain. The one or more credential verification resources may include password verification endpoints. In some cases, at least one of the user identifier and user credentials information for the first user may be verified by the system 300-b, where the verifying may include accessing the one or more credential verification resources. It should be noted that, in this example, the user may be an unmigrated user in the second identity domain (i.e., identity system 316-h). An unmigrated user may refer to a user who has no entries associated with the user (such as a relation or presence) in another identity domain. In some cases, migration of the user to the second identity domain may comprise creating a user profile for the user in the second identity domain, where at least a part of the user profile in the second identity domain is associated with one or more of a verified user identifier and/or verified user credentials information for the first user. Dataflow 315-b represents the migration of the user to the second identity domain.

In some cases, the one or more credential verification resources may include password verification endpoints. The password verification endpoints may be associated with or may include one or more of a uniform resource locator (URL) and an application programming interface (API). An authenticate system, such as authenticate system 421 in FIG. 4 and associated with an identity domain, may be one non-limiting example of a credential verification resource. In some cases, the system 300-b may work in conjunction with the compromised accounts database (e.g., shown as compromised accounts database 890 in FIG. 5) to identify the one or more credential verification resources. For example, a credential verification resource may be associated with a third-party service that inspects user credentials to assess whether they have been compromised, for instance, by scanning the dark web for exposed credentials, or monitoring credential breaches, to name two-limiting examples. One non-limiting example of such a third-party service includes the database/API provided by the website, www.haveibeenpwned.com. In some other cases, the credential verification resource may be employed to determine whether a user credential, such as a password, is weak (i.e., easily guessable, and hence more susceptible to compromise). In some examples, the migrating agent 378 or another module may also work in conjunction with an authenticate system (e.g., shown as authenticate system 421 in FIG. 4) to verify at least one of the user identifier and user credentials information for the first user. In some examples, the process of authentication may comprise a user submitting user credentials (e.g., user identifier, password) to an authenticate system, which then checks the user identifier and password for a match. In some cases, the password may be checked against a locally stored one-way hash of the password. Once the user identifier and password have been verified, a session and corresponding session token for the user may be created. In some circumstances, verification may be performed against one or more of the user identifier, password, and any other applicable identity data. In some examples, the user identifier may optionally be checked even prior to authentication, for instance, to determine whether the user identifier is valid and corresponds to a user known by the system. In one non-limiting example, the user identifier may be checked by accessing a directory service or database and looking up if a user associated with that user identifier exists.

In some embodiments, the migrating agent 378 may also request additional identity data (e.g., additional credentials or identity attributes) for the first user from the first identity domain, create a user profile for the first user in the second identity domain, or a combination thereof. In some cases, the additional credentials information may comprise a second factor authentication token, although other types of credential's information may also be requested in different embodiments as described elsewhere in this disclosure. For instance, during live migration, one or more additional credentials may be created for the user. The user may be prompted to provide information pertaining to a token (e.g., from a mobile authenticator app), a USB token (e.g., YubiKey provided by Yubico, Inc., of Palo Alto, Calif.), or a mobile device that accepts push notifications, to name three non-limiting examples. The user, or alternatively, one of the modules of system 100 may enroll/register the additional credentials information (also referred to as a factor or second factor) as an additional credential to be used during authentication. In some examples, for instance, during a factor enrollment process, the user may need to prove possession of the token, or acknowledge (e.g., by clicking on) the push notification received on their mobile device. The factor enrollment process may be performed during or before migration to the second identity domain and may be associated with the credential verification. For instance, the user may pass credential verification and factor enrollment if their biometric interaction, such as a fingerprint scan, with the physical token, or a facial recognition interaction with the mobile authenticator app is accepted by the system 100. In some cases, the additional identity attributes may be received from one or more of a LDAP directory server, a database, and another identity repository, for example, based on identifying that the additional identity attributes are required or mandatory for creating a user profile in the second identity domain.

In some other cases, the system 300-*b* may be an example of an identity information control system (e.g., identity information control system 500 in FIG. 5). For instance, the system 300-*b* may assist in controlling identity information across multiple identity domains, such as identity domains 316-*g*, 316-*h*, and/or 316-*i* in the distributed identity infrastructure 301-*b*. In some circumstances, a user or administrator may change at least a portion of identity information (e.g., configurations 361, groups 362, roles 363, features 364, identities 365, etc.) in a first identity domain (e.g., identity system 316-*g*) from a first data to a second data. As an example, one or more employees in an admin group may be removed and new employees may be added. In another non-limiting example, a password policy in the first identity domain may be changed (e.g., new password policy states that password should be minimum of 15 characters long, instead of 12 in the old policy). In yet another example, role information or user attributes for one or more individual users may be changed in the first identity domain. The examples listed above are not intended to be limiting, and other types of changes are contemplated and described throughout this disclosure.

To ensure consistency of identity information across multiple identity domains, changes in identity information in one identity domain (i.e., a source or originating identity domain) may be detected and translated to a format suitable for one or more other identity domains (i.e., destination identity domain(s)). In some cases, the identity domain 316-*g* or a module of the system 300-*b*, such as identity information transmittal module 308, may transmit the updated first identity information from the first identity domain to the system 300-*b* (e.g., shown as dataflow 315-*a*). In some cases, the first identity information may include a first format. After receiving the first identity information, the translate module 377 and/or one or more other modules of system 300-*b* may translate the first identity information from the first format to a second format (e.g., a format used by the system 300-*b*), and from the second format to a third format (e.g., a format used by the identity system 316-*h*). In some cases, the system 300-*b* may interact with one or more data stores (e.g., LDAP data store) at one or more of the identity system 316-*g* and identity system 316-*h* prior to (or during) the translating between formats. In some examples, interacting with one or more data stores at the identity systems 316 may include one or more of inserting, updating, and deleting contents of at least one of a configuration file, a database, and a LDAP directory server. For instance, the system 300-*b* may copy one or more changes made to configuration 361 associated with identity system 316-*g* and implement equivalent configuration changes in the identity system 316-*h* (e.g., shown as dataflow 315-*b*). In some cases, the system 300-*b* directly implements the changes in identity system 316-*h* by updating the contents of a configuration file stored in identity system 316-*h*. Alternatively, the system 300-*b* transmits the updated first identity information in the third format (e.g., within dataflow 315-*b*) and instructs the identity system 316-*h* to apply the configuration changes, for instance. In some cases, at least a portion of second identity information stored in the destination identity system 316-*h* may be replaced by the first identity information. Additional details on the identity information control system, as well as the translation between the different formats used by the different identity systems or domains are provided in relation to FIGS. 5 and 6 described below.

Turning now to FIG. 4, which illustrates a process flow 400 for discovery and assessment of identity infrastructure according to an embodiment of the disclosure. In some examples, the discovery and assessment may be performed by a discovery agent or any of the other modules described in relation to FIGS. 1 and/or 3B. In some cases, discovery and assessment of identity infrastructure may begin by installing a discovery agent on or near an existing identity infrastructure element, such as an Apache server. As used herein, a discovery agent may refer to an autonomous or semi-autonomous software entity that is configured to assess identity information within an identity infrastructure. Identity information may comprise identity data, identity metadata, structure and/or contents of identity sessions, as well as configuration and deployment information for software and hardware entities of an identity domain. In some cases, the discovery agents may intercept and/or proxy networking traffic (e.g., an identity dataflow 415) as it is relayed to any of the identity infrastructure elements, such as runtime systems (e.g., authenticate system 421, access system 423, attributes system 426, risk system 424, device system 422) for authentication (e.g., multi-factor authentication (MFA)), authorization, gathering identity attributes, etc.

In this example, a user 402 is attempting to access a protected resource, such as an app 425, from user device 450. User device 450 may be a computing device, such as a laptop, smart phone, desktop, tablet, etc. As shown, the process flow 400 may begin by a login 401 from the user. Login 401 may comprise receiving identity data, including one or more of a username, a password, a fingerprint, iris scan, voice input, unique identifier, unique pin, etc. Following login, the user input may be relayed to any one of the runtime systems as an identity dataflow 415. In some cases, a discovery agent may intercept the networking traffic (i.e., within the identity dataflow 415) and identify the login as identity data.

In this example, the identity dataflow 415 may be sent to one or more identity infrastructure elements, such as an authenticate system 421, an access system 423, an attributes system 426, a device system 422, and/or a risk system 424 associated with an identity domain. In some cases, the identity dataflow 415 may be sent to other systems not identified herein. In some cases, the authenticate system 421 may support multi-factor authentication 429, the access system 423 may support identity as a service (IDaaS) 431 for authorization, and the attributes system 426 may be linked or associated with a Lightweight Directory Access Protocol (LDAP) 433 for gathering identity attributes. Specifically, access system 423 may enforce decisions about authentication and authorization set by the identity as a service (IDaaS) system 431. IDaaS refers to cloud-based authentication built and operated by a third-party provider, where the third-party provider may ensure that users are who they claim to be, and, if so, grant them access to software applications, files, and/or other resources based on the security permissions assigned to them. IDaaS may be deployed for a multitude of different applications, including, but not limited to, multi-factor authentication (MFA), single sign-on (SSO), and controlling access to restricted data.

In some embodiments, the discovery agent may detect and assess the state and structure of an identity infrastructure by analyzing the network traffic or identity dataflow 415 as it passes en route to the app 425. For instance, the discovery agent may detect the configuration and behavior of the identity infrastructure elements, where the configuration may include identity data and identity metadata stored within the identity infrastructure elements. Behavior may comprise identity operations performed by the elements, examples of which are below. In some cases, assessing the identity infrastructure by the discovery agent may be based at least in part on detecting and assessing one or more identity-centric operations, as described herein with respect to the identity data, metadata, and identity infrastructure elements. In some examples, the one or more identity-centric operations and behavior may comprise at least one of enforcing authentication rules based on an authentication performed by the user 402 (e.g., login 401 and authentication by authenticate system 421), granting or denying access to a protected resource (e.g., based on a request to access app 425), and enforcing authorization rules (e.g., using access system 423). In some examples, the one or more identity-centric operations may also comprise updating user credentials information based on the user 402 modifying their user credentials information, for instance, when the user updates their password. In some cases, modification of user credentials information may be performed via the authenticate system 421 or through a module (e.g., identity information changing module 116 in FIG. 1) of the system.

In the example shown, the device system 422 may be linked or associated with a first custom API 427-*a*, which may perform device verification, and the risk system 424 may be linked or associated with a second custom API 427-*b*, which may retrieve a threat or risk score. In some embodiments, the APIs 427-*a* and/or 427-*b* may link the device system 422 and/or risk system 424, respectively, to one or more applications (not shown), where the one or more applications may be third-party applications. In some cases, the one or more third party applications may be executed or hosted on another server (not shown). For instance, the device system 422 may interact with a third-party device verification application by making a call (e.g., an API call) using API 427-*a*. The third-party device verification application may then process the information received from the device system 422 (e.g., via the API 427-*a*) and relay a response (e.g., Verified or Not verified, 1 or 0, Yes or No, etc.) to the device system 422, based on which the user device 450 from which the login 401 was received may be verified. In some cases, the device system 422 may receive the response via the API 427-*a*. In some cases, the risk system 424 may also interact with a third-party risk verification application by making an API call using API 427-*b*, where the third-party risk verification application may then relay a response back to the risk system 424 via the API 427-*b*. In some embodiments, the third-party risk and verification applications may be executed or hosted on the same or a different third-party server. In some cases, device verification may serve as an added level of security (i.e., in addition to a username and password, for instance) and may be used to verify that the login 401 is coming from a recognized device (e.g., mobile device, laptop, computer, etc.) associated with an authorized user. In some cases, device verification may comprise transmitting a verification code over text (SMS), a phone call, an app, etc., to a recognized device (e.g., user device 450) associated with the user 402. The device system 422 may verify the device from which the login 401 was received upon the user inputting the same verification code. In some cases, the threat or risk score may be associated with a perceived or estimated threat level (e.g., for a user's identity), and may be based on one or more factors, including, but not limited to, time of day, day of week, geographic data, and/or IP address. For instance, a higher risk score may be assigned when the login 401 is during non-working hours (e.g., 3 AM) as compared to during working hours (e.g., 11 am). In another example, a lower risk score may be assigned when the login 401 is from a known IP address as opposed to an unknown IP address. In yet another example, a higher risk score may be assigned when the login 401 is from a geographic region (e.g., city, state, country, etc.) that the user 402 has never logged in from before.

In some cases, the risk system 424 may authorize or flag the login 401 based in part on comparing the retrieved risk or threat score to a threshold. In one non-limiting example, the login 401 and access to resource (e.g., app 425) may be denied based on the risk score exceeding the threshold (e.g., if it is determined that the user data is compromised based on validating one or more of the user identifier, the user credentials information, and any other identity data for the user). In another example, the user requesting the login 401 may be prompted to change their password (e.g., if the authentication policy states that the password should be updated every 3 months, 6 months, etc.) based on receiving a link or code on a registered device. In this case, the user may need to first click the link or input the code received on their registered device (e.g., a smartphone associated with the user) and then proceed to update their password. The user may then restart the login 401 process via the one or more runtime systems. Alternatively, if the risk or threat score is under a threshold, the login 401 may be successful and a session 434 may be initiated (e.g., the user device may display a Welcome Screen with one or more links to access different apps or resources, including app 425).

The discovery agent element may monitor the identity dataflow as it passes through the various identity infrastructure elements or runtime systems and determine the information used to establish an identity session 434 and gain access to the app 425 (i.e., a successful request). In some cases, the discovery agent element may also identify where unsuccessful requests are routed to (e.g., routed to attributes system 426 so that user password can be updated). In some cases, a session may refer to a temporary and interactive information interchange between two or more communicating devices (e.g., the user device 450 associated with login 401 and a server hosting app 425). Further, an established session may be a prerequisite for performing a connection-oriented communication. In some cases, a session may be initiated or established before data is transferred. As described above, initiation of identity session 434 may comprise displaying a successful login screen or welcome screen with one or more links to resources or apps authorized for use by the user, for instance, which may be indicative of a connection between the user device 450 and the server hosting the app 425.

It should be noted that the identity dataflow 415 may interact with any of the runtime systems illustrated in FIG. 4, and in any order. In some other cases, the identity dataflow 415 may interact with different runtime systems in parallel (e.g., authenticate system 421 and device system 422 simultaneously). In other cases, the identity dataflow 415 may interact with the runtime systems in a first branch (e.g., the left branch in FIG. 4), followed by the runtime systems in the second branch (i.e., right branch). Either way, the discovery agent elements may detect the behavior and configurations of the various identity infrastructure elements and report the same to a centralized server (e.g., shown as systems 300-*a*, 300-*b* in FIGS. 3A-B, identity information control systems 500, 600 in FIGS. 5-6) or administrator based on intercepting the identity dataflow 415 within the identity infrastructure.

FIG. 5 illustrates a process flow 501 for controlling identity information across identity domains in a distributed identity infrastructure, according to an embodiment of the disclosure. In some cases, process flow 501 may be implemented using one or more of the systems 100 and/or 300 described in relation to FIGS. 1 and 3A-B, respectively.

In some cases, an enterprise or organization may utilize one or more identity systems (or identity domains), such as an on-premises identity system (e.g., identity domain 516-*a*) and one or more cloud-based identity systems (e.g., identity domain 516-*b*). In such cases, the enterprise may also need to manage identity (e.g., of their employees, their customers, etc.) in multiple locations (e.g., geographic locations, network locations, or a combination). Businesses are increasingly using multiple cloud services (e.g., Amazon Web Services (AWS) provided by Amazon, Inc., of Seattle, Wash., Azure AD provided by Microsoft, Corp., of Redmond, Wash., Google Cloud Platform (GCP) provided by Alphabet, Inc., of Mountain View, Calif.), each of which use unique, built-in identity systems. Further, a business or enterprise may wish to migrate applications and/or identity information to the cloud with minimal changes to applications associated with the identity systems, how users interact with the apps, etc.

For instance, an enterprise using a legacy identity system (e.g., not cloud based) may wish to migrate user accounts from the legacy system to cloud. The legacy identity system may also be referred to as the source identity system and may be currently used to secure access to an application (e.g., an on-premises hosted application). In other cases, the business or enterprise may wish to synchronize identity information across multiple identity domains based on changes to identity information in one of the identity domains. According to aspects of this disclosure, an enterprise may manage identity information (i.e., identity data and/or identity metadata) across multiple identity domains, such as identity domains 516-*a* and 516-*b* in a unified manner, which may facilitate in maintaining consistency across different identity domains. In some aspects, such a system may also serve to minimize user disruption and/or changes to user experience (i.e., how users interact with the apps) in other identity domains, for instance, when identity data or identity metadata is updated in one identity domain.

In some cases, process flow 501 may be implemented using an identity information control system 500, which may be similar or substantially similar to the system 100 and/or system 300-*a* previously described in relation to FIGS. 1 and/or 3, respectively. As shown, the first identity domain 516-*a* may comprise one or more of an attribute system 526-*a*, an access system 523-*a*, an authenticate system 521-*a*, a LDAP 533-*a*, an IdaaS 531-*a*, MFA 529-*a*, an optional policy decision point (PDP) 592-*a*, and one or more protected resources, such as apps 525-*a*, which may be similar or substantially similar to the ones previously described in FIG. 4. In some examples, MFA 529 (e.g., MFA 529-*a*, MFA 529-*b*) may allow an added level of security, for instance, to verify that a user is who they say they are. In some cases, MFA 529 may implement one or more aspects of the MFA 429 previously described in relation to FIG. 4. In some cases, one or more of the attributes system 526 (e.g., attributes system 526-*a*, 526-*b*), the access system 523 (e.g., access system 523-*a*, 523-*b*), and the authenticate system 521 (e.g., authenticate system 521-*a*, 521-*b*) for a respective identity domain 516 may collectively be referred to as credential verification resources for that identity domain. In some examples, the credential verification resources may also include one or more password verification end points.

As shown, process flow 501 begins by transmission of first identity information from the first identity domain 516-a to the identity information control system 500, where the first identity information comprises a first format. Dataflow 515-a represents this transmission of first identity information. In some cases, the identity information control system 500 (or simply, control system 500) may comprise or may be hosted on a server 549. Further, the control system 500 may include a translate module 591, which may be similar or substantially similar to the translate module 377 described in relation to FIG. 3B. In some instances, the translate module 591 implements one or more aspects of the modules 108, 110, 112, 114, 116, and/or 118 previously described in relation to FIG. 1. The control system 500 may further comprise a connecting agent 588 (i.e., similar to connecting agent 388 described in relation to FIG. 3B) and an optional PDP 592-c. In some examples, at least a portion of the first identity information in the first identity domain 516-a may be changed from a first data to a second data. In some cases, the first identity domain 516-a or another module of the system may detect the change in the at least the portion of the first identity information prior to transmitting the first identity information from the first identity domain 516-a to the control system 500. In one non-limiting example, changing at least the portion of the first identity information may comprise changing a configuration of the first identity domain.

In some cases, the control system 500 or any of the other modules (e.g., portion identifying module 118 in FIG. 1) may identify one or more missing portions in the first identity information. Further, the control system 500 may issue a notification (shown as dataflow 515-b) related to the one or more missing portions in the first identity information, where the notification may be issued to the first identity domain 516-a. In some examples, the first identity domain 516-a and the control system 500 may resolve the missing portion in the first identity information, shown by bidirectional communication or dataflow 515-c. It should be noted that, dataflows 515-b and 515-c are optional (shown as optional by the dashed lines). In some cases, process flow 501 may further comprise using the control system 500 to translate the first identity information from the first format (e.g., a format specific to or used by the first identity domain 516-a) to a second format (e.g., a format specific to or used by the control system 500), and from the second format to a third format (e.g., a format specific to or used by the second identity domain 516-b). In some cases, the control system 500 utilizes translate module 591 for translating the first identity information to the second and/or third formats. Additionally, or alternatively, using the control system 500 to translate the first identity information from the first format to the second format, and from the second format to the third format may comprise interacting with a non-API based interface (e.g., shown as non-API 558) at the second identity domain 516-b. In other cases, using the identity information control system 500 or the translate module 591 to translate the first identity information from the first format to the second format, and from the second format to the third format comprises using at least one of an API and a Graphical Programming Interface at the second identity domain (e.g., shown as API 559). Dataflow 515-d represents this interaction of the control system 500 and/or the translate module 591 with one of the API 559 or the non-API 558. The dashed lines for API 559 and non-API 558 indicate that they are alternate implementations. In some cases, the use of the non-API 558 may comprise sending HTTP messages from the control system 500 to a user interface for at least one of an administrator and a user associated with the second identity domain 516-b. The HTTP messages may be sent within dataflow 515-d. In one non-limiting example, the API 559 may comprise a public identity API associated with the second identity domain. In some cases, the control system 500 or translate module 591 may translate the first identity information from the first format to the second and third formats without interacting with an API or non-API based interface at the second identity domain 516-b, for instance. After translation, the control system 500 may send the first identity information in the third format to the second identity domain 516-b, as shown by dataflow 515-e.

In some cases, second identity information may be stored in the second identity domain 516-b by, for instance, storing the second identity information in one or more of the attributes system 526-b, access system 523-b, authenticate system 521-b, LDAP 533-b, IdaaS 531-b, MFA 529-b, and app(s) 525-b. Although not necessary, in some examples, the second identity domain 516-b may reside in a network cloud, for instance, a private cloud or a public cloud. In some cases, the second identity domain 516-b may also comprise a PDP 592-b (shown as optional by the dashed lines). As described above in paragraph, in some cases, the connecting agent 588 may assume the responsibilities of either or both of the PDPs 592 and PEPs (e.g., access systems 523).

The first identity information and/or the second identity information may comprise at least one of identity data and identity metadata. Some non-limiting examples of identity data may comprise data related to at least one of authentication or authorization requests, adding users, setting and reading user attributes, a user identity, a user credential, and a user attribute for one or more individual users of one or more identity domains. Further, some non-limiting examples of identity metadata may comprise data related to at least one of setting and reading access policies, password rules, data locations, an authorization policy, an authentication policy, a trust policy, data rules, user schema groups, group types and composition, and network locations for elements of the one or more identity domains. The group types may comprise one or more of static and dynamic groups. Further, the group composition may comprise one or more of membership rules and assignment policies. Additionally, or alternatively, the identity data and identity metadata may comprise at least one of data related to third-party software application interaction(s) (e.g., MFA 429; risk system, such as risk system 424; device system 422 in FIG. 4) with the second identity domain 516-b and components which interact with users of the second identity domain 516-b.

In some examples, after dataflow 515-e is received at the second identity domain 516-b, one or more of the control system 500 and the second identity domain 516-b may replace the second identity information stored in the second identity domain with the first identity information, where the first identity information may comprise the second data where the second data may comprise data obtained from the first identity domain 516-a in the first format used by the first identity domain. In some cases, replacing the second identity information in the second identity domain 516-b may comprise changing the second identity information to third data, where the third data may be equivalent to the second data but with the third data comprising data in the third format, used by the second identity domain.

In some other cases, one or more of the runtime systems (e.g., attributes system 526-b, access system 523-b, authenticate system 521-b) associated with the second identity domain 516-b may assist in replacing the second identity information with the first identity information. In some embodiments, using the identity information control system 500 to translate the first identity information from the first format to the second format, and from the second format to the third format may comprise interacting with one or more data stores (e.g., attributes system 526-*a* and LDAP 533-*a*; attributes system 526-*b* and LDAP 533-*b*, etc.) at the first and/or second identity domains 516. Some non-limiting examples of data stores include user or group identity stores (e.g., a LDAP store), policy data store (e.g., for storing policy related data), session data stores (e.g., for storing identity session data for a user), configuration data stores (e.g., for storing configuration related data), and security keys data stores (e.g., for storing cryptographic security keys generated to encrypt session tokens and/or network traffic in the identity infrastructure). Other types of data stores are contemplated in different embodiments. In some examples, the data stores may be implemented using hardware, software, or a combination thereof. For instance, the data stores may be implemented using a server (e.g., ORACLE ACCESS MANAGER (OAM) server provided by Oracle Corporation of Austin, Tex.; AZURE ACTIVE DIRECTORY (AD) server provided by Microsoft, Inc., of Redmond, Wash., PING FEDERATE/ACCESS provided by Ping Identity Corporation of Denver, Colo., WS02 provided by WS02 of Colombo, Sri Lanka, etc.) and one or more databases hosted on the server.

In some cases, the control system 500 may communicate with one or more datastores associated with different identity domains using a connecting agent 588 (e.g., also shown as connecting agent 388 in FIG. 3B), where the connecting agent 588 may work with a plurality of different identity systems (or identity domains), such as on-premises and cloud-based identity domains. In some cases, the connecting agent 588 may be a general purpose last-mile connector and may work with a plurality of applications (e.g., web apps) running on different cloud platforms or identity systems. In some other cases, the connecting agent may be an on-premises identity connector and may work with SYMANTEC SITEMINDER provided by Broadcom, Inc., of San Jose, Calif., ORACLE ACCESS MANAGER (OAM) provided by Oracle Corporation of Austin, Tex., ACTIVE DIRECTORY (AD) provided by Microsoft Inc., of Redmond, Wash., PING FEDERATE/ACCESS provided by Ping Identity Corporation of Denver, Colo., WS02 provided by WS02 of Colombo, Sri Lanka, to name a few non-limiting examples. In yet other cases, the connecting agent 588 may be a cloud identity connector and may work with OKTA provided by Okta, Inc., of San Francisco, Calif., AZURE AD provided by Microsoft Inc., of Redmond, Wash., AWS IDENTITY provided by Amazon, Inc., of Seattle, Wash., GCP IDENTITY provided by Alphabet, Inc., of Mountain View, Calif., to name a few non-limiting examples.

While the process flow 501 in FIG. 5 illustrates a single originating identity domain (i.e., first identity domain 516-*a*) and a single destination identity domain (i.e., second identity domain 516-*b*), it should be noted that the number of identity domains is not intended to be limiting. For example, in some circumstances, identity information in more than one identity domain may be replaced based on one or more changes in another identity domain, further described in relation to FIG. 6. For instance, a configuration change in a first identity domain may be propagated to a plurality of other identity domains, where the plurality of other identity domains reside in two or more network clouds. In some examples, at least one of the two or more network clouds comprises a private cloud, while another of the two or more network clouds comprises a public cloud.

Figure 6:
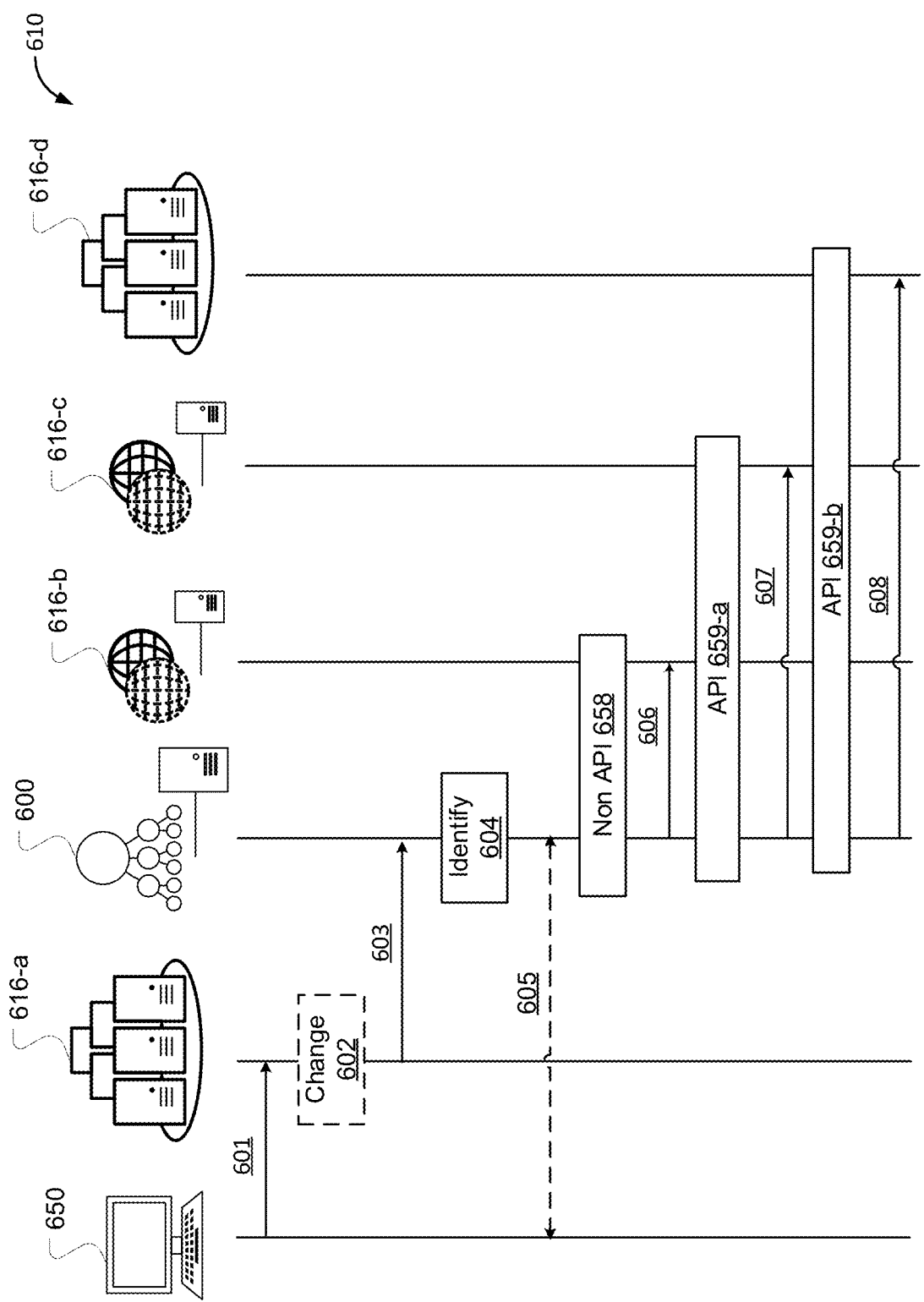
FIG. 6 illustrates a swim diagram for controlling identity information across multiple identity domains in a distributed identity infrastructure, according to an embodiment of the disclosure.

FIG. 6 illustrates a swim diagram 610 directed to a method for controlling identity information across multiple identity domains in a distributed identity infrastructure, such as, but not limited to, identity infrastructure 301-*a* previously described in relation to FIG. 3A. FIG. 6 illustrates a user device 650 (e.g., an administrator device), a first identity domain 616-*a*, an identity information control system 600, a second identity domain 616-*b*, a third identity domain 616-*c*, and a fourth identity domain 616-*d*. In this example, identity domains 616-*a* and 616-*b* reside in different network clouds, where at least one of the network clouds may be examples of private clouds. Further, identity domains 616-*b* and 616-*c* also reside in different network clouds, where at least one of the network clouds may be examples of public clouds. In some examples, the first, second, third, and fourth identity domains 616 may utilize first, second, third, and fourth formats, respectively, for storing, reading, processing, etc., identity information. The identity information control system 600 may implement one or more aspects of the system 100, system 300-*a*, system 300-*b*, and/or identity information control system 500, previously described in relation to FIGS. 1, 3A-3B, and/or 5, respectively.

At step 601, a user or administrator associated with the first identity domain 616-*a* may suggest one or more changes to at least a portion of first identity information in the first identity domain 616-*a*. For example, the user or administrator may request to change at least a portion of first identity information in the first identity domain 616-*a*. In some cases, the first identity domain 616-*a* may directly implement the one or more changes requested by the user, in which case step 602 may be optional (shown as optional by the dashed lines). Alternatively, one or more changes may be detected based on comparing, for the first identity information, the data in the request (i.e., second data) with the currently stored data (i.e., first data). One non-limiting example of a change may relate to a configuration change for the first identity domain. In some cases, the first identity domain 616-*a* may store first identity information, where the first identity information may be in a first format used by the first identity domain 616-*a*. The first identity information may comprise at least one of identity data and identity metadata, where the identity data may comprise data related to at least one of authentication or authorization requests, adding users, setting and reading user attributes, a user identity, a user credential, and a user attribute for one or more individual users of one or more identity domains, including at least the first identity domain 616-*a*. Additionally or alternatively, the identity metadata may comprise data related to at least one of setting and reading access policies, password rules, data locations, an authorization policy, an authentication policy, a trust policy, data rules, user schema groups, group types (e.g., static groups, dynamic groups) and group composition (e.g., membership rules, assignment policy), and network locations for elements of the one or more identity domains, including at least the first identity domain 616-*a*.

At step 602 (shown as optional by the dashed lines), at least a portion of the first identity information may be changed in the first identity domain from first data to second data, where the second data is different than the first data, based on detecting the change in the at least the portion of the first identity information.

At step 603, the first identity domain 616-*a* may transmit the first identity information (e.g., comprising the second data) to the identity information control system 600. In some cases, at step 604, the identity information control system 600 (or another module, such as portion identifying module 118 in FIG. 1) may identify one or more missing portions in the first identity information. As previously noted, each of the identity domains 616 may store identity information in a format specific to the respective identity domain. Further, the identity information control system 600 may utilize a fifth format for processing and analyzing identity information received from the one or more identity domains, including at least the first identity domain 616-a. In this example, second identity domain 616-b stores second identity information in a second format, third identity domain 616-c stores third identity information in a third format, and fourth identity domain stores fourth identity information in a fourth format. The second, third, and fourth formats may be the same or different. In some cases, the identity information control system 600 may also identify one or more missing portions in one or more of the second, third, and fourth identity information stored in the second, third, and fourth identity domains 616, respectively.

At step 605 (shown as optional by the dashed lines), the identity information control system 600 may issue a notification related to the one or more missing portions in at least one of the first, second, third, and fourth identity information. For the sake of brevity, FIG. 6 only illustrates the identity information control system 600 issuing a notification related to the missing portions to the first identity domain 616-a. It should be noted, however, that similar notifications may be sent to one or more of the other identity domains 616. In some cases, one or more of the identity information control system 600 and an identity domain (e.g., first identity domain 616-a) may resolve the missing portions in the identity information (e.g., first identity information). Step 605 depicts the bidirectional communication between the first identity domain and the control system 600 for issuing and resolving the missing portions in the first identity information, for instance. In some cases, the missing portions in the identity information (e.g., first, second, third, and/or fourth identity information) may be resolved prior to using the control system 600 to translate the first identity information from the first format to the fifth format, and from the fifth format to the one or more other formats used by the other identity domains 616.

In this example, using the control system 600 to translate the first identity information from the first format to the fifth format, and from the fifth format to the second format comprises interacting with a non-API 658 (e.g., a user interface for at least one of an administrator and a user associated with the second identity domain 616-b) at the second identity domain 616-b. In some embodiments, interacting with the non-API 658 may comprise sending HTTP messages at step 606 to the user interface, for instance. In some cases, using the control system 600 to translate the first identity information from the first format to the fifth format, and from the fifth format to the third format comprises using at least one of an API and a Graphical Programming Interface (e.g., API 659-a). It should be noted that, the API 659-a may be specific to the third identity domain 616-c and may enable external systems, such as identity information control system 600, to interact with the third identity domain 616-c. In some examples, the API 659-a may be an example of a public identity API for the third identity domain. At step 607, the control system 600 may send the translated first identity information (i.e., in the third format) to the third identity domain 616-c. Similarly, API 659-b associated with the fourth identity domain 616-d may be utilized to translate the first identity information from the first format to the fifth format, and from the fifth format to the fourth format, where the fourth format may be used by the fourth identity domain 616-d. At step 608, the control system 600 may transmit the translated first identity information to the fourth identity domain 616-d.

In some cases, one or more of the control system 600 and an identity domain (e.g., second identity domain 616-b) may replace the identity information (e.g., second identity information) with the first identity information. For instance, after the first identity information is received at the second identity domain 616-b (i.e., at step 606), the second identity information in the second identity domain may be replaced with the first identity information. In some cases, the replacing may comprise changing the second identity information to third data, where the third data comprises data equivalent to the second data. Similar replacements may be made to the identity information in the third and fourth identity domains 616-c and 616-d upon receiving the first identity information at steps 607 and 608, respectively. In this way, a configuration change in the first identity domain 616-a (e.g., where identity information in the first identity domain is changed from a first data to a second data) may be detected and propagated to a plurality of identity domains using different formats for storing and processing identity information via one or more of non-API and API based techniques.

Figure 8:
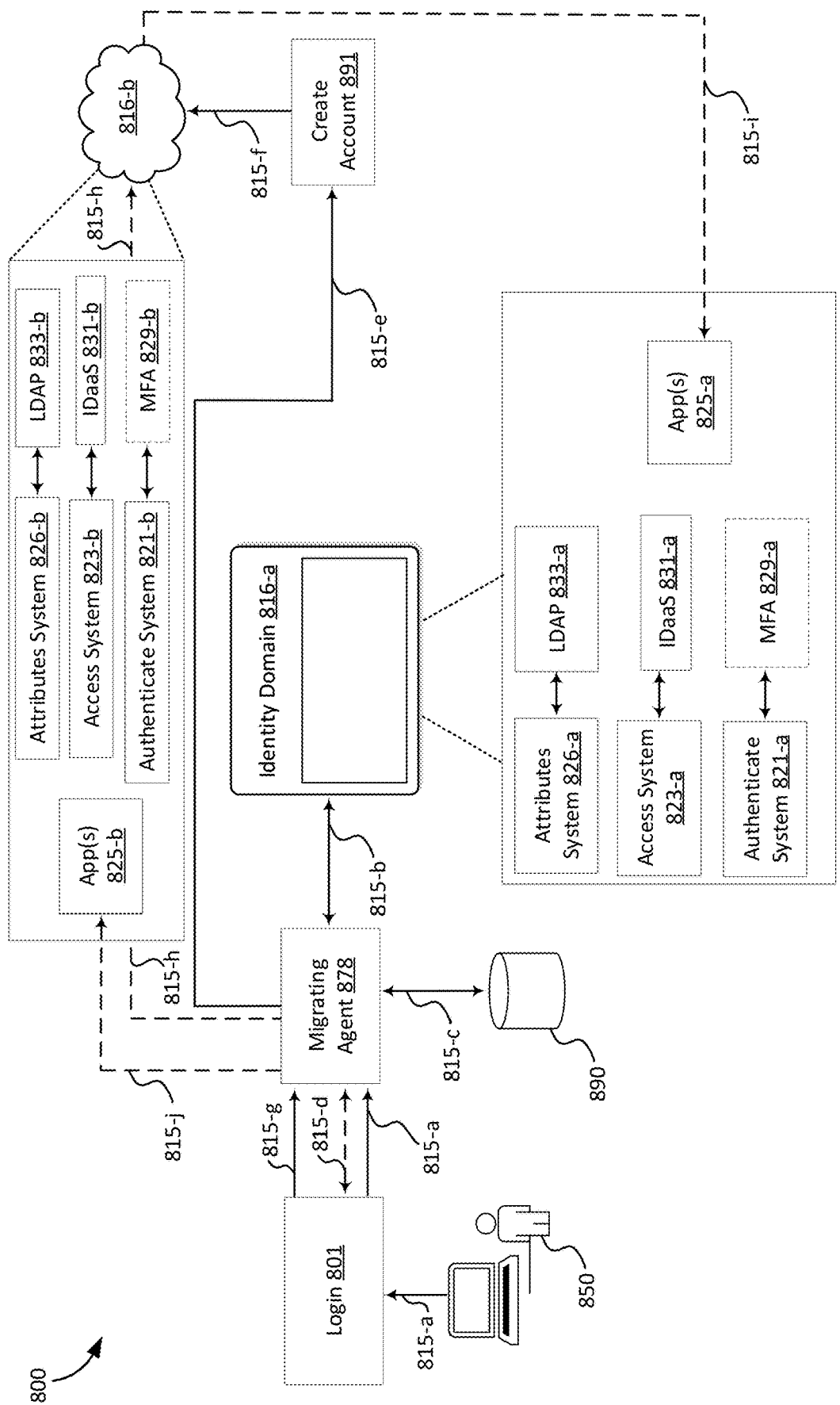
FIG. 8 illustrates a process flow for migrating identity information across identity domains in an identity infrastructure, according to an embodiment of the disclosure.

FIG. 8 illustrates a process flow 800 for migrating identity information across identity domains in an identity infrastructure (e.g., shown as identity infrastructure 301-a in FIG. 3A). In some cases, process flow 800 implements one or more aspects of the systems 100, 300, and/or 900 described in relation to FIGS. 1, 3A-B, and 9, respectively. Additionally, or alternatively, process flow 800 implements one or more aspects of process flows 400 and 500 described in relation to FIGS. 4 and 5, respectively.

In some cases, an enterprise or organization may utilize one or more identity systems, such as an on-premises identity system and one or more cloud-based identity systems. In such cases, the enterprise may also need to manage identity (e.g., of their employees, their customers, etc.) in multiple locations (e.g., geographic locations, network locations, or a combination). Businesses are increasingly using multiple cloud services (e.g., Amazon Web Services (AWS) provided by Amazon, Inc., of Seattle, Wash., Azure AD provided by Microsoft, Corp., of Redmond, Wash., Google Cloud Platform (GCP) provided by Alphabet, Inc., of Mountain View, Calif.), each of which use unique, built-in identity systems. Further, a business or enterprise may wish to migrate applications and/or identity information to the cloud with minimal changes to the apps, how users interact with the apps, etc. For instance, an enterprise using a legacy identity system (e.g., not cloud based) may wish to migrate user accounts from the legacy system to cloud. The legacy identity system may also be referred to as the source identity system and may be currently used to secure access to an application (e.g., an on-premises hosted application). According to aspects of this disclosure, an enterprise may migrate their user identities (or identity information) with minimal user disruption and/or changes to user experience (i.e., how users interact with the apps), as further described below.

In this example, identity information for a user 850 is being migrated across identity domains, for instance, from a first identity domain 816-a (i.e., source identity system) to a second identity domain 816-b (i.e., destination identity system). The user 850 may be an unmigrated user in the second identity domain. As illustrated, the process flow 800 may comprise receiving a login request 801 in the first identity domain, where the login request 801 may be received from the user 850 as dataflow 815-*a*. In some examples, a migrating agent 878 or another module described in relation to FIG. 1 may proxy the request made by the user. In some cases, the user 850 may be attempting to access the app 825, where the app may be associated with the first identity domain.

The migrating agent 878 or a module (e.g., login request extraction module 910 in FIG. 9) may extract from the login request at least one of a user identifier and user credentials information associated with the first user. Further, the migrating agent 878 may identify one or more credential verification resources in the first identity domain to check the user's authentication state, for instance. In some cases, at least one of the user identifier and user credentials information for the user 850 may be verified, where the verifying includes accessing the one or more credential verification resources. Dataflow 815-*b* represents this verification of the user identifier and/or the user credentials information for the user 850 based on accessing the one or more credential verification resources in the first identity domain.

In some cases, the credential verification resources associated with the first identity domain 816-*a* may include one or more of the attributes system 826-*a*, the access system 823-*a*, and the authenticate system 821-*a*, which may be similar or substantially similar to the attribute system 426, the access system 423, and the authenticate system 421 previously described in relation to FIG. 4. Further, LDAP 833-*a*, IdaaS 831-*a*, and MFA 829-*a* man implement one or aspects of the LDAP 431, IdaaS 431, and MFA 429, respectively. In some examples, a module (e.g., shown as user information verification module 914 in FIG. 9) may work in conjunction with the authenticate system 821-*a* to verify at least one of the user identifier and user credentials information for the first user. In some examples, the process of authentication may comprise the user 850 submitting user credentials (e.g., user identifier, password) to the authenticate system 821-*a*, which then checks the user identifier and password for a match. In some cases, the password may be checked against a locally stored one-way hash of the password. Once the user identifier and password have been verified, an identity session and corresponding identity session token may be created for the user. In some circumstances, verification may be performed against one or more of the user identifier, password, and any other applicable identity data. In some examples, the user identifier may optionally be checked even prior to authentication, for instance, to determine whether the user identifier is valid and corresponds to a user known by the system. In one non-limiting example, the user identifier may be checked by accessing a directory service or database (e.g., LDAP 833-*a*) and determining whether a user record/profile corresponding to that user identifier exists. Additionally, or alternatively, the credential verification resources may include one or more password verification points, and third-party databases or APIs (e.g., haveibeenpwned.com). As shown, the second identity domain 816-*b* may also comprise or be associated with one or more of an attributes system 826-*b*, LDAP 833-*b*, access system 823-*b*, IdaaS 831-*b*, authenticate system 821-*b*, MFA 829-*b*, and app(s) 825-*b*, which may be similar or substantially similar to those previously described in relation to FIG. 4 or any of the other figures described herein.

In some cases, the migrating agent 878 may request, from an external third party, validation of user data for the user 850. For instance, the migrating agent 878 may transmit the request as dataflow 815-*c* to a compromised accounts database 890. The compromised accounts database 890 may store information related to compromised user data (e.g., user identifier, first and/or last name, last 4 of SSN, etc.). In some cases, user data may be compromised due to a data breach (e.g., hacking). Numerous public and subscription-style services that provide intelligence about users and credentials exist. Some of these intelligence services scan the dark web or monitor breach notifications sent out to users. In some cases, the compromised accounts database 890 may receive information from such intelligence services, for instance, through an API. One non-limiting example of such a service includes the haveibeenpwned database/API maintained by a website of the same name and created by Troy Hunt. Additionally, or alternatively, the intelligence service and/or the compromised accounts database 890 may respond with a risk score, where the risk score may comprise one of a high, medium, or low risk. Alternatively, the risk score may comprise a numeric score on a predefined scale (e.g., out of 10, out of 100, etc.). In some cases, in response to determining that the user data is compromised, the migrating agent 878 or another module may request the user 850 to modify the user credentials information before a user profile for the user is created in the second identity domain. Dataflow 815-*d* represents this bi-directional communication between the user 850 and the migrating agent 878 or the system (e.g., shown as system 100 in FIG. 1, systems 300-*a* and 300-*b* in FIGS. 3A-B, system 900 in FIG. 9). For instance, the migrating agent 878 may receive, from the user, modified user data within dataflow 815-*d*, where the modified user data comprises modified user credentials information (e.g., a new password). In some cases, the modified user credentials information may be passed on to the first identity domain so that it may be updated via the attributes system 826-*a*, for instance. In some cases, the modified user credentials information may be passed from the migrating agent to the on-premises system as dataflow 815-*b*, or another dataflow. The migrating agent 878 may also request additional identity data for the first user from the first identity domain, where the request may be sent within dataflow 815-*b*. In some cases, additional user credentials information may be obtained before creating a user profile for the user 850 in the second identity domain, where the additional user credentials information may comprise at least multi-factor authentication information (e.g., shown as MFA 829). MFA 829 may allow an added level of security, for instance, to verify that the user is who they say they are, before migrating their identity information to the second identity domain. In some circumstances, MFA serves to mitigate the chances of incorrectly replicating a user profile in the second identity domain. In some examples, MFA 829 may be implemented using a mobile authenticator app installed on a user device (e.g., smartphone) that generates a numeric or alphanumeric pin (e.g., 4 digits long, 6 characters long, etc.), a physical device (e.g., a USB token that requires biometric interaction, such as touch, a fingerprint, etc., as proof of possession), and a push notification sent to a registered mobile device to name a few non-limiting examples. Other techniques for implementing MFA 829 known in the art, such as a code or pin sent over SMS or email, are also contemplated in different embodiments.

In some cases, the migrating agent 878 may proceed to create 891 a user profile for the user 850 in the second identity domain 816-*b*. At least a part of the user profile in the second identity domain is associated with one or more of the verified user identifier(s) associated with the first user, the verified user credentials information associated with the first user, and any additional identity data for the first user. In some circumstances, the second identity domain may have different requirements for the information needed to create a user record (or user profile) as compared to the first identity domain. For instance, the first and second identity domains may be different with regards to their mandatory user attributes (e.g., first identity domain requires a secondary email address, while the second identity domain requires a secondary phone number), format and/or syntax of those attributes (e.g., first identity domain only accepts phone numbers in (123)456-789 format, and the second identity domain only accepts phone numbers in 123456789 format), and how a user is activated (e.g., via email, push notification on a registered device, such as a smartphone, voice call, text or SMS, etc.), to name a few non-limiting examples. The migrating agent may ingest, interpret, and resolve any inconsistencies or discrepancies between the different requirements for the two identity domains prior to migrating the user. For example, the migrating agent 878 or another module may specify one or more requirements for defining and storing user data in the second identity domain before creating a user profile for the user 850 in the second identity domain, wherein the user data comprises one or more of the user identifier, the user credentials information, and the additional identity data. Dataflows 815-*e* and 815-*f* represent the migrating agent 878 creating the user profile and/or configuring the one or more requirements for defining and storing user data in the second identity domain. Additionally, or alternatively, the migrating agent 878 may determine whether at least a portion of the user credentials information may be utilized in the second identity domain before creating a user profile for the first user in the second identity domain by entering the at least a portion of the user credentials in the second domain and ascertaining whether the at least a portion of the user credentials comply with one or more second identity domain rules.

Once the user profile for the user 850 has been created in the second identity domain 816-*b*, future login requests 801 from the user to access apps 825-*a* associated with the first identity domain 816-*a* may be authenticated using the user's cloud identity associated with the second identity domain, for example. Dataflows 815-*g* and 815-*h* represents this scenario where the migrating agent or another module intercepts future login requests and redirects them to the second identity domain based in part on detecting that the user 850 has migrated to the second identity domain. After authentication by the second identity domain 816-*b*, the user 850 may be provided access to the app 825-*a* (shown as dataflow 815-*i*). In some cases, the dataflow 815-*i* may pass through the migrating agent or another module of the system before the user 850 is granted access to the app 825-*a*. For instance, the system may evaluate access policies for the app 825-*a* and calculate attribute values to be included in HTTP headers forwarded to the app 825-*a*. Additionally or alternatively, after migration, future login requests from the user to access apps 825-*b* associated with the second identity domain 816-*b* may be authenticated using the user's cloud identity associated with the second identity domain (shown as dataflows 815-*g* and 815-*j*)

Figure 9:
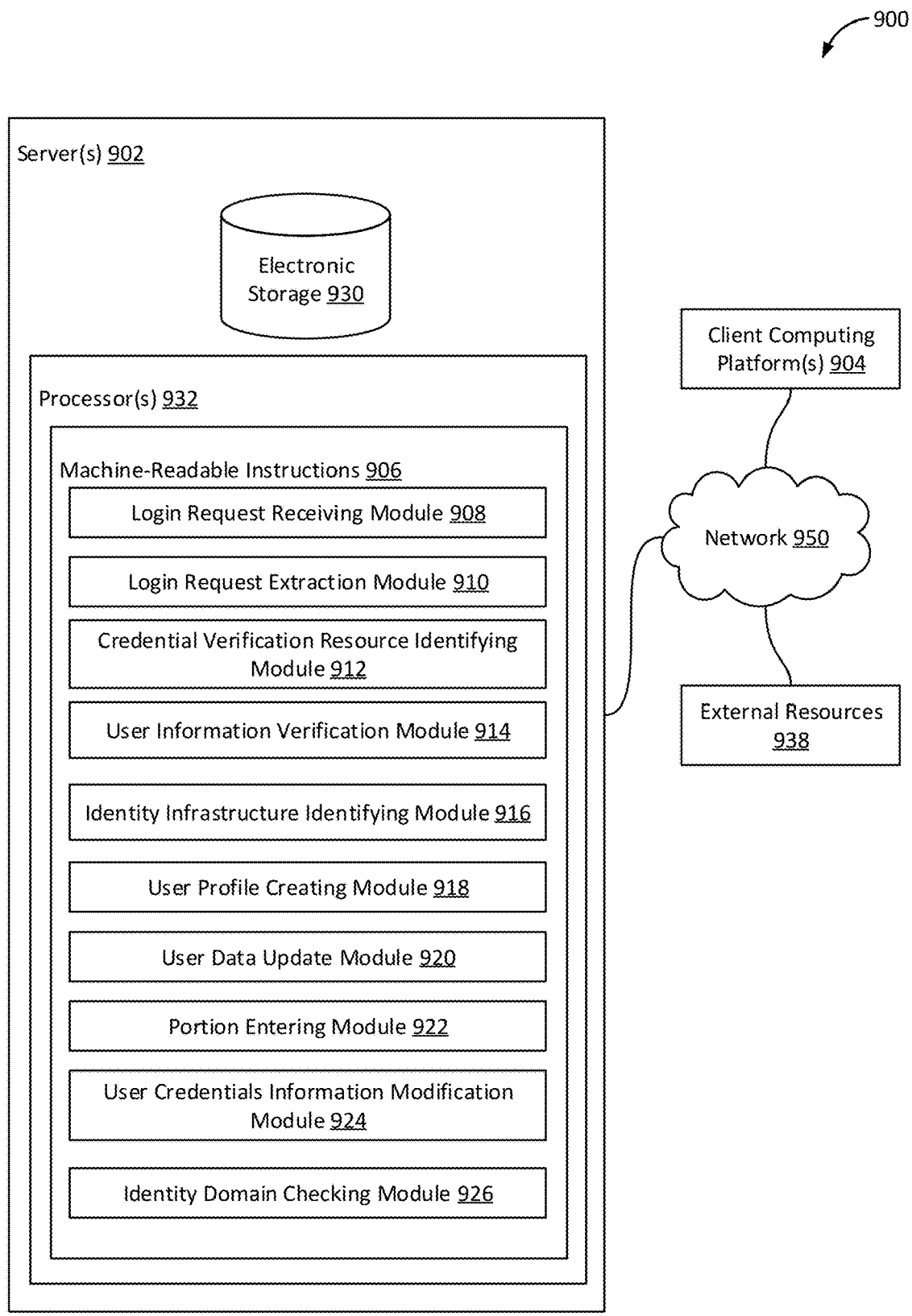
FIG. 9 illustrates a system configured for migrating identity information across identity domains in an identity infrastructure, in accordance with one or more implementations.

FIG. 9 illustrates a system 900 configured for migrating identity information across identity domains in an identity infrastructure, in accordance with one or more implementations. In some implementations, system 900 may implement aspects of one or more of the systems 100, 300-*a*, 300-*b*, 500, and/or 600 previously described in relation to FIGS. 1, 3A-3B, 5, and/or 6, respectively. As seen, system 900 may include one or more servers 902. Server(s) 902 may communicate with one or more client computing platforms 904 according to a client/server architecture and/or other architectures. Client computing platform(s) 904 may communicate with other client computing platforms via server(s) 902 and/or according to a peer-to-peer architecture and/or other architectures. Users may access system 900 via client computing platform(s) 904. In some implementations, server(s) 902, client computing platform(s) 904, and/or external resources 938 may be operatively linked via one or more electronic communication links. For example, such electronic communication links may be established, at least in part, via a network 950 such as the Internet and/or other networks. It will be appreciated that this is not intended to be limiting, and that the scope of this disclosure includes implementations in which server(s) 902, client computing platform(s) 904, and/or external resources 938 may be operatively linked via some other communication media.

A given client computing platform 904 may include one or more processors configured to execute computer program modules. The computer program modules may enable an expert or user associated with the given client computing platform 904 to interface with system 900 and/or external resources 938, and/or provide other functionality attributed herein to client computing platform(s) 904. The client computing platform 904 may include one or more of a desktop computer, a laptop computer, a handheld computer, a tablet computing platform, a Netbook, a Smartphone, a gaming console, and/or other computing platforms.

External resources 938 may include sources of information outside of system 900, external entities participating with system 900, and/or other resources. In some implementations, some or all of the functionality attributed herein to external resources 938 may be provided by resources included in system 900 and vice-versa.

Server(s) 902 may be configured by machine-readable instructions 906. Machine-readable instructions 906 may include one or more instruction modules. The instruction modules may include computer program modules. The instruction modules may include one or more of login request receiving module 908, login request extraction module 910, credential verification resource identifying module 912, user information verification module 914, identity infrastructure identifying module 916, user profile creating module 918, user data update module 920, portion entering module 922, user credentials information modification module 924, identity domain checking module 926, and/or other instruction modules. It is contemplated that all or some of the one or more modules described herein may be incorporated into the migration element or agent (e.g., shown as migrating agent 878 in FIG. 8), orchestrating element, discovery element (e.g., shown as discovery agent 305 in FIG. 3A), or any other element.

Login request receiving module 908 may receive a login request from a first user in a first identity domain. The first user may be an unmigrated user in a second identity domain. In some embodiments, login request receiving module 908 may also request additional identity data (e.g., additional credentials or identity attributes) for the first user from the first identity domain, create a user profile for the first user in the second identity domain, or a combination thereof. In some cases, the additional credentials information may comprise a second factor authentication token, although other types of credentials information may also be requested in different embodiments as described elsewhere in this disclosure. For instance, during live migration, one or more additional credentials may be created for the user. The user may be prompted to provide information pertaining to a token (e.g., from a mobile authenticator app), a USB token (e.g., YubiKey provided by Yubico, Inc., of Palo Alto, Calif.), or a mobile device that accepts push notifications, to name three non-limiting examples. The user, or alternatively, one of the modules of system 900 may enroll/register the additional credentials information (also referred to as a factor or second factor) as an additional credential to be used during authentication. In some examples, for instance, during a factor enrollment process, the user may need to prove possession of the token, or acknowledge (e.g., by clicking on) the push notification received on their mobile device. The factor enrollment process may be performed during or before migration to the second identity domain and may be associated with the credential verification. For instance, the user may pass credential verification and factor enrollment if their biometric interaction, such as a fingerprint scan, with the physical token, or a facial recognition interaction with the mobile authenticator app is accepted by the system 900. In some cases, the additional identity attributes may be received from one or more of a LDAP directory server, a database, and another identity repository, for example, based on identifying that the additional identity attributes are required or mandatory for creating a user profile in the second identity domain.

Login request extraction module 910 may extract from the login request at least one of a user identifier and user credentials information associated with the first user.

Credential verification resource identifying module 912 may identify one or more credential verification resources in the first identity domain via, for example, a discovery agent. The one or more credential verification resources may include password verification endpoints. The password verification endpoints may be associated with or may include one or more of a uniform resource locator (URL) and an application programming interface (API). An authenticate system, such as authenticate system 421 in FIG. 4 and associated with an identity domain, may be one non-limiting example of a credential verification resource. In some cases, the credential verification resource identifying module 912 may work in conjunction with the compromised accounts database (e.g., shown as compromised accounts database 590 in FIG. 5) to identify the one or more credential verification resources. For example, a credential verification resource may be associated with a third-party service that inspects user credentials to assess whether they have been compromised, for instance, by scanning the dark web for exposed credentials, or monitoring credential breaches, to name two-limiting examples. One non-limiting example of such a third-party service includes the database/API provided by the website, www.haveibeenpwned.com. In some other cases, the credential verification resource may be employed to determine whether a user credential, such as a password, is weak (i.e., easily guessable, and hence more susceptible to compromise).

User information verification module 914 may verify at least one of the user identifier and user credentials information for the first user. The verifying may include accessing the one or more credential verification resources. In some examples, the user information verification module 914 may work in conjunction with an authenticate system (e.g., shown as authenticate system 421 in FIG. 4) to verify at least one of the user identifier and user credentials information for the first user. In some examples, the process of authentication may comprise a user submitting user credentials (e.g., user identifier, password) to an authenticate system, which then checks the user identifier and password for a match. In some cases, the password may be checked against a locally stored one-way hash of the password. Once the user identifier and password have been verified, a session and corresponding session token for the user may be created. In some circumstances, verification may be performed against one or more of the user identifier, password, and any other applicable identity data. In some examples, the user identifier may optionally be checked even prior to authentication, for instance, to determine whether the user identifier is valid and corresponds to a user known by the system. In one non-limiting example, the user identifier may be checked by accessing a directory service or database and looking up if a user associated with that user identifier exists.

Identity infrastructure identifying module 916 may identify, in the identity infrastructure, one or more other identity domains. For example, the identity infrastructure identifying module 916 may work in conjunction with at least one discovery agent element (e.g., shown as discovery agent 305 in FIG. 3A). A discovery agent may refer to an entity (e.g., autonomous or semi-autonomous software entity) that is capable of assessing identity information within an identity infrastructure. Non-limiting examples of this information include identity data, identity metadata, contents of identity sessions, protected resources (e.g., applications or apps), and the configuration and deployment of software and hardware entities (e.g., identity domain elements) that make up an identity domain. For the purposes of this disclosure, a protected resource comprises an element or application of the identity infrastructure to which access and control is allowed or restricted based at least in part on identity data and/or metadata. An autonomous or semi-autonomous discovery agent may refer to the different actions the discovery agent undertakes, depending on the component within the identity domain the discovery agent is interacting with. For example, a discovery agent interacting with a web server may need to undertake different actions to understand the identity data associated with the web server as compared to the actions undertaken by a discovery agent deployed to interact with an identity data store, also referred to herein as a data store or simply a "store". Understanding the collection of unique identity data or metadata utilized by each of these autonomously operating components (web server, data store) may be required to build a complete picture of the distributed components and data of an identity domain and the identity infrastructure. At least one discovery agent is deployed at the beginning of a discovery process, which may be a precursor to the migration process. In such a scenario, the discovery agent may be installed on a server adjacent to the identity domain elements (e.g., discovery agent 305-*a* installed on or adjacent to identity infrastructure element 316-*a* in FIG. 3A). As different elements of the identity domain are discovered, additional discovery agents may be installed on different servers adjacent to the different elements.

For example, and as described herein, discovery agents may collect identity data and metadata from the elements in an identity infrastructure. Such identity data and metadata includes identity system configuration data and user identity attributes (both of which may be located in some predefined store), generated data such as log files (which is created as activity happens in the identity system), and real-time data such as a user making a request through his/her browser to an application (this real-time data travels over the network, changes frequently, and may be stored in ephemeral, in-memory data storage). In some examples, the discovery agents may access this ephemeral, in-memory data storage.

The identity infrastructure (e.g., shown as identity infrastructure 301-a in FIG. 3A) may include one or more identity domains and one or more identity infrastructure elements (e.g., shown as identity infrastructure elements 316 in FIG. 3A). The one or more identity domains may further comprise one or more identity domain elements. The one or more identity domain elements may comprise hardware (e.g., servers, computing devices or platforms, etc.), software (e.g., a cloud service), or a combination thereof. It is contemplated that the identity infrastructure may comprise more than one identity domain. However, it is further contemplated that an identity domain may not be subordinate to an identity infrastructure. Each identity domain may comprise domain elements which include the components that make up the identity domain. The components of the identity domain may include the identity data or metadata that may be discovered, as previously described in relation to FIGS. 3A and 3B.

The at least one discovery agent element (e.g., shown as discovery agent 305-a in FIG. 3A) may be installed on or adjacent to at least one of the one or more identity infrastructure elements (e.g., shown as identity infrastructure element 316-a in FIG. 3A). As previously stated, the identity data may include one or more of a user identity (e.g., first and/or last name of user), a user credential (e.g., username, password, password authentication token, etc., that are bound to the user), and a user attribute (e.g., email address, phone number, residential address, job title, department, employee ID, etc.) for one or more individual users of the one or more identity domains. By way of non-limiting example, the identity metadata may include one or more of a password rule, an authorization policy, an authentication policy, a trust policy, and network locations (e.g., HTTP address, URL, FTP address, network address, such as an IP address, a MAC address, to name a few non-limiting examples) for identity domain elements of the one or more identity domains. By way of non-limiting example, the one or more infrastructure elements installed in the identity infrastructure may include one or more of servers, routers, identity stores comprising one or more databases of authentication information, policy enforcement points for enforcing authorization rules (e.g., shown as access system 423 in FIG. 4), authentication points for determining user identity (e.g., shown as authenticate system 421 in FIG. 4), proxy devices, policy decision points for evaluating authorization rules based at least in part on identity session attributes, and protected resources (e.g., applications or apps).

User profile creating module 918 may request, from an external third party, validation of user data for the first user before creating a user profile for the first user in the second identity domain. By way of non-limiting example, the user data may comprise one or more of the user identifier, the user credentials information, and identity data. In some examples, the external third party may be an example of an Identity as a Service (IDaaS) provider. IDaaS refers to cloud-based authentication built and operated by a third-party provider, where the third-party provider may ensure that users are who they claim to be, and, if so, grant them access to software applications, files, and/or other resources based on the security permissions assigned to them. IDaaS may be deployed for a multitude of different applications, including, but not limited to, multi-factor authentication (MFA), single sign-on (SSO), and controlling access to restricted data.

User profile creating module 918 may determine, based at least in part on the validation, whether the user data is compromised before creating a user profile for the first user in the second identity domain. In some cases, the user profile creating module 918 may be electronically, communicatively, and/or logically coupled to a database storing information for compromised accounts (e.g., shown as compromised accounts database 890 in FIG. 8).

User profile creating module 918 may request, in response to determining whether the user data is compromised, the first user to modify the user credentials information before creating a user profile for the first user in the second identity domain. User profile creating module 918 may receive, from the first user, modified user data before creating a user profile for the first user in the second identity domain. The modified user data may include modified user credentials information (e.g., new password, new email address, new alternate email address, etc.). The user credentials information associated with the first user may comprise first user credentials information. The user credentials information may include at least a password linked to an email address. User profile creating module 918 may configure one or more requirements for defining and storing user data in the second identity domain before creating a user profile for the first user in the second identity domain. For instance, the user profile creating module 918 may determine one or more of an acceptable format for user IDs in the first and second identity domain, if a newly created password in the first identity domain matches the password complexity requirements of the second identity domain (e.g., password length, required types of characters, nonacceptable characters (if any), etc.), a set of mandatory profile attributes required to create a new user in the second identity domain, and how a user profile may be activated in the second identity domain, to name a few non-limiting examples.

User profile creating module 918 may determine whether at least a portion of the user credentials information may be utilized in the second identity domain before creating a user profile for the first user in the second identity domain by entering the at least a portion of the user credentials in the second domain and/or ascertaining whether the at least a portion of the user credentials comply with one or more second identity domain rules. In some cases, the user profile creating module 918 may interact with one or more identity domain elements in the second identity domain, for example, using a public API, to determine the minimum or mandatory set of attributes required to create a valid user profile (or user record) in the second identity domain, a format and/or syntax for the attributes, or any other applicable information specific to the second identity domain. As an example, the source identity system (i.e., first identity domain) may require an alternate email address and an alternate phone number, while the destination identity system (i.e., second identity domain) may only require an alternate email address. In such cases, the user profile creating module 918 may determine that the alternate phone number can be skipped when creating a user profile for the first user in the second identity domain.

User profile creating module 918 may obtain additional user credentials information for the first user before creating a user profile for the first user in the second identity domain. In some cases, the additional user credentials information may include at least multi-factor authentication (MFA) information. MFA refers to a feature where a user may submit multiple factors to be authenticated or gain entry to a network, which may enhance security over single-factor authentication. For instance, a user may be transmitted a 4 or 6 digit code over text, through an app installed on their device, email, voice call, etc. Further, the user may enter the 4 or 6 digit code in addition to their password to get authenticated.

User profile creating module 918 may receive user data for the first user before creating a user profile for the first user in the second identity domain. By way of non-limiting example, at least a part of the user profile in the second identity domain may be associated with one or more of a verified user identifier associated with the first user, verified user credentials information associated with the first user, and additional identity data for the first user. In some embodiments, creating a user profile for the first user in the second identity domain may be based at least in part on the user data, where the user data may include at least the additional user credentials information.

User data update module 920 may update the user data for the first user in the first identity domain. The updating may be based at least in part on the modified user data. In some examples, the user data update module 920 may also update the user data for the first user in the first identity domain based at least in part on the additional user credentials information. By way of non-limiting example, the user data may further include one or more of the user identifier, the first user credentials information, and identity data.

Portion entering module 922 may enter the at least a portion of the user credentials in the second domain.

User credentials information modification module 924 may modify at least a portion of the user credentials information based in part on the verifying. In some embodiments, creating a user profile for the first user in the second identity domain may be based at least in part on the modifying at least the portion of the user credentials information. In some cases, the modifying may comprise updating a password or an email address—for example, if the password does not comply with the second domain requirements. In some cases, the user credentials information modification module 924 may work in conjunction with the user profile creating module 918 and/or a migration agent (e.g., shown as migrating agent 878 in FIG. 8).

Identity domain checking module 926 may check the second identity domain for a user profile for the first user prior to the creating the user profile for the first user in the second identity domain. Creating the user profile for the first user in the second identity domain may be based at least in part on the received modified user data, as described herein.

In some implementations, the one or more other identity domains may include the second identity domain. Furthermore, and by way of non-limiting example, the additional identity data may comprise a first name, a last name, an email address, a phone number, a residential address, an alternate email address, an alternate phone number, or a combination thereof. In some implementations, the user identifier may include at least the email address. Alternatively, the user identifier may comprise an employee ID or a unique employee number, to name two non-limiting examples.

External resources 928 may include sources of information outside of system 900, external entities participating with system 900, and/or other resources. In some implementations, some or all of the functionality attributed herein to external resources 928 may be provided by resources included in system 900.

Server(s) 902 may include electronic storage 930, one or more processors 932, and/or other components. Server(s) 902 may include communication lines, or ports to enable the exchange of information with a network and/or other computing platforms. Illustration of server(s) 902 in FIG. 1 is not intended to be limiting. Server(s) 902 may include a plurality of hardware, software, and/or firmware components operating together to provide the functionality attributed herein to server(s) 902. For example, server(s) 902 may be implemented by a cloud of computing platforms operating together as server(s) 902.

Electronic storage 930 may comprise non-transitory storage media that electronically stores information. The electronic storage media of electronic storage 930 may include one or both of system storage that is provided integrally (i.e., substantially non-removable) with server(s) 902 and/or removable storage that is removably connectable to server(s) 902 via, for example, a port (e.g., a USB port, a firewire port, etc.) or a drive (e.g., a disk drive, etc.). Electronic storage 930 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. Electronic storage 930 may include one or more virtual storage resources (e.g., cloud storage, a virtual private network, and/or other virtual storage resources). Electronic storage 930 may store software algorithms, information determined by processor(s) 932, information received from server(s) 902, information received from client computing platform(s) 904, and/or other information that enables server(s) 902 to function as described herein.

Processor(s) 932 may provide information processing capabilities in server(s) 902. As such, processor(s) 932 may include one or more of a digital processor, an analog processor, a digital circuit designed to process information, an analog circuit designed to process information, a state machine, and/or other mechanisms for electronically processing information. Although processor(s) 932 is shown in FIG. 9 as a single entity, this is for illustrative purposes only. In some implementations, processor(s) 932 may include a plurality of processing units. These processing units may be physically located within the same device, or processor(s) 932 may represent processing functionality of a plurality of devices operating in coordination. Processor(s) 932 may execute modules 908, 910, 912, 914, 916, 918, 920, 922, 924, and/or 926, and/or other modules. Processor(s) 932 may execute modules 908, 910, 912, 914, 916, 918, 920, 922, 924, and/or 926, and/or other modules by software; hardware; firmware; some combination of software, hardware, and/or firmware; and/or other mechanisms for configuring processing capabilities on processor(s) 932. As used herein, the term "module" may refer to any component or set of components that perform the functionality attributed to the module. This may include one or more physical processors during execution of processor readable instructions, the processor readable instructions, circuitry, hardware, storage media, or any other components.

It should be appreciated that although modules 908, 910, 912, 914, 916, 918, 920, 922, 924, and/or 926 are illustrated in FIG. 9 as being implemented within a single processing unit, in implementations in which processor(s) 932 includes multiple processing units, one or more of modules 908, 910, 912, 914, 916, 918, 920, 922, 924, and/or 926 may be implemented remotely from the other modules. The description of the functionality provided by the different modules 908, 910, 912, 914, 916, 918, 920, 922, 924, and/or 926 described below is for illustrative purposes, and is not intended to be limiting, as any of modules 908, 910, 912, 914, 916, 918, 920, 922, 924, and/or 926 may provide more or less functionality than is described. For example, one or more of modules 908, 910, 912, 914, 916, 918, 920, 922, 924, and/or 926 may be eliminated, and some or all of its functionality may be provided by other ones of modules 908, 910, 912, 914, 916, 918, 920, 922, 924, and/or 926. As another example, processor(s) 932 may execute one or more additional modules that may perform some or all of the functionality attributed below to one of modules 908, 910, 912, 914, 916, 918, 920, 922, 924, and/or 926.

Figure 7:
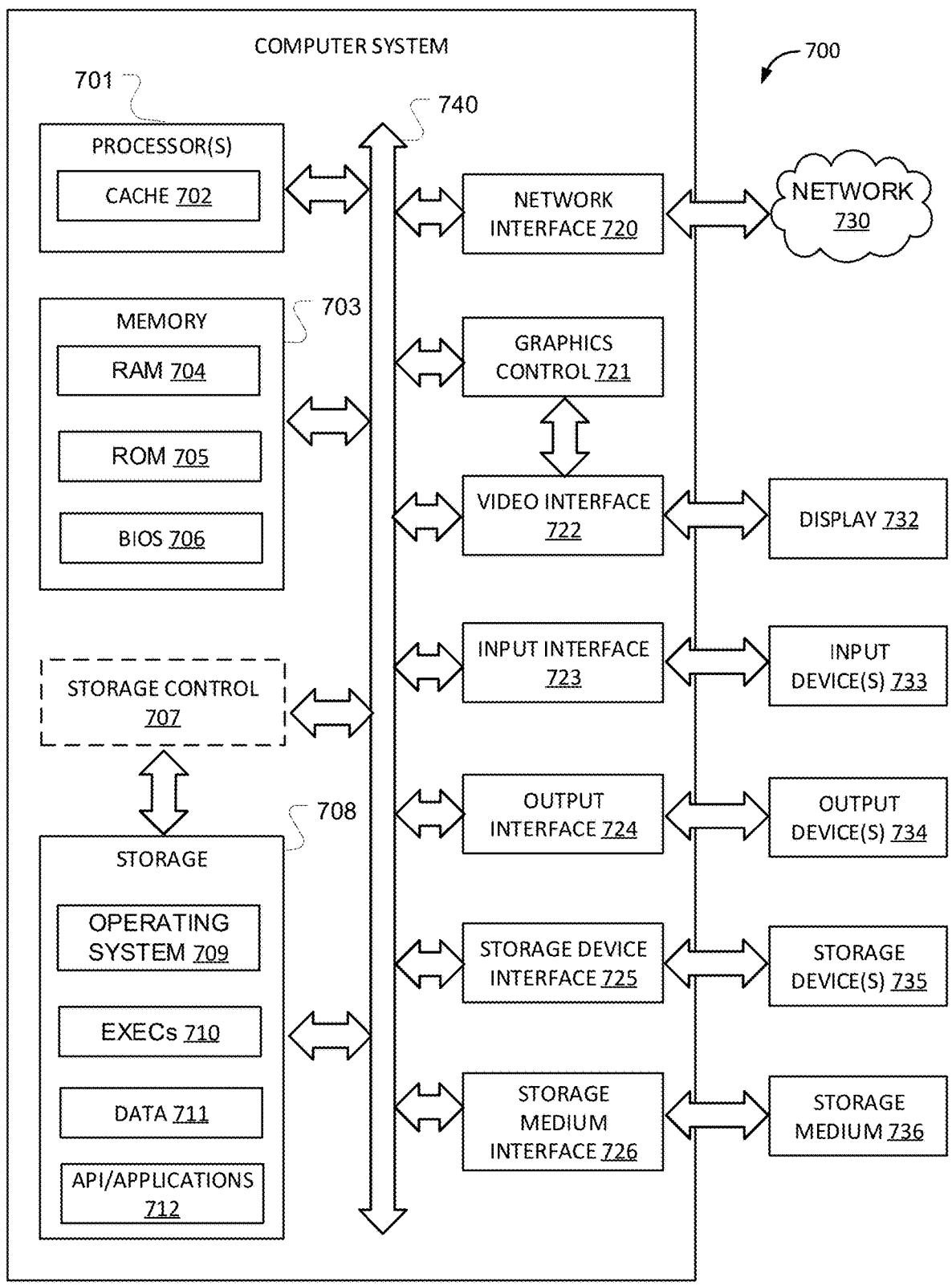
FIG. 7 is a block diagram depicting an exemplary machine that includes a computer system within which a set of instructions can be executed for causing a device to perform or execute any one or more of the aspects and/or methodologies of the present disclosure.

FIG. 7 illustrates a diagrammatic representation of one embodiment of a computer system 700, within which a set of instructions can execute for causing a device to perform or execute any one or more of the aspects and/or methodologies of the present disclosure. The components in FIG. 7 are examples only and do not limit the scope of use or functionality of any hardware, software, firmware, embedded logic component, or a combination of two or more such components implementing particular embodiments of this disclosure. Some or all of the illustrated components can be part of the computer system 700. For instance, the computer system 700 can be a general-purpose computer (e.g., a laptop computer) or an embedded logic device (e.g., an FPGA), to name just two non-limiting examples. In some cases, computer system 700 may implement one or more aspects of FIGS. 1-6 and 8.

Moreover, the components may be realized by hardware, firmware, software or a combination thereof. Those of ordinary skill in the art in view of this disclosure will recognize that if implemented in software or firmware, the depicted functional components may be implemented with processor-executable code that is stored in a non-transitory, processor-readable medium such as non-volatile memory. In addition, those of ordinary skill in the art will recognize that hardware such as field programmable gate arrays (FPGAs) may be utilized to implement one or more of the constructs depicted herein.

Computer system 700 includes at least a processor 701 such as a central processing unit (CPU) or a graphics processing unit (GPU) to name two non-limiting examples. Any of the subsystems described throughout this disclosure could embody the processor 701. The computer system 700 may also comprise a memory 703 and a storage 708, both communicating with each other, and with other components, via a bus 740. The bus 740 may also link a display 732, one or more input devices 733 (which may, for example, include a keypad, a keyboard, a mouse, a stylus, etc.), one or more output devices 734, one or more storage devices 735, and various non-transitory, tangible computer-readable storage media 736 with each other and/or with one or more of the processor 701, the memory 703, and the storage 708. All of these elements may interface directly or via one or more interfaces or adaptors to the bus 740. For instance, the various non-transitory, tangible computer-readable storage media 736 can interface with the bus 740 via storage medium interface 726. Computer system 700 may have any suitable physical form, including but not limited to one or more integrated circuits (ICs), printed circuit boards (PCBs), mobile handheld devices (such as mobile telephones or PDAs), laptop or notebook computers, distributed computer systems, computing grids, or servers.

Processor(s) 701 (or central processing unit(s) (CPU(s))) optionally contains a cache memory unit 702 for temporary local storage of instructions, data, or computer addresses. Processor(s) 701 are configured to assist in execution of computer-readable instructions stored on at least one non-transitory, tangible computer-readable storage medium. Computer system 700 may provide functionality as a result of the processor(s) 701 executing software embodied in one or more non-transitory, tangible computer-readable storage media, such as memory 703, storage 708, storage devices 735, and/or storage medium 736 (e.g., read only memory (ROM)). Memory 703 may read the software from one or more other non-transitory, tangible computer-readable storage media (such as mass storage device(s) 735, 736) or from one or more other sources through a suitable interface, such as network interface 720. Any of the subsystems herein disclosed could include a network interface such as the network interface 720. The software may cause processor(s) 701 to carry out one or more processes or one or more steps of one or more processes described or illustrated herein. Carrying out such processes or steps may include defining data structures stored in memory 703 and modifying the data structures as directed by the software. In some embodiments, an FPGA can store instructions for carrying out functionality as described in this disclosure. In other embodiments, firmware includes instructions for carrying out functionality as described in this disclosure.

The memory 703 may include various components (e.g., non-transitory, tangible computer-readable storage media) including, but not limited to, a random-access memory component (e.g., RAM 704) (e.g., a static RAM "SRAM", a dynamic RAM "DRAM, etc.), a read-only component (e.g., ROM 705), and any combinations thereof. ROM 705 may act to communicate data and instructions unidirectionally to processor(s) 701, and RAM 704 may act to communicate data and instructions bidirectionally with processor(s) 701. ROM 705 and RAM 704 may include any suitable non-transitory, tangible computer-readable storage media. In some instances, ROM 705 and RAM 704 include non-transitory, tangible computer-readable storage media for carrying out a method. In one example, a basic input/output system 706 (BIOS), including basic routines that help to transfer information between elements within computer system 700, such as during start-up, may be stored in the memory 703.

Fixed storage 708 is connected bi-directionally to processor(s) 701, optionally through storage control unit 707. Fixed storage 708 provides additional data storage capacity and may also include any suitable non-transitory, tangible computer-readable media described herein. Storage 708 may be used to store operating system 709, EXECs 710 (executables), data 711, API applications 712 (application programs), and the like. Often, although not always, storage 708 is a secondary storage medium (such as a hard disk) that is slower than primary storage (e.g., memory 703). Storage 708 can also include an optical disk drive, a solid-state memory device (e.g., flash-based systems), or a combination of any of the above. Information in storage 708 may, in appropriate cases, be incorporated as virtual memory in memory 703.

In one example, storage device(s) 735 may be removably interfaced with computer system 700 (e.g., via an external port connector (not shown)) via a storage device interface 725. Particularly, storage device(s) 735 and an associated machine-readable medium may provide nonvolatile and/or volatile storage of machine-readable instructions, data structures, program modules, and/or other data for the computer system 700. In one example, software may reside, completely or partially, within a machine-readable medium on storage device(s) 735. In another example, software may reside, completely or partially, within processor(s) 701.

Bus 740 connects a wide variety of subsystems. Herein, reference to a bus may encompass one or more digital signal lines serving a common function, where appropriate. Bus 740 may be any of several types of bus structures including, but not limited to, a memory bus, a memory controller, a peripheral bus, a local bus, and any combinations thereof, using any of a variety of bus architectures. As an example, and not by way of limitation, such architectures include an Industry Standard Architecture (ISA) bus, an Enhanced ISA (EISA) bus, a Micro Channel Architecture (MCA) bus, a Video Electronics Standards Association local bus (VLB), a Peripheral Component Interconnect (PCI) bus, a PCI-Express (PCI-X) bus, an Accelerated Graphics Port (AGP) bus, HyperTransport (HTX) bus, serial advanced technology attachment (SATA) bus, and any combinations thereof.

Computer system 700 may also include an input device 733. In one example, a user of computer system 700 may enter commands and/or other information into computer system 700 via input device(s) 733. Examples of an input device(s) 733 include, but are not limited to, an alphanumeric input device (e.g., a keyboard), a pointing device (e.g., a mouse or touchpad), a touchpad, a touch screen and/or a stylus in combination with a touch screen, a joystick, a gamepad, an audio input device (e.g., a microphone, a voice response system, etc.), an optical scanner, a video or still image capture device (e.g., a camera), and any combinations thereof. Input device(s) 733 may be interfaced to bus 740 via any of a variety of input interfaces 723 (e.g., input interface 723) including, but not limited to, serial, parallel, game port, USB, FIREWIRE, THUNDERBOLT, or any combination of the above.

In particular embodiments, when computer system 700 is connected to network 730, computer system 700 may communicate with other devices, such as mobile devices and enterprise systems, connected to network 730. Communications to and from computer system 700 may be sent through network interface 720. For example, network interface 720 may receive incoming communications (such as requests or responses from other devices) in the form of one or more packets (such as Internet Protocol (IP) packets) from network 730, and computer system 700 may store the incoming communications in memory 703 for processing. Computer system 700 may similarly store outgoing communications (such as requests or responses to other devices) in the form of one or more packets in memory 703 and communicated to network 730 from network interface 720. Processor(s) 701 may access these communication packets stored in memory 703 for processing.

Examples of the network interface 720 include, but are not limited to, a network interface card, a modem, and any combination thereof. Examples of a network 730 or network segment 730 include, but are not limited to, a wide area network (WAN) (e.g., the Internet, an enterprise network), a local area network (LAN) (e.g., a network associated with an office, a building, a campus or other relatively small geographic space), a telephone network, a direct connection between two computing devices, and any combinations thereof. A network, such as network 730, may employ a wired and/or a wireless mode of communication. In general, any network topology may be used.

Information and data can be displayed through a display 732. Examples of a display 732 include, but are not limited to, a liquid crystal display (LCD), an organic liquid crystal display (OLED), a cathode ray tube (CRT), a plasma display, and any combinations thereof. The display 732 can interface to the processor(s) 701, memory 703, and fixed storage 708, as well as other devices, such as input device(s) 733, via the bus 740. The display 732 is linked to the bus 740 via a video interface 722, and transport of data between the display 732 and the bus 740 can be controlled via the graphics control 721.

In addition to a display 732, computer system 700 may include one or more other peripheral output devices 734 including, but not limited to, an audio speaker, a printer, a check or receipt printer, and any combinations thereof. Such peripheral output devices may be connected to the bus 740 via an output interface 724. Examples of an output interface 724 include, but are not limited to, a serial port, a parallel connection, a USB port, a FIREWIRE port, a THUNDERBOLT port, and any combinations thereof. In some examples, the peripheral output devices may be used to generate reports for the entity, such as, but not limited to, financial reports, feedback reports, inventory reports, etc.

In addition, or as an alternative, computer system 700 may provide functionality as a result of logic hardwired or otherwise embodied in a circuit, which may operate in place of or together with software to execute one or more processes or one or more steps of one or more processes described or illustrated herein. Reference to software in this disclosure may encompass logic, and reference to logic may encompass software. Moreover, reference to a non-transitory, tangible computer-readable medium may encompass a circuit (such as an integrated circuit (IC)) storing software for execution, a circuit embodying logic for execution, or both, where appropriate. The present disclosure encompasses any suitable combination of hardware, software, or both.

Those of skill in the art will understand that information and signals may be represented using any of a variety of different technologies and techniques. Those of skill will further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the embodiments disclosed herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, a software module implemented as digital logic devices, or in a combination of these.

A software module may reside in RAM memory, flash memory, ROM memory, EPROM memory, EEPROM memory, registers, hard disk, a removable disk, a CD-ROM, or any other form of non-transitory, tangible computer-readable storage medium known in the art. An exemplary non-transitory, tangible computer-readable storage medium is coupled to the processor such that the processor can read information from, and write information to, the non-transitory, tangible computer-readable storage medium. In the alternative, the non-transitory, tangible computer-readable storage medium may be integral to the processor. The processor and the non-transitory, tangible computer-readable storage medium may reside in an ASIC. The ASIC may reside in a user terminal. In the alternative, the processor and the non-transitory, tangible computer-readable storage medium may reside as discrete components in a user terminal. In some embodiments, a software module may be implemented as digital logic components such as those in an FPGA once programmed with the software module.

It is contemplated that one or more of the components or subcomponents described in relation to the computer system 700 shown in FIG. 7 such as, but not limited to, the network 730, processor 701, memory, 703, etc., may comprise a cloud computing system. In one such system, front-end systems such as input devices 733 may provide information to back-end platforms such as servers (e.g., computer systems 700) and storage (e.g., memory 703). Software (i.e., middleware) may enable interaction between the front-end and back-end systems, with the back-end system providing services and online network storage to multiple front-end clients. For example, a software-as-a-service (SAAS) model may implement such a cloud-computing system. In such a system, users may operate software located on back-end servers through the use of a front-end software application such as, but not limited to, a web browser.

Although the present technology has been described in detail for the purpose of illustration based on what is currently considered to be the most practical and preferred implementations, it is to be understood that such detail is solely for that purpose and that the technology is not limited to the disclosed implementations, but, on the contrary, is intended to cover modifications and equivalent arrangements that are within the spirit and scope of the appended claims. For example, it is to be understood that the present technology contemplates that, to the extent possible, one or more features of any implementation can be combined with one or more features of any other implementation.

What is claimed is:

1. A system for controlling identity information across multiple identity domains in a distributed identity infrastructure, the system comprising:
   one or more hardware processors configured by machine-readable instructions to:
   transmit first identity information from a first identity domain to an identity information control system, wherein the first identity information comprises a first format;
   use the identity information control system to translate the first identity information from the first format to a second format, and from the second format to a third format;
   send the first identity information in the third format from the identity information control system to a second identity domain; and
   replace second identity information in the second identity domain with the first identity information.

2. The system of claim 1, wherein the one or more hardware processors are further configured by machine-readable instructions to:
   change at least a portion of the first identity information in the first identity domain from a first data to a second data and detect the change in the at least a portion of the first identity information prior to transmitting the first identity information from the first identity domain to the identity information control system;
   identify one or more missing portions in at least one of the first identity information and second identity information prior to using the identity information control system to translate the first identity information from the first format to the second format and from the second format to the third format,
   issue a notification related to the one or more missing portions in at least one of the first identity information and second identity information prior to using the identity information control system to translate the first identity information from the first format to the second format and from the second format to the third format;
   resolve the missing portions in at least one of the first identity information and second identity information prior to or during using the identity information control system to translate the first identity information from the first format to the second format and from the second format to the third format; and
   wherein using the identity information control system to translate the first identity information from the first format to the second format and from the second format to the third format comprises interacting with a non-Application Programming Interface (API) at the second identity domain.

3. The system of claim 2, wherein interacting with the non-API at the second identity domain comprises sending Hyper Text Transfer Protocol (HTTP) messages to a user interface for at least one of an administrator and a user;
   wherein replacing second identity information in the second identity domain with the first identity information comprises changing the second identity information to third data; and
   wherein the third data comprises data equivalent to the second data.

4. The system of claim 1, wherein the one or more hardware processors are further configured by machine-readable instructions to change at least a portion of the first identity information in the first identity domain from a first data to a second data, and wherein changing the at least a portion of the first identity information in the first identity domain comprises changing a configuration of the first identity domain;
   wherein using the identity information control system to translate the first identity information comprises using at least one of an Application Programming Interface (API) and a Graphical Programming Interface to translate the first identity information from the first format to the second format and from the second format to the third format;
   wherein the first identify information and the second identity information comprise at least one of identity data and identity metadata;
   wherein the first format comprises a format used by the first identity domain;
   wherein the second format comprises a format used by the identity information control system;
   wherein the third format comprises a format used by the second identity domain; and
   wherein the second identity domain comprises a plurality of second identity domains.

5. The system of claim 4, wherein the at least one of an API and Graphical Programming Interface comprises one or more public identity domain APIs;

wherein the identity data comprises data related to at least one of authentication or authorization requests, adding users, setting and reading user attributes, a user identity, a user credential, and a user attribute for one or more individual users of a plurality of identity domains, including at least the first identity domain and one or more of the plurality of second identity domains;

wherein the identity metadata comprises data related to at least one of setting and reading access policies, password rules, data locations, an authorization policy, an authentication policy, a trust policy, data rules, user schema groups, group types and composition, and network locations for elements of the plurality of identity domains; and wherein the plurality of second identity domains reside in two or more network clouds, with at least one of the two or more network clouds comprising a private cloud and at least one of the two or more network clouds comprising a public cloud.

6. The system of claim 5, wherein the identity data and identity metadata comprise at least one of data related to third-party software application interaction with one or more of: the plurality of identity domains, identity infrastructure end points, and components which interact with users of the plurality of identity domains;

wherein the group types comprise one or more of static and dynamic groups; and wherein the group composition comprises one or more of membership rules and assignment policy.

7. The system of claim 1, wherein using the identity information control system to translate the first identity information from the first format to the second format and from the second format to the third format comprises interacting with one or more data stores at the first identity domain and second identity domain.

8. A method for controlling identity information across multiple identity domains in a distributed identity infrastructure, comprising:

transmitting first identity information from a first identity domain to an identity information control system, wherein the first identity information comprises a first format;

using the identity information control system to translate the first identity information from the first format to a second format and from the second format to a third format;

sending the first identity information in the third format from the identity information control system to a second identity domain; and replacing second identity information in the second identity domain with the first identity information.

9. The method of claim 8, further comprising:

changing at least a portion of the first identity information in the first identity domain from a first data to a second data and detecting the change in the at least a portion of the first identity information prior to transmitting the first identity information from the first identity domain to the identity information control system;

prior to using the identity information control system to translate the first identity information from the first format to the second format and from the second format to the third format, identifying one or more missing portions in at least one of the first identity information and second identity information;

prior to using the identity information control system to translate the first identity information from the first format to the second format and from the second format to the third format, issuing a notification related to the one or more missing portions in at least one of the first identity information and second identity information;

prior to or during using the identity information control system to translate the first identity information from the first format to the second format and from the second format to the third format, resolving the missing portions in at least one of the first identity information and second identity information; and wherein using the identity information control system to translate the first identity information from the first format to the second format and from the second format to the third format comprises interacting with a non-Application Programming Interface (API) at the second identity domain.

10. The method of claim 9, wherein interacting with the non-API comprises sending Hyper Text Transfer Protocol (HTTP) messages to a user interface for at least one of an administrator and a user;

wherein replacing second identity information in the second identity domain with the first identity information comprises changing the second identity information to third data; and wherein the third data comprises data equivalent to the second data.

11. The method of claim 8, further comprising:

changing at least a portion of the first identity information in the first identity domain from a first data to a second data, wherein changing the at least a portion of the first identity information in the first identity domain comprises changing a configuration of the first identity domain;

wherein using the identity information control system to translate the first identity information comprises using at least one of an Application Programming Interface (API) and a Graphical Programming Interface to translate the first identity information from the first format to the second format and from the second format to the third format;

wherein the first identify information and the second identity information comprise at least one of identity data and identity metadata;

wherein the first format comprises a format used by the first identity domain;

wherein the second format comprises a format used by the identity information control system;

wherein the third format comprises a format used by the second identity domain; and wherein the second identity domain comprises a plurality of second identity domains.

12. The method of claim 11, wherein the at least one of an API and Graphical Programming Interface comprises one or more public identity domain APIs;

wherein the identity data comprises data related to at least one of authentication or authorization requests, adding users, setting and reading user attributes, a user identity, a user credential, and a user attribute for one or more individual users of a plurality of identity domains, including at least the first identity domain and one or more of the plurality of second identity domains;

wherein the identity metadata comprises data related to at least one of setting and reading access policies, password rules, data locations, an authorization policy, an authentication policy, a trust policy, data rules, user schema groups, group types and composition, and network locations for elements of the plurality of identity domains; and wherein the plurality of second identity domains reside in two or more network clouds, with at least one of the two or more network clouds comprising a private cloud and at least one of the two or more network clouds comprising a public cloud.

13. The method of claim 12, wherein the identity data and identity metadata comprise at least one of data relate to third-party software application interaction with one or more of: the plurality of identity domains, identity infrastructure end points, and components which interact with users of the plurality of identity domains;

wherein the group types comprise one or more of static and dynamic groups; and wherein the group composition comprises one or more of membership rules and assignment policy.

14. The method of claim 8, wherein using the identity information control system to translate the first identity information from the first format to the second format and from the second format to the third format comprises interacting with one or more data stores at the first identity domain and second identity domain.

15. A non-transient computer-readable storage medium having instructions embodied thereon, the instructions being executable by one or more processors to perform a method for controlling identity information across multiple identity domains in a distributed identity infrastructure, the method comprising:

transmitting first identity information from a first identity domain to an identity information control system, wherein the first identity information comprises a first format;

using the identity information control system to translate the first identity information from the first format to a second format and from the second format to a third format;

sending the first identity information in the third format from the identity information control system to a second identity domain; and replacing second identity information in the second identity domain with the first identity information.

16. The computer-readable storage medium of claim 15, wherein the method further comprises:

changing at least a portion of the first identity information in the first identity domain from a first data to a second data and detecting the change in the at least a portion of the first identity information prior to transmitting the first identity information from the first identity domain to the identity information control system;

prior to using the identity information control system to translate the first identity information from the first format to the second format and from the second format to the third format, identifying one or more missing portions in at least one of the first identity information and second identity information;

prior to using the identity information control system to translate the first identity information from the first format to the second format and from the second format to the third format, issuing a notification related to the one or more missing portions in at least one of the first identity information and second identity information;

prior to or during using the identity information control system to translate the first identity information from the first format to the second format and from the second format to the third format, resolving the missing portions in at least one of the first identity information and second identity information; and wherein using the identity information control system to translate the first identity information from the first format to the second format and from the second format to the third format comprises interacting with a non-Application Programming Interface (API) at the second identity domain.

17. The computer-readable storage medium of claim 16, wherein interacting with the non-API comprises sending Hyper Text Transfer Protocol (HTTP) messages to a user interface for at least one of an administrator and a user;

wherein replacing second identity information in the second identity domain with the first identity information comprises changing the second identity information to third data; and wherein the third data comprises data equivalent to the second data.

18. The computer-readable storage medium of claim 15, where the method further comprises:

changing at least a portion of the first identity information in the first identity domain from a first data to a second data, wherein changing the at least a portion of the first identity information in the first identity domain comprises changing a configuration of the first identity domain;

wherein using the identity information control system to translate the first identity information comprises using at least one of an Application Programming Interface (API) and a Graphical Programming Interface to translate the first identity information from the first format to the second format and from the second format to the third format;

wherein the first identify information and the second identity information comprise at least one of identity data and identity metadata;

wherein the first format comprises a format used by the first identity domain;

wherein the second format comprises a format used by the identity information control system;

wherein the third format comprises a format used by the second identity domain; and wherein the second identity domain comprises a plurality of second identity domains.

19. The computer-readable storage medium of claim 18, wherein the at least one of an API and Graphical Programming Interface comprises one or more public identity domain APIs;

wherein the identity data comprises data related to at least one of authentication or authorization requests, adding users, setting and reading user attributes, a user identity, a user credential, and a user attribute for one or more individual users of a plurality of identity domains, including at least the first identity domain and one or more of the plurality of second identity domains;

wherein the identity metadata comprises data related to at least one of setting and reading access policies, password rules, data locations, an authorization policy, an authentication policy, a trust policy, data rules, user schema groups, group types and composition, and network locations for elements of the plurality of identity domains; and wherein the plurality of second identity domains reside in two or more network clouds, with at least one of the two or more network clouds comprising a private cloud and at least one of the two or more network clouds comprising a public cloud.

20. The computer-readable storage medium of claim 19, wherein the identity data and identity metadata comprise at least one of data related to third-party software application interaction with one or more of: the plurality of identity domains, identity infrastructure end points, and components which interact with users of the plurality of identity domains;

wherein the group types comprise one or more of static and dynamic groups; and wherein the group composition comprises one or more of membership rules and assignment policy.

* * * * *